US008447868B2

(12) United States Patent
Bonar et al.

(10) Patent No.: US 8,447,868 B2
(45) Date of Patent: May 21, 2013

(54) METHOD FOR EXTENDING BUSINESS SYSTEMS TO A MOBILE WORKFORCE

(75) Inventors: Jeffrey G. Bonar, Delray Beach, FL (US); Nancy B. Lehrer, Delray Beach, FL (US); Kenneth G. Tomazin, Delray Beach, FL (US); Subir Chhibber, Delray Beach, FL (US); Adrian Pekarek, Delray Beach, FL (US); Bryan Tafel, Delray Beach, FL (US)

(73) Assignee: JumpStart Wireless Corporation, Delray Beach, FL (US)

( * ) Notice: Subject to any disclaimer, the term of this patent is extended or adjusted under 35 U.S.C. 154(b) by 0 days.

(21) Appl. No.: 13/349,678

(22) Filed: Jan. 13, 2012

(65) Prior Publication Data
US 2012/0290690 A1 Nov. 15, 2012

Related U.S. Application Data

(62) Division of application No. 11/169,332, filed on Jun. 29, 2005, now Pat. No. 8,122,107.

(60) Provisional application No. 60/584,423, filed on Jun. 30, 2004.

(51) Int. Cl.
*G06F 15/16* (2006.01)
(52) U.S. Cl.
USPC ............................ 709/228; 709/202; 709/205
(58) Field of Classification Search
USPC .................................. 709/202–205, 227–228
See application file for complete search history.

(56) References Cited

U.S. PATENT DOCUMENTS

| 6,308,164 | B1 * | 10/2001 | Nummelin et al. ........... 705/7.23 |
| 6,640,241 | B1 * | 10/2003 | Ozzie et al. .................... 709/204 |
| 6,901,380 | B1 * | 5/2005 | Bremers ..................... 705/26.81 |
| 7,363,355 | B2 * | 4/2008 | Knauerhase et al. .......... 709/219 |
| 2002/0069031 | A1 * | 6/2002 | Lehman ........................ 702/178 |
| 2002/0069192 | A1 * | 6/2002 | Aegerter ........................... 707/1 |
| 2002/0194207 | A1 * | 12/2002 | Bartlett et al. ................ 707/203 |
| 2003/0172138 | A1 * | 9/2003 | McCormack et al. ......... 709/220 |
| 2004/0049345 | A1 * | 3/2004 | McDonough et al. .......... 702/12 |
| 2005/0027386 | A1 * | 2/2005 | Weigand et al. ................ 700/97 |
| 2005/0177617 | A1 * | 8/2005 | Banginwar et al. ........... 709/203 |
| 2005/0188051 | A1 * | 8/2005 | Sneh ............................. 709/213 |

FOREIGN PATENT DOCUMENTS

EP 0 926 608 A2 * 8/1999
WO WO 2004/023233 A2 * 3/2004

* cited by examiner

*Primary Examiner* — Patrice Winder
(74) *Attorney, Agent, or Firm* — Nixon & Vanderhye P.C.

(57) ABSTRACT

Systems, software, and methods for reliable wireless communication are provided. In one aspect, a computer program control device, called a node, is configured to be transmitted from a first device for receipt and processing on a second, disparate device. The node comprises a collection of managed objects or managed object representations that is effective to control said disparate device. In one exemplary illustrative non-limiting implementation, the node is configured to control the processing of multiple data types. A session manager component within a task management component provides for intermittent connection to a disparate remote device.

15 Claims, 23 Drawing Sheets

XML DTD for Sample Task Description Language

```
<?xml encoding="UTF-8">
<!-- sample Task Description Language DTD -->

<!ELEMENT basedOn EMPTY>
<!ATTRLIST basedOn
        name NMTOKEN #REQUIRED
        type NMTOKEN #REQUIRED
>

<!ELEMENT caption (#PCDATA | getData)* >
<!ATTRLIST caption
        content (Compute | Simple) "Simple")
>

<!ELEMENT field (caption, setData?, recordTime?, link*)>
<!ATTRLIST field
        name NMTOKEN #REQUIRED
        type (Text, Confirm, FillInText, YesNo) "Text"
        completeWhen (AllChildrenVisited | Visited) "Visited"
>

<!ELEMENT form (basedOn*, newObject*, field*)>
<!ATTRLIST form
        name NMTOKEN #REQUIRED
>

<!ELEMENT getData EMPTY>
<!ATTRLIST getData
        object NMTOKEN #REQUIRED
        property NMTOKEN #REQUIRED
>

<!ELEMENT link (using*)>
<!ATTRLIST link
        formName NMTOKEN #REQUIRED
        continue (Yes | No) "Yes"
        response NMTOKEN #IMPLIED
>

<!ELEMENT newObject (setData*)>
<!ATTRLIST newObject
        name NMTOKEN #REQUIRED
        type NMTOKEN #REQUIRED
>

<!ELEMENT recordTime EMPTY>
<!ATTRLIST recordTime
        object NMTOKEN #REQUIRED
        onOpen NMTOKEN #IMPLIED
        onComplete NMTOKEN #IMPLIED
>

<!ELEMENT setData EMPTY >
<!ATTRLIST setData
        object NMTOKEN #REQUIRED
        property NMTOKEN #REQUIRED
        value NMTOKEN #IMPLIED
>

<!ELEMENT tdl (form+)>
<!ATTRLIST tdl
        version CDATA #REQUIRED
        domain CDATA #REQUIRED
>

<!ELEMENT using EMPTY>
<!ATTRLIST using
        name NMTOKEN #REQUIRED
>
```

Figure 6

TaskList.fdl

```xml
<?xml version="1.0" encoding="UTF-8"?>
<fdl version="1.6" aspName="capmec2" xmlns:xsi="http://www.w3.org/2001/
XMLSchema-instance" xsi:noNamespaceSchemaLocation="../fdl.xsd">
        <form name="TaskList">
                <basedOn name="myworker" classname="Worker"/>
                <basedOn name="today" classname="Today"/>
                <basedOn name="aspCustomer" classname="ASPCustomer"/>
                <assignTo name="todoItems" classname="ToDo">
                        <getROCollection ROname="ToDo"
collectionname="toDoByWorkerAndDate">
                                <using param="myworker"/>
                                <using param="today"/>
                        </getROCollection>
                </assignTo>
                <caption value="AcmeCleaning"/>
                <field name="ToDoList" type="Menu" xsi:type="menuField">
                        <caption value="Cleans"/>
                        <MenuOptions>
                                <foreach name="todo" in="todoItems">
                                        <option link="TaskDetails.fdl">
                                                <caption value="New Clean" /
>
                                                <using param="todo"/>
                                                <using param="aspCustomer"/>
                                        </option>
                                </foreach>
                        </MenuOptions>
                </field>
        </form>
</fdl>
```

Figure 7A

TaskDetails.fdl

```xml
<?xml version="1.0" encoding="UTF-8"?>
<fdl version="1.6" aspName="aramark" xmlns:xsi="http://www.w3.org/2001/
XMLSchema-instance" xsi:noNamespaceSchemaLocation="../fdl.xsd">
    <form name="TaskDetails">
        <basedOn name="todo" classname="ToDo"/>
        <basedOn name="aspCustomer" classname="ASPCustomer"/>
        <assignTo name="activityReport" classname="ActivityReport">
            <getROFeatureValue ROname="todo" featurename="activityReport"/></
assignTo>
        <assignTo name="request" classname="Request">
          <getROFeatureValue ROname="todo" featurename="request"/> </assignTo>
              <caption value="New Clean"/>
              <field type="TimeStamp" name="cleanTime"
xsi:type="timeStampField" allowOverride="false">
                  <caption value="Clean Time: "/>
                  <datasource ROname="activityReport" featurename="cleanTime"
metaData="startTime"/> </field>
          <field type="TextEntry" name="busNumber" xsi:type="textEntryField">
                  <caption value="Bus Number: "/>
                     <metaData nullsAllowed="false" numeric="true" />
                     <datasource ROname="activityReport"
featurename="busNumber"/> </field>
              <field type="CatalogEntry" name="cleanType"
xsi:type="catalogEntryField">
                  <caption value="Clean Type: "/>
                  <catalog name="Clean Type" allowEdits="false"
allowSplits="false" display="name"/>
                  <datasource ROname="activityReport"
featurename="cleanType"/> </field>
              <field xsi:type="branchField" type="Branch" name="cleanDetails">
                  <caption value="Clean finished?"/>
                  <shortCaption value="Clean finished?"/>
                  <metaData default="Yes" showSummary="true"
displayValues="Yes,No" completeValues="Yes,No" allowNone="false">
                      <branch link="CleanDetails.fdl">
                          <using param="request"/>
                          <using param="activityReport"/>  </branch>
                  </metaData> <datasource ROname="activityReport"
featurename="cleanDetails"/> </field>
              <field type="CatalogEntry" name="standardComments"
xsi:type="catalogEntryField">
                   <caption value="Standard Comments: "/>
                   <catalog name="Standard Comments" allowEdits="false"
allowSplits="true" allowFreeForm="false" display="name"/>
                   <datasource ROname="activityReport"
featurename="standardComments"/> </field>
              <field name="submit" type="YesNo" allowNone="false">
                   <caption value="Submit: "/> <datasource
ROname="activityReport" featurename="submit" metaData="closed"/> </field> </
form> </fdl>
```

Figure 7B

50 | CleanDetails.fdl

```xml
<?xml version="1.0" encoding="UTF-8"?>
<fdl version="1.6" aspName="aramark" xmlns:xsi="http://www.w3.org/2001/
XMLSchema-instance" xsi:noNamespaceSchemaLocation="../fdl.xsd">
        <form name="CleanDetails">
                <basedOn name="request" classname="Request"/>
                <basedOn name="activityReport" classname="ActivityReport"/>
                <caption value="Clean Details"/>
                <field xsi:type="branchField" type="Branch" name="BigBus">
                        <caption value="BigBus?"/>
                        <shortCaption value="BigBus?"/>
                        <metaData default="Yes" showSummary="true"
displayValues="Yes,No" completeValues="Yes,No" allowNone="false">
                                <branch link="NonBigBusDetails.fdl">
                                        <using param="request"/>
                                        <using param="activityReport"/>
                                </branch>
                        </metaData>
                        <datasource ROname="activityReport"
featurename="BigBusBus"/>
                </field>
                <field name="pestControl" type="YesNo" allowNone="false"
optional="Yes">
                        <caption value="Pest Control: "/>
                        <datasource ROname="activityReport"
featurename="pestControl"/>
                </field>
                <field type="TextEntry" name="notes"
xsi:type="textEntryField" optional="Yes">
                        <caption value="Notes: "/>
                        <datasource ROname="activityReport"
featurename="notes"/>
                </field>
        </form>
</fdl>
```

Figure 7C

50 | NonBigBusDetails.fdl

```xml
<?xml version="1.0" encoding="UTF-8"?>
<fdl version="1.6" aspName="aramark" xmlns:xsi="http://www.w3.org/2001/
XMLSchema-instance" xsi:noNamespaceSchemaLocation="../fdl.xsd">
        <form name="NonBigBusDetails">
                <basedOn name="request" classname="Request"/>
                <basedOn name="activityReport" classname="ActivityReport"/>
                <caption value="Bus Details"/>
                <field type="CatalogEntry" name="busCompany"
xsi:type="catalogEntryField" >
                        <caption value="'Bus Company:" />
                        <catalog name="Bus Company" allowEdits="false"
allowFreeForm="false" allowSplits="false" display="name" />
                        <datasource ROname="activityReport"
featurename="busCompany" />
                </field>
                <field type="CatalogEntry" name="busType"
xsi:type="catalogEntryField" >
                        <caption value="Bus Type:" />
                        <catalog name="Bus Type" allowEdits="false"
display="name" allowFreeForm="false" allowSplits="false" />
                        <datasource ROname="activityReport"
featurename="busType" />
                </field>
        </form>
</fdl>
```

Figure 7D

METHOD FOR EXTENDING BUSINESS SYSTEMS TO A MOBILE WORKFORCE

CROSS REFERENCE TO RELATED APPLICATIONS

This application is a divisional application of U.S. patent application Ser. No. 11/169,332 filed 29 Jun. 2005, now U.S. Pat. No. 8,122,107; which application claims priority under 35 U.S.C. §119(e) to provisional U.S. Patent Application Ser. No. 60/584,423 filed 30 Jun. 2004; the entire disclosure of each of these prior disclosures is incorporated herein by reference in their entirety and for all purposes as if expressly set forth herein.

FIELD

The technology herein relates to wireless telecommunication, the construction and management of wireless applications, the coordination and synchronization of data across wireless links, the management of wireless mobile business applications in intermittent or partial connectivity situations, mobile workers, and remote sessions.

BACKGROUND AND SUMMARY

Wireless communication ("wireless") allows two or more electronic devices to exchange information without the need for a physical connection (i.e., a wire or cable) between the devices. Wireless can be fixed or mobile/portable. Fixed wireless allows wireless communication from one fixed location to another fixed location. Mobile/portable wireless permits communication from a fixed (central) site to a movable device while still maintaining wireless contact. The level of connectivity (i.e., the signal intensity) between two sites in a fixed wireless environment is fairly constant, because neither site ever moves. But the level of connectivity in mobile wireless may vary significantly depending on the location of the wireless device, the relative location of any mobile wireless communication transmitters and receivers, and any intervening obstacles such as trees, buildings, mountains, or other phenomena.

Mobile wireless devices (also referred to here as wireless devices or mobile devices) include pagers, mobile phones, and combination devices that include the functionality of mobile phones, pagers, and personal digital assistants (PDAs). These devices allow the exchange of textual information (e.g., using pagers, cell phones, or PDAs) as well voice and data (e.g., using cell phones and PDAs). Wireless devices have also recently been integrated with useful features such as global positioning system (GPS) access, cameras, and scanners (including scanners able to process radio frequency identification (RFID) and barcodes), and magnetic or optical data storage cards. These types of devices have enabled people to remain in contact with each other while traveling or working from multiple remote locations. Moreover, the richness of the information exchanged between people has grown considerably in recent years due to the expanding integration of features just described.

Mobile wireless devices generally communicate using electromagnetic waves such as radio waves. Transmitters send a signal from a wireless communication point-of-presence to a wireless device, while receivers process a signal received at a point-of-presence from a device. A point-of-presence is a collection of one or more transmitters and receivers that can communicate with a mobile wireless device. For example, a point-of-presence may be a communication tower in a cellular telephone network or a wireless local area network (LAN) connection at a coffee shop. A central site is in contact with a network of points-of-presence to control the communication between the device and the appropriate point of presence. Points-of-presence are typically spaced so that their receiving ranges overlap to allow continuous communication as a device moves amongst various locations. As long as a connection can be made between the point-of-presence and the mobile wireless device, information can be sent and received appropriate to the capabilities of the device. But in many environments such constant contact with a point-of-presence is not possible; since areas exist which are not in range of a point-of-presence, and variances of land and building materials may interfere with the signal. As a result, a pager can be out of range for a few minutes or hours, and mobile phone calls can be cut off in mid-sentence.

More recently, wireless devices have allowed application programs to be written to manage data communication (and not just voice) to and from the device so that more advanced functionality may be enabled in the device. Such applications can communicate with other devices, such as networked computers and other electronic equipment (including other wireless devices). Examples include the ability to send and receive email; retrieve, display and manage stock data; find and display nearby restaurants or clothing stores; and search and examine corporate data by workers located at customer sites. These applications typically rely on various application level protocols such as the Wireless Application Protocol (WAP) or NTT's I-MODE format, which provide a framework for the presentation and management of text, graphics, and other data on wireless devices. Alternatively, these applications rely upon an always-available Internet connection, and communicate using standard Internet protocols (for example, sockets and HTTP) and rely on the connection being available when needed.

Exemplary application protocols are built using data transport protocols such as ReFlex, CDPD, GPRS, and SMS. These protocols have allowed more sophisticated applications to be built, such as an interface for requesting a financial loan or placing an order with an office supply store. In these applications, interacting with the user and communicating data back to a central database system are necessary in order to request, collect, and process the information required to complete the task. For example, placing an order with an office supply store may require the customer name and number to be entered along with the specific items requested. The application sends this information to a central server where the order is received and verified, and data is returned to the application to inform the customer that the order has been approved and provide an expected delivery date.

Current protocols used in these sophisticated applications generally require continuous connectivity between the device and the network of mobile points of presence with which it communicates. Both the application protocols and the data transport protocols are stateless, and require connectivity with the device in order to complete a specific task such as sending an email message. This requirement means that a dense enough placement of wireless points of presence must exist so that the device can maintain a constant signal with at least one point-of-presence to function productively. A connection must be available (that is, a signal must be maintained) in order to complete any programmed task using the mobile device. If the signal is lost, the device may try to re-establish a connection in order to re-initiate the task, or the device may indicate that the task could not be accomplished. But in either event, productive data processing stops.

In some cases, the user has the option to manually re-initiate the task. This is successful only if the device can now communicate with a point of presence, or the user can move to a new location known to be within range of a point of presence. In the case where connectivity was lost because the mobile user is now in a location unreachable by a point-of-presence, the task cannot be re-initiated. Such a situation can occur in geographic areas that are in a valley or shielded by buildings or natural formations. More common is the loss of connectivity that often occurs inside a building. In most buildings, the wireless connectivity varies from room to room. The steel, concrete, and other materials within the structure of buildings can cause interference with wireless signals, as can the electronic noise generated from equipment within the building.

For applications such as requesting a weather forecast or the price of a specific stock, tasks can be defined in small enough sessions so that the connectivity requirement does not pose a significant problem: The task is short enough that a user is likely to complete it before losing connectivity, even if they are in an environment with intermittent connectivity. Furthermore, users of these devices often can wait to receive (or send) this information at a later time. But for more complex tasks, such as applying for billing authorization on behalf of a customer or recording work done on a copy machine being serviced, this requirement can be problematic for business use. Lost productivity due to poor connectivity can be especially frustrating if the mobile user is required to do an extended amount of work at a location where wireless communication is intermittent. For example, service technicians repairing large industrial equipment have been known to make trips outside of the building just to get a necessary piece of information with their mobile device.

In addition, wireless current protocols require that all information for a session be transmitted before the application can start processing the data, i.e., current protocols require monolithic delivery of code and data. For example, in WAP, information is sent in "decks" and split into logical sections called "cards". Cards are described using an Extended Markup Language (XML) variant called Wireless Markup Language (WML). A WAP application must receive the entire deck (with all its cards) before data associated with the first card can be presented to the user. In practice, this means that WAP applications must limit the size of their decks to a manageable chunk of data so that the user is not left waiting for data to appear on their mobile device's display. Furthermore, current implementations of WAP set hard limits on how many characters can be sent in each deck. This limit is currently less than 2,000 characters, thus allowing only relatively small decks.

Wireless current devices may also require loading a different or customized wireless application program into the device before the application can be used. i.e. current wireless applications require the monolithic delivery of program instructions to the device. For example, in a Windows CE .NET application, the complete .NET assembly must be delivered to the wireless device and installed on that device before information for a session may be transmitted to the device. This limitation imposes configuration management and application installation burdens on the users and the IT staff that support them.

Because of these limitations imposed by current wireless protocols such as WAP, the burden of providing reliable, efficient data processing and transmission for wireless devices falls on the programmer who must anticipate the problems associated with loss of connectivity or the likely wait for a large block of data to download. But very often such consideration is not adequately given, due in part to the inexperience of many programmers with wireless applications and the tight release deadlines associated with many projects. Thus, programmers often break wireless application tasks into arbitrary steps that may not be optimized, or the user must cope with long data transmissions. Either situation makes the software inefficient for the user.

Businesses using wireless technologies have additional concerns related to a wireless device's susceptibility to loss, breakage, internal corruption, or unexpected failure as a result of their inherently unpredictable operating environment.

As a result, current wireless applications are often more difficult and time consuming to use than mobile users prefer and may fail in unexpected ways when executed in an area with intermittent connectivity. In some cases, the problems are severe enough to prevent mobile users from using their devices and applications at all.

The exemplary, illustrative non-limiting implementation of the technology herein is preferably provided using a hosted service provider (ASP) business module, in which wireless infrastructure, TPC device, and the various integration servers are provided by a central facility that is used by users on an as needed basis. Providing the technology in this manner allows the users to focus on their business and not on the deployment and management of infrastructure components. The nature of the architecture permits multiple users from different companies to transparently share common infrastructure without interfering with each other. Alternatively, the technology may be implemented in a traditional model, where a single company owns the infrastructure and provides access to said infrastructure for their people.

The exemplary illustrative technology herein addresses these and other important needs.

An exemplary illustrative non-limiting implementation of the technology herein provides a computer program code device, called a "node", and corresponding apparatuses, systems, software, and methods, in which the node is configured to be transmitted from a first device for receipt and processing on a second, disparate device. The node comprises a collection of managed objects or managed object representations that are effective to control said disparate device. In one exemplary illustrative non-limiting implementation, the node is configured to control the processing of multiple data types. Examples of suitable data types include data encoding an image, signature information, data encoding sounds, data provided by a scanning device, data retrieved from a magnetic data storage mechanism, and GPS data. In other exemplary illustrative non-limiting implementations, the node is configured to control the processing of information to be sent to a printing device for printing.

In other exemplary illustrative non-limiting implementations, the node is configured to control the operation of another node in the disparate device. In one exemplary illustrative non-limiting implementation, the node is configured to execute a logical branch in the operation of a program operating in said disparate device. In a more specific exemplary illustrative non-limiting implementation, the logical branch is an IF operation. In another exemplary illustrative non-limiting implementation, the logical branch is a conditional branching operation.

In still other exemplary illustrative non-limiting implementations, the node is related logically to a plurality of nodes, and is configured to change to logical order of the plurality. In some exemplary illustrative non-limiting implementations, the node is configured to create a logical structure of computer program code devices. In other exemplary illustrative non-limiting implementations, the node is configured to instantiate a second node, cause the operation of an external program, or receive the results of the operation of an external program.

In other exemplary illustrative non-limiting implementations, the node is configured to specify at least one mechanism for its management. For example, the node can be encrypted, compressed, or protected from tampering. In addition, the management can include synchronization of the node between the first and second devices. In some exemplary illustrative non-limiting implementations, the synchronization occurs upon completion of the operation controlled by the node device or the completion of an operation of a second node. Alternatively, synchronization occurs at a predetermined interval.

The nodes provided by exemplary illustrative technology herein are configured to be received over a network connection, such as a wireless connection, by the disparate device. In some exemplary illustrative non-limiting implementations, the disparate device is a standard computer, such as a desktop or laptop computer. In other exemplary illustrative non-limiting implementations, the disparate device is a server.

BRIEF DESCRIPTION OF THE DRAWINGS

These and other features and advantages will be better and more completely understood by referring to the following detailed description in conjunction with the drawings, of which:

FIG. 6 is an example illustrative non-limiting DTD specification in accordance with the exemplary illustrative technology herein.

FIGS. 7*a*-7*d* are an example illustrative non-limiting TDL specification in accordance with the exemplary illustrative technology herein.

DESCRIPTION OF SOME EXEMPLARY ILLUSTRATIVE NON-LIMITING IMPLEMENTATIONS

Overview

The exemplary illustrative technology herein provides computer program code devices (hereinbelow called "nodes") that are a collection of managed objects or managed object representations effective to control the processing of instructions and data on a device. A "device" as used herein is, in one exemplary illustrative non-limiting implementation, a computer that includes a communication mechanism and is configured to manage nodes, i.e., including a node store (as described below) and a dispatch manager as described below). In operation, nodes are transmitted from a first device to a second device. Sometimes this second device is referred to as a disparate device. The nodes in a device control aspects of the operation of programs and data on the said device to allow the efficient transmission of data and operation instructions between the second device and the first device, even in the absence of a robust communication link between the first device and the second device. Thus, in some exemplary illustrative non-limiting implementations, the nodes are configured to function independently of the state of the communication link between the first device and the second device. Thus, the nodes will be seen to provide useful workflow and device control instructions even in the absence of reliable communication between devices. Furthermore, a device may be either a mobile device, e.g. one that moves with its user and is connected using wireless technologies, or a device having a fixed location (e.g., a desktop computer or a server or a computer embedded in another mechanism like a vending machine or pressure monitor), or an emulated device.

Those having skill in the art will understand that the objects as described herein may be reused to further improve the efficiency of the system. Simple examples of reuse include the reuse of templates, pick-lists, and catalogs at the node and TDL levels, as well as shared definitions for backend resources such as the QuickBooks integration and email subsystems. The system manages these resources without duplication when they are merged into wireless application TDL specifications.

Exemplary Illustrative Non-Limiting System Architecture

Figure 1:
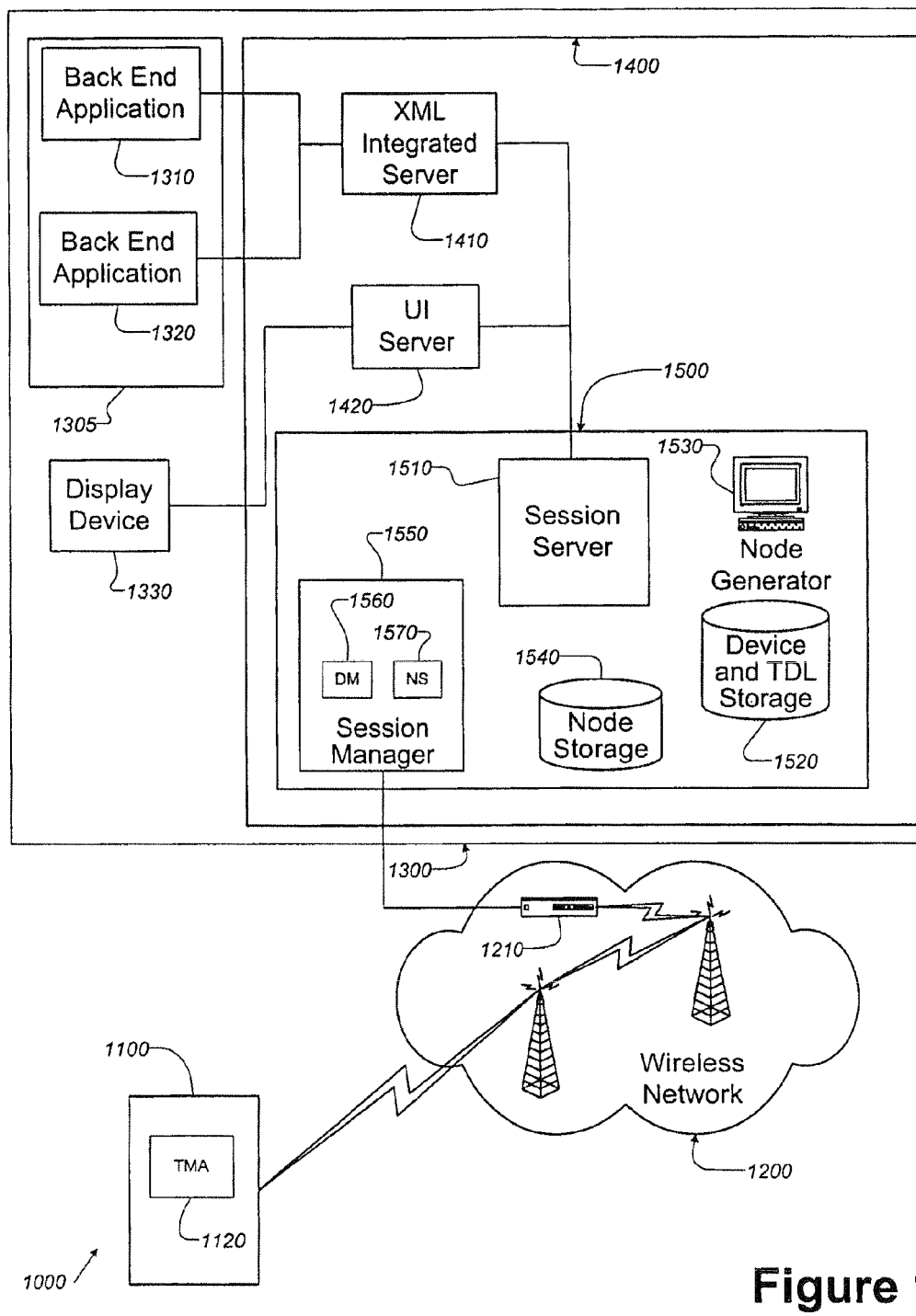
FIG. 1 shows a schematic diagram of a wireless communications system architecture in accordance with the exemplary illustrative non-limiting technology herein.

FIG. 1 illustrates a wireless communication system architecture in which a first device communicates with a second device in accordance with one exemplary illustrative non-limiting implementation of the exemplary illustrative technology herein at 1000. A wireless second device (1100), such as a PDA, laptop or desktop computer, cell phone, or the like, includes communications interface ("TMA", 1120), which is described in more detail below and in FIG. 2. Device 1110 processes wireless application tasks specified using computer program code devices (hereinbelow called "nodes") that are configured to be transmitted from a first device for receipt and processing on second device 1110. The nodes are a collection of managed objects or managed object representations effective to control aspects of the second device as described in greater detail below, and are defined using a Task Description Language ("TDL") that is also detailed below. Device 1110 communicates through a wireless communications network (1200) that includes a gateway (1210) which is in communication with a computer network (1300) that includes a first device. Network 1300 includes various components, including a server device (1305) hosting back end applications (1310, 1320) that are configured to send data to, and receive data from, device 1110. A display device (1330) provides an interface to a UI Server (1420) that is described in detail below. Device 1100, wireless communications network 1200 and computer network 1300 are composed of components having designs, materials, and methods well known to those having skill in the art. Examples of suitable communications networks include wire-based Ethernet networks or wireless networks such as those supported by various pager and mobile phone companies.

Back end applications 1310 and 1320 preferably communicate with device 1110 through a task management component ("TMC", 1400), which in the illustrated example includes an XML Integrated Server (1410) and the above-mentioned UI Server 1420, both of which in turn pass data to, and receives data from, Task Processing Component ("TPC device", 1500). TPC device 1500 creates, manages, stores, and otherwise processes TDL and nodes, including processing the responses from a user of a disparate device as dictated by the TDL specification. The details of both components 1400 and 1500 are described in detail below. Components 1400 and 1500 can be integrated into a single component in addition to being implemented as one or more separate server devices and database components as shown in FIG. 1. In addition, the each component of the TMC and TPC device is scalable, i.e., the component may be replicated to support more devices. Multiple instances of components of the TMC and TPC devices can also be clustered to provide greater capacity. The technologies used to construct the TMC can include relational and object databases, XML parsers, XML translators, and other programming tools and techniques known by those skilled in the art.

XML integration and UI servers 1410 and 1420 construct and transmit data encoded as Task Description Language ("TDL") forms, described in detail below, which are received in TPC device 1500 by a Session Server (1510). The session server allows multiple TDL documents to be received from the XML integration server and UI server and stored in a Device and TDL Storage (1520) to support the re-use of common workflows, business objects, instruction sets and the linking between different sets of TDL specifications. A node generator ("NG", 1530) translates the TDL specifications into nodes that are transmitted to disparate devices such device 1110. Node generator 1530 optionally stores the generated nodes in node storage 1540 or device and TDL storage 1520 within TPC device 1500. Actions or other links are performed as specified by the TDL specifications in conjunction with XML integration server 1410, UI server 1420, or session manager 1550. Such actions may modify data or invoke external forms or URL links at the server device as described below. As a result of these actions, additional TDL specifications may be sent to session server 1550 for use by devices such as device 1100.

Session Manager 1550 retrieves (or receives) the nodes from NG 1530, node storage 1540, or device and TDL storage 1520 and facilitates the transmission of these nodes to disparate devices such as device 1110. The Session manager includes a Dispatch Module (1560) ("DM", described below) and a Node Storage Module (1570), ("NS", described below); so the session manager is also a device as defined herein. Conversely, user responses sent from device 1110 are received by Session Manager 1550, stored in at least one of Node Store 1570, node storage 1540, and device and TDL storage 1520.

Although FIG. 1 illustrates a wireless disparate device for illustrative purposes, the term "disparate device" will be defined herein to include not only wireless devices, but also terminal devices, emulated devices, and server devices. Aspects of the exemplary, illustrative technology are equally applicable to all classes of devices that experience intermittent connectivity, such a laptops and PDAs that are intermittently connected to a company LAN. Furthermore, Session Manager 1550, dispatch module 1560, and node storage module 1570 can be embodied in any device, including server devices hosting back end applications such as shown in the Figure at 1305. In addition, although FIG. 1 shows communication between a first device (e.g., a device contained within network 1300) and a second, disparate device (e.g., device 1100) it will be appreciated by those of skill in the art that an arbitrary number of devices can communicate with each other in accordance with the technology herein as described herein. In addition, since both network 1300 and device 1100 each include a DM and an NS, both can function as "devices" as defined herein; therefore, it will be understood by those of skill that the roles described among devices can change according to the nature of the communication between the devices, i.e., each device can function as the second device or the first device. Thus, the exemplary illustrative technology herein includes communications among all types of devices.

The TDL describes how text, data handling elements (yes/no fields, fill-in fields, multiple selection lists, and so on), data, images, sound, and other kinds of content are presented on the device, the management of these elements, and the flow of control for processing these elements (both within the device and throughout the system architecture). The specification is preferably general enough to work with various types of devices and not specific to a particular kind of device. Common computer language constructs such as typed variables, loops, conditional expressions, and other constructs may also be employed. While the exact capabilities supported by the TDL may vary, the ability to describe display information and manage responses to queries is minimally required. In addition, the TDL specifies how the content presented at the device is associated with business processes supported by TMC 1400. This association is preferably an action that is performed using information presented or collected at the device, or in response to a specific type of information having been collected at the device. The action may comprise the further processing in accordance with TDL specifications or the interaction with data at disparate devices. Examples of such actions include the invocation of URL links, sending or receiving web service requests and responses, electronic transfers of information to or from the TMC, the execution of specific application programs, the merging of external data into nodes, or the modification of business objects stored at the TMC component.

The TDL can be specified in various ways using techniques known to those of skill in the art. Preferably, the TDL is specified as a data type definition (DTD) or an XML schema. The use of XML in specifying structured information such as the TDL is well known and can be implemented by one of ordinary skill in the art. As is common for XML formats, the term "TDL document" will be used herein to refer to an XML document based on a TDL specification. Note that each TDL document may describe a single task or multiple tasks. A specific task to be performed by the user on device 1110 will be referred to as a "TDL task". The TDL may also be used to specify reusable forms and content that are dynamically made part of other TDL specifications. When specified in this manner, a TDL document is referred to as a "catalog" or a "template".

An Exemplary Illustrative Non-Limiting Mobile Device

Figure 2:
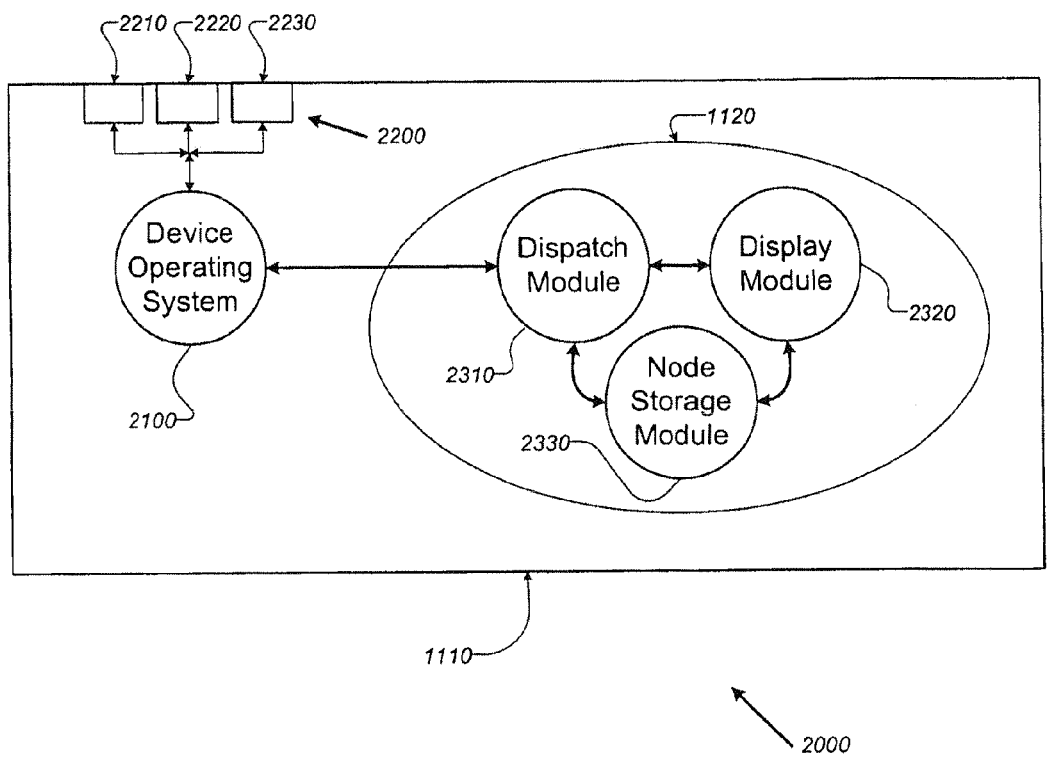
FIG. 2 shows a schematic diagram of a device in accordance with the exemplary illustrative non-limiting technology herein.

Device 1110 is described in greater detail at 2000 in FIG. 2. Device 1110 includes a Device Operating System (2100) of standard construction known to those having skill in the art, including, for example without limitation, the WINDOWS or WINDOWS CE operating system available from Microsoft Corporation, UNIX, LINUX, MACOS, SYMBIAN, RIMOS, and PALMOS. Still other devices may not have an operating system per se, but provide an environment for running Java 2 Micro Edition (J2ME) programs, Binary Runtime Execution Environment (BREW) programs, or similar execution programs and environments. In these cases, the execution environment is considered to be acting as the operating system.

A Device Interface (2200) provides a means for converting data to signals compatible with network 1300. The device interface may implement wired- or wireless communications protocols. An example of one such wired communications protocol is TCP/IP. Examples of a wireless communications protocol include WAP, 802.11x, and equivalent telephony protocols for wireless telephones. The selection and management of the device interface is made under the control of Device Operating System 2100. Each device may be constructed with one or more communications interfaces, which enable the device to simultaneously communicate on multiple networks.

TMA 1120 manages and coordinates the operation of the exemplary illustrative technology herein upon device 1100. TMA 1120 is often referred to herein simply as the "client". In simplest form, TMA 1120 receives messages from TPC device 1500 through the communications network, device operating system 2100, and at least one device interface (e.g., device interface 2210); manages the instructions encoded in the messages, and sends responding messages back to TPC device 1500 containing device and user responses, additional commands, and collected information (again through the device operating system and the selected device interface).

As will be appreciated by those having skill in the art, the design and implementation of the TMA depends on the details of device operating system 2100. The requirements for the TMA additionally depend on the task description language (TDL) specification used and the message protocol defined between the TPC device and the device. Note that this message protocol includes the format of the nodes for encapsulating device-specific information in TDL specifications. In general, TMA 1120 is written in a compiled version of a programming language supported by the device.

In one exemplary illustrative non-limiting implementation, the TMA also implements the "self-healing" feature provided by the exemplary illustrative technology herein, which feature will now be described in greater detail. One of the persistent problems of implementing mobile device systems is that they may occasionally lose synchronization with the TMC 1400. Without self-healing capabilities, the TMA may crash, return erroneous or incomplete results, or take other actions that may not be consistent with desired processing. Logic to detect inconsistencies between the device and TMC databases is interleaved into the various TMA components and may be present in some or all components. Generally, these tests are performed when nodes are added or removed from the node storage module, and are performed by all of the TMA components. Tests that are performed include, for example:

| Device Condition | Possible Reasons | TMA Action |
| --- | --- | --- |
| Completed processing all queued messages on the TPC device and not in low resource situation | n/a | Ask TPC device for checksum If checksum on device and TPC device do not match, then request to recreate device session. |
| Completed processing all queued messages on the TPC device and in low resource situation | n/a | No action |
| No Tasks on the device | There is no task tree The data is corrupt on the device The data is missing on the device | Rebuild the device indexes and ask for checksum. If still no task tree ask TPC device for checksum. If unauthorized response, then all is fine, otherwise request new device session. |
| Can't find parent node during message processing | Device session is inconsistent between the device and the TPC device. | Request a new device session |
| Can't find previous sibling during message processing | Device session is inconsistent between the device and the TPC device. The TPC device has made an error in assigning the previous sibling node | Ignore and continue (We will eventually catch a bad checksum anyway) |
| Duplicate node | (Most likely cause) A message is received twice due to a disconnection between the device and TPC device while picking up and processing messages (Least likely cause) An inconsistency occurred between the device and the TPC device. This is very unlikely without seeing other symptoms | Ignore and continue |

Returning to FIG. 2, in one exemplary illustrative non-limiting implementation, TMA 1120 includes a Dispatch Module (2310) to manage the communication between TPC device 1500 and device 1100, a Display Module (2320) to present information encapsulated in the nodes to the user and receive responses required from the user, and a Node Storage Module (2330) to store the nodes and responses on the device and make them available to dispatch module 2310 and display module 2320.

Dispatch Module ("DM")

Dispatch module 2310 ("DM") manages the communications aspects between device 1100 and a second device such as TPC device 1500. The DM monitors and receives incoming data messages from the TPC device, assembles, checks, and stores them in the node storage module, and performs any system processing required by the node(s). It also monitors nodes whose status has changed or for which data has been collected in the node storage module, and asynchronously updates the TPC device with the information and status of these changed nodes. It manages the state of the communications and implements the interface selection and send/retransmission logic for nodes as required, as well as implementing the node attribute specifications including synchronization, encryption, and signing.

As noted above, the exemplary illustrative non-limiting nodes include defined mechanisms for node management by the DM in accordance with the attribute(s) assigned to the nodes. Several exemplary node attributes are described below. However, those of skill in the art will recognize that other attributes can be defined within the scope of the exemplary illustrative technology herein, and further, that the detailed mechanism by which the nodes are managed can also vary within the scope of the exemplary illustrative technology herein. Furthermore, each of these techniques may be applied separately to a single node, to a group of nodes, or to all nodes. Nodes may be grouped logically, in processing order, or in an order specified by the TDL.

In one exemplary illustrative non-limiting implementation, the nodes are protected for integrity to ensure that they are not tampered with while stored on a device and to ensure that they are not corrupted during transmission. Traditional techniques that may be used for protecting integrity of node include checksums and cyclic redundancy checks over the node contents. Cryptographic techniques include digitally signing a node or group of nodes using cryptographic digests such as those produced by well-known algorithms such as MD5. Groups of nodes may be similarly protected using the above techniques, or using alternative mechanisms such as manifests that contain cryptographic or protection information.

In other exemplary illustrative non-limiting implementations, the nodes are configured to protect their contents using encryption algorithms. In some such exemplary illustrative non-limiting implementations, the nodes managed in this way have their contents made inscrutable. Nodes may be protected using symmetric cryptographic techniques such as DES, or they may be protected using asymmetric cryptography. Encryption keys and digital certificates may be associated with specific authorized users and/or devices, permitting the system to protect nodes while they are stored on a specific device, and while they are being transmitted between devices.

In some exemplary illustrative non-limiting implementations, nodes may be compressed to conserve space while nodes are stored in a device or while they are being transmitted between devices. Compression is especially advantageous when transmitting a plurality of nodes between devices.

In other exemplary illustrative non-limiting implementations, each node has internal specifications to determine whether it is "complete", i.e., that it is eligible to be synchronized by the node management mechanisms. As used in this context, "complete" or "completion" refers to whether the device has determined that the node includes all of the information associated with that node type and is not expected to be further modified. The results of the determination are recorded in the CompletionStatusFlag of the node. Such a determination can be implemented in various ways, as will be apparent to those having skill in the art. In general, defining a state of "completeness" for a node will depend on the node's type (see below) and its intended function.

By way of example and not limitation, determining whether a node is complete can include observing that the user of the device has finished entering information relevant to the node (e.g., by navigating away from that part of the user interface that accepts information relevant to the node's function); and is determining whether the data satisfies the node's condition for completeness. In other cases, completion may be determined based upon the existence of information stored within the node. This is exemplified by an associated node (see below), in which the node is associated with an external data value. If the data value is present and available to the node, the node may be considered complete.

Node completion also may be considered in light of the processing hierarchy, which can lead to varying definitions of completeness. For example, parent nodes (i.e., nodes having multiple "children") can be considered to be complete when all of their children are complete. Alternatively parent nodes may specify that they are complete when any child node, or a subset of child nodes, is (are) complete. Lastly, node completion may be considered in light of completion of a specified interface to an external program. A node that specified a callout to an external program may have a completion status related to the completion status of the program it called.

In another exemplary illustrative non-limiting implementation, the DM enforces synchronization logic in accordance with the completeness attribute described above. The implementation of this logic can be accomplished using methods known to those of skill in the art. In yet another exemplary illustrative non-limiting implementation, the nodes are configured to specify the synchronization their data with nodes on other devices. In one exemplary illustrative non-limiting implementation, the synchronization occurs at the completion of a specific operation (e.g. the CompletionStatusFlag is set). In another exemplary illustrative non-limiting implementation, the synchronization occurs at a predetermined interval.

In yet another exemplary illustrative non-limiting implementation, a node may have an attribute that describes whether the node should be sent out-of-band using an unreliable out-of-band channel. The preferred out-of-band channel on TCP/IP-based networks is a datagram, which has lower transmission overhead. In still another exemplary illustrative non-limiting implementation, the dispatch manager recognizes the "transmit OOB" attribute associated with the node and uses a low-overhead transmission mechanism to transmit the node to the remote device. In preferred exemplary illustrative non-limiting implementations using TCP/IP networks, the dispatch manager uses datagrams instead of sockets to reduce the overhead of using a socket connection.

In some exemplary illustrative non-limiting implementations, the nodes are assigned a management attribute that specifies how data stored within the node should be treated by the system. Examples of these attributes include: read-only, read-write, and write-only. Read-only and read-write are well understood; write-only nodes are advantageous when information is automatically inserted into a node, for example, by a GPS contained within a mobile device. The device respects the write-only attribute by prohibiting changes to the node once information has been stored in the node.

For all exemplary illustrative non-limiting implementations, the DM manages the nodes with respect to their node attributes as it is best able given the circumstances considering such factors as the state of the communications link between the device 1100 and the TPC device. Management of nodes with respect to their management attributes provides reassurance to organizations deploying mobile devices that their information is being appropriately managed and protected against failures of a device or malicious attacks. There are also optional instructions to the DM that help the DM optimize its processing of nodes. Generally, these instructions permit the DM to temporarily override its default handling of node management in accordance with node attributes. One such optional instruction is the "suspend communications" instruction, that instructs the DM to temporarily suspend the synchronization and communications of nodes to permit a current request to complete. It is advantageous to use a "suspend communications" instruction when a large number of nodes are being added to the node store. Suspending communications permits the DM to consolidate many nodes together for transmission, substantially reducing the communications overhead and adding effectiveness to transmission compression schemes. When the "suspend communications" instruction expires, or when the DM receives a "resume communication" instruction, the DM resumes sending nodes from the device.

The dispatch module processes the communications aspects in either a true asynchronous mode or in a "virtual" asynchronous mode, depending upon the capabilities of the device operating system. In a preferred exemplary illustrative non-limiting implementation in which the device operating system supports multi-threaded applications, the dispatch module creates two sets of threads. The first set of threads monitors, receives, and processes incoming messages. The second set of threads monitors the node storage module and manages the transmit queue for the device.

Figure 3:
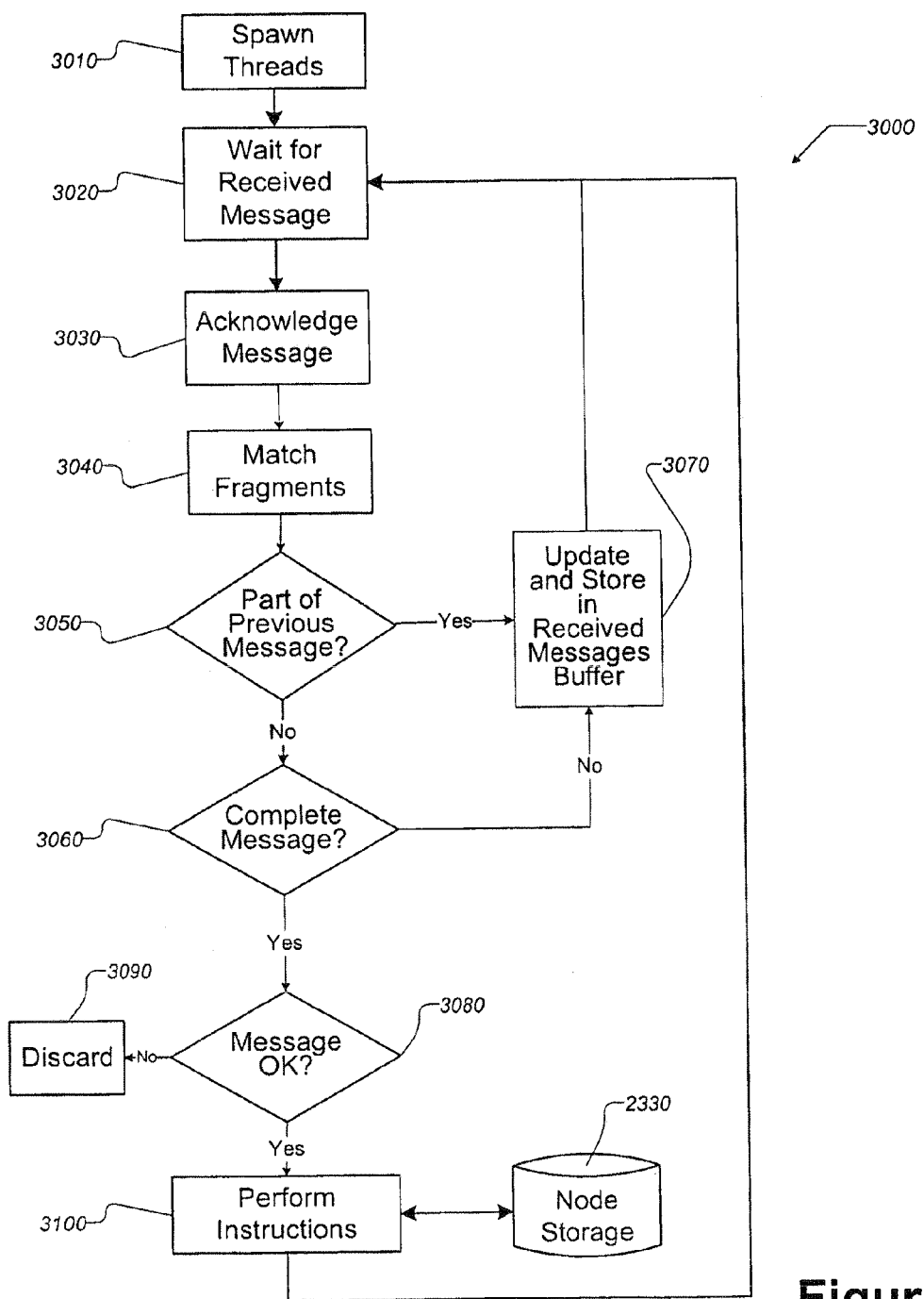
FIG. 3 illustrates an exemplary illustrative non-limiting implementation of a basic control mechanism associated with the "receive" portion of the dispatch module.

FIG. 3 at 3000 is a flowchart of the basic control mechanism for the "receive" thread in accordance with one exemplary illustrative non-limiting implementation.

The DM "receive" thread starts by creating at least one "receive" thread to listen for incoming message traffic. This mechanism is shown in the process block labeled "spawn threads" (3010). Depending upon traffic volume, the processing speed of the device, and other factors, it may be desirable to create more than one "receive" thread, or, conversely, to limit the number of "receive" threads that may be created.

The DM waits until it receives at least one message from the TPC device over at least one of the network interfaces. This is illustrated by the "wait for received message" block in the figure (3020). Upon receipt of a message, the DM optionally decrypts, decompresses, and examines the message to determine if it is complete, is part of a previously received message fragment, or is a complete message.

The DM "receive" thread acknowledges the message it has received back to the sender (3030). The acknowledgement is queued and managed by a DM "send" thread as described below in FIG. 4. If a remaining part of a message arrives, it is matched to its predecessor message fragment(s) as illustrated by the process block labeled "match fragments" (3040). The message status is checked to determine if the message is now complete, shown by the decision box labeled "Complete message?" (3060). If the determination is "No", then only part of the message was received, and the DM stores the message fragment in a received messages buffer and returns to waiting for the rest of the message (3070). Otherwise, after the completed message is received, it is checked to determine if it is a valid, complete message that has not been damaged in transmission. If messages have been optionally encoded using encryption, compression, or special character processing, these optional encodings are reversed as part of this process. This is indicated by the process block labeled "Check message" (3080), which can be performed using known methods such as a checksum or digital signature. If the message does not pass its checks, it is discarded as shown by the "N" branch from the "Check message" process block (3090).

If the message is complete and valid and contains nodes, node updates, or node linkages, then these items are stored in the device's node storage by the node storage module (2330). If more than one node was transmitted in the message, the dispatch module expands and stores all the nodes and node linkages contained within the message. If the completed message contains other instructions to the device (such as a node ACK or a device reset), these instructions are performed by the dispatch module. This is represented by the process block labeled "Perform instructions" (3100).

Upon completion of processing for the received message, the "receive" thread clears its state information and loops back to wait for the next message to be received.

Figure 4:
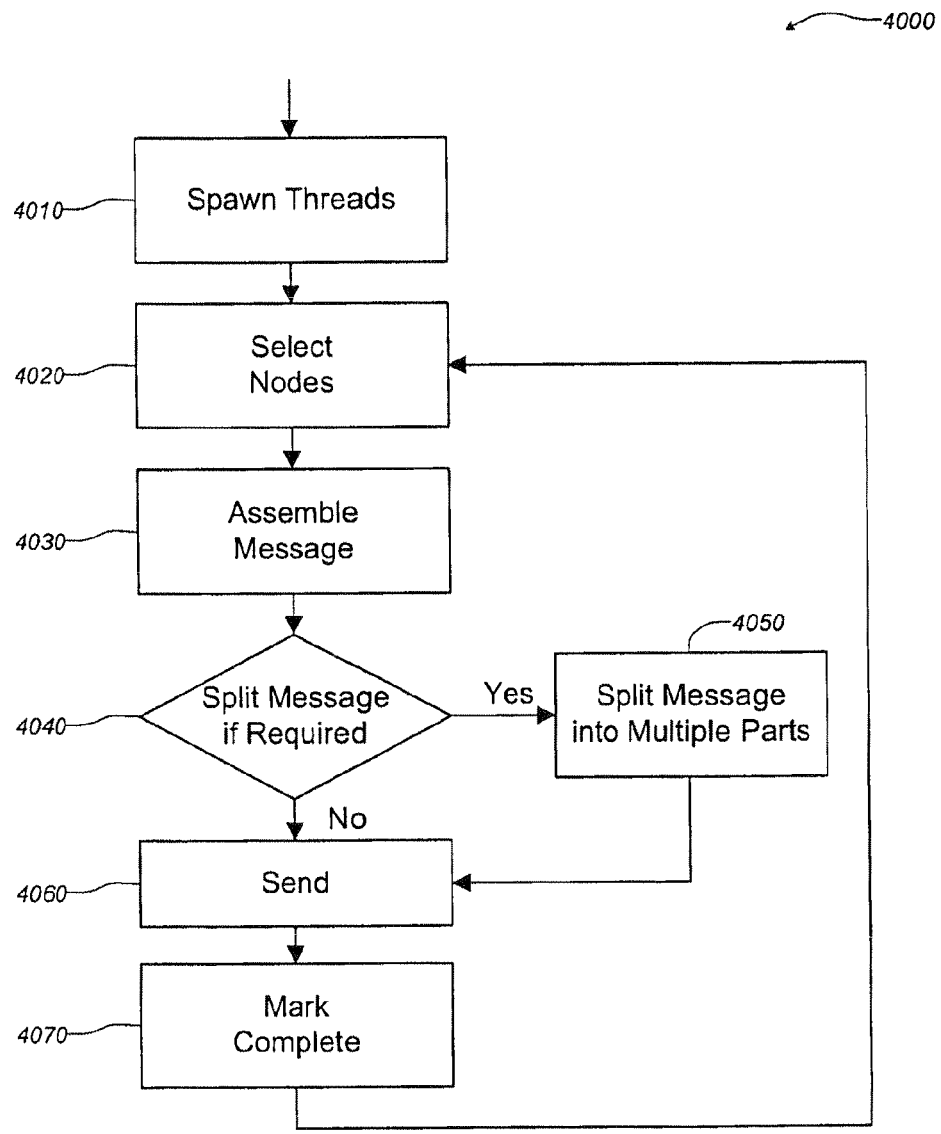
FIG. 4 illustrates an exemplary illustrative non-limiting implementation of a basic control mechanism associated with the "send" portion of the dispatch module.

FIG. 4 is a flowchart of the basic control mechanism for the "send" thread (4000). The DM "send" thread starts by creating at least one "send" thread to package and transmit outgoing message traffic. This mechanism is shown in the process block in the Figure labeled "spawn threads" (4010). Depending upon traffic volume, the processing speed of the device, and other factors, it may be desirable to create more than one "send" thread, or, conversely, to limit the number of "send" threads that may be created on a specific device.

The "send" thread selects either pending commands or scans the node storage module looking for node(s) that must be sent to the TPC device for processing, or for acknowledgement queued to be sent. Nodes are considered eligible if they any of a number of criteria, including time of most recent access or update, having unsent information, being marked as complete and unsent, and/or the type of network connection that must be made to send the node. This step is represented by the process block labeled "Select Nodes" (4020).

All selected nodes are grouped together and a message containing these nodes is sent to the TPC device (4030). If the message containing the nodes is too large to be sent using the available communication method, a smaller subset of nodes is selected or the message is fragmented. The technique for selecting an appropriate number of nodes to include and/or deciding how to split the resulting packet into transmission sized pieces is selected based upon the type of device, the type of communications desired, and the type of information in the node. This decision is represented in the process block labeled "split message?" (4040). The resulting message fragments are then queued for processing (4050).

For each message or message fragment to send, the "send" thread performs any necessary encryption and/or compression, computes any integrity checks (e.g., checksums or digital signatures) and tries to send the message to the destination device using the desired device interface (4060). Once the send succeeds, the "send" thread marks the corresponding nodes as requiring acknowledgement (4070).

If the device operating system does not support threads, the foregoing procedure can be implemented using virtual threads. Those having skill in the art understand how to implement a virtual threaded environment using a state machine or other programming technique.

In one exemplary illustrative non-limiting implementation, if a node sent from the DM goes unacknowledged for a period longer than the predefined acknowledgement wait period, then the node will again become eligible for (re)transmission to the destination device. The DM will then re-select the node and transmit it again as just describe as communication and message traffic permits.

The protocol used to send messages between devices can take a number of forms. Preferably, the protocol supports the following design requirements:

The protocol allows nodes to be divided into segments to support communication networks with size restrictions.

For example, some two-way pager providers restrict the length of each message to 500 characters.

The protocol supports two-way communication. That is, data can be sent from a first device to a second device as well from a second device to a first device (e.g. to encapsulate user responses and return collected information).

Additional features may also be available, such as compression, encryption, protection for integrity, and the encoding of special characters defined by the communications network are not used or are encoded in some special manner. For example, some two-way pager providers attach special meanings to certain characters. As a result, these characters cannot be sent over the air to or from these devices without special encoding.

Preferably, the protocol permits textual messages of delimited fields containing ASCII characters to be sent between devices. The low level network communication protocol is selected based on the type of device and low level protocols supported. For computer devices connected to the Internet, the TCP/IP protocol is preferred. For wireless networks, TCP/IP is preferred. Alternatively, WAP, SMS, and other wireless protocols may be used.

A sample protocol that conforms to these requirements is presented below. In this sample protocol, we refer to an originating device and a receiving device. For messages sent between a TPC device and a device 1100, the originating device is the TPC and the receiving device is device 1100. In alternate exemplary illustrative non-limiting implementations, the roles may be reversed and the originating device may be the device 1100 and the receiving device may be the TPC device, or the communication may be between a first device 1100 and a second device 1100.

The sample protocol encodes each message in ASCII for transmission over non-segmentable message networks. When using the preferable network protocols, many of these features may be performed by the underlying network protocol.

Preferably, each message in the protocol comprises a message header, a message body, and optional message integrity check value, and an end of message (EOM) marker.

[MSG_HEADER][MSG_BODY][INTEGRITY][EOM]

If the message is too long and must be divided into segments (to accommodate restrictions imposed by the communications network where the communications network does not provide segmentation transparently to the device), then a segmentation header is also present:

[SEG_HEADER][MSG_HEADER][MSG_BODY][INTEGRITY][EOM]

Finally, a character at the front of the message encodes what type of filters must be applied such as segmentation, special character handling, compression, and encryption. This character is called the filter character.

Depending on the type of device receiving the message, an additional header may also be required. For example, in some device operating systems, additional routing information is required to allow the device to present the message to the proper application.

For messages between devices, these conventions result in the following general format:

[FILTER][SEG_HEADER][MSG_HEADER][MSG_BODY][INTEGRITY][EOM]

Having described a general format for the message protocol, a detailed example of such an encoding will now be described.

Many types of [FILTER] switches previously discussed are supported: segmentation, special character handling, compression, and encryption. This information is encoded as a single character representing a hexadecimal number from 0 to F of the 16 possible combinations. If represented as binary, each bit (off=0, on=1) represents segmentation, special character handling, compression, and encryption, respectively. Thus, the binary number 0000 (hexadecimal number 0) is the case where all settings are off; while the binary number 1111 (hexadecimal number F) is the case where all settings are on. Similarly, the binary number 1010 (hexadecimal number A) is the case where segmentation is on, special character handling is off, compression is on, and encryption is off. Other combinations are similarly encoded. In some exemplary illustrative non-limiting implementations, the [FILTER] switches are encoded as multiple characters to represent additional capabilities provided by the message protocol.

The segmentation header portion of the message ([SEG_HEADER]) is only present if the segmentation bit in the [FILTER] is on. This header preferably has three separate fields:

Message ID (5-digit number)—a unique message identifier for the associated message. All segments of the message will have the same message ID.

Segment Quantity (2-digit number)—the total number of segments that comprise the given message.

Segment ID (2-digit number)—a unique sequence identifier (for this message) for the given segment.

For example, if the number 12345 is assigned to a segmented message with three segments, then the three segment headers for the message would be 123450301, 123450302, and 123450303. Note that the example messages shown herein do not use any segmentation. This is to improve the readability of the examples.

The [MSG_HEADER] portion of each node encodes the version number of the format specification, and the type of message contained in the node, and a timestamp. The version and message type are each one character. The version used herein will be "1" to represent version 1.0, "2" to represent version 2.0, etc. The time stamp is a 10-digit number representing the date and time encoded as the number of seconds since Jan. 1, 2000 in Greenwich Mean Time.

As a result, the message header is a 12-digit number. For example, the message header 130030987000 would indicate a version 1.0 message containing an Update Device Setting message ('3'). The timestamp is 30,987,000 seconds since Jan. 1, 2000 (GMT), which corresponds to Dec. 25, 2000 at 3:30:00 p.m. For some devices, it may not be practical to determine GMT. In this case, the device sends a timestamp in its local time, and the conversion to GMT can be performed at the receiving device as required.

The format for the [MSG_BODY] portion depends on the exact type of message specified in the message header. In general, each message body is composed of a repeatable set of fields, where each set is referred to as a record. A message body is a set of records separated by end of record markers. The end of message marker indicates the end of the final record. The following conventions are used.

Each field in the body is delimited by a pipe character '|'

Each value in a multi-value string is delimited by a comma character ','

Each end of record (EOR) is delimited by an asterisk character '*'

The end of message (EOM) is delimited by a double asterisk "**"

When any of these delimiter characters appear in normal text strings, they are preceded by a backslash character '\' to distinguish them from the special meanings shown above.

Preferably, a different message body is used for update device messages, update device setting messages, and send update report messages.

The types of messages supported from the originating device to the receiving device, each requiring a different message body, include the following:

Update Device ('0')—a new set of nodes representing the beginning of a TDL specification that should be processed on the device. Any existing nodes stored on the device are discarded and replaced with the new set. When received by the TMA on the device, this message type initiates processing of nodes beginning with the first node in the provided set.

Update Device Node ('1', '5', '6')—a partial set of nodes representing an update or continuation of the TDL specification already on the device. Existing nodes stored on the device are preserved, although the provided set replaces any existing nodes with matching node identifiers. Insert operations ('5') that cause a new node to be inserted into the device, and delete operations ('6') that delete a specific node and all its dependencies are also supported.

Notify Device ('2')—contains information for sending a notify message to a device.

Update Device Setting ('3')—an update message for local device settings. One or more preferences or system setting updates are provided. These updates are applied and the device reconfigured with no need for user intervention.

Reset Device ('4')—a message that contains instructions for resetting part of all of a device. Options include resetting passwords and resetting the entire device.

Definition Type ('7')—a message that contains definitions and templates sent from the server device to the device. Types of definitions include catalog, invoice, work order, and other business object definitions.

Definition Forward Declaration ('8')—a message that tells the device what Definition Types it needs to have stored. When received by the device, if the specified catalog or template is not present at the device, it is requested from the server-device.

Similarly, the types of messages supported from the receiving device to the originating device include the following:

Send Update Report (the character '0' or '1')—a report on the user's responses. Any node can specify whether a report should be sent on the subtree for which it is the root. The report can be sent when the node is first visited (character '4') or when the node is complete (character '7'). The definition of complete depends on the TDL specification. In the sample TDL specification in FIGS. 7a-7d, a node is considered complete based on the value of the "completeWhen" element in the corresponding "field" element.

Notify Server-device (the character '2' or '3')—a report that updates the server-device status of transmissions or other housekeeping activities.

It is appreciated that the exemplary illustrative non-limiting implementation is extensible using TDL or other mechanisms to support additional message types beyond those described above with minimal programming.

1.1.1 Originating Device to Receiving Device Messages 1.1.1.1 Update Device and Update Device Node Message The Update Device message body defines a set of nodes corresponding to the start of a TDL specification. Preferably, the node format discussed below also serves as the record format. Each record (that is, each node) is separated by an asterisk "*" character.

Alternately, the record format for the Update Device message type is optimized to remove the fields set by the device. In particular, the CompletionStatusFlag should always be 0 (incomplete) and the Response Text should always be empty. In this exemplary illustrative non-limiting implementation, fields such as these are not included in messages sent over the communications network to optimize the available space. Instead, such fields are automatically inserted after the device receives the message.

Similarly, the Update Device Node message body defines a set of nodes to augment the existing nodes already stored on the device. The node format previously discussed once again serves as the record format, with each record separated by an asterisk.

For Update Device messages, the dispatch module determines the set of nodes provided, notifies the node storage module to replace all nodes currently stored with the new set of nodes provided, and notifies the display module to begin processing the first node in the set. Any nodes in the provided set that match a previously stored node replace information in the stored node with the new definition. Note that node fields that are only set current device are not overwritten here. In particular, if a CompletionStatusFlag or a response text entry for a node already exists, they are not replaced as a result of this message.

1.1.1.2 Notify Device Message

For Notify Device messages, the dispatch module notifies the display module of the message to "pop up" on the device, as well as expected response information and button options.

1.1.1.3 Update Device Setting Message

The Update Device Setting message updates a set of preferences or configuration settings on the device. Each record for this message type comprises the following fields:

Parameter (2-digit number)—the parameter to update. Additional parameters can be added, but the following provides an illustrative list (the meaning of these parameters are discussed when describing the TMA herein):

00—Password
01—Password Maximum Retries
02—Password Reset
03—Password Reset Threshold (in seconds)
04—TPC device contact address
05—Idle Timeout Threshold (in seconds)

Value (character string)—the new value for the parameter.

For Update Device Setting messages, the dispatch module determines the device settings provided and modifies the given settings with the new values.

As an example, consider the following complete message containing two Update Device Setting records:

6|300314253644|server@myserver.com*5|1800**

In this example, '6' is the filter bit. This is the hexadecimal form of the binary number 0110, so that segmentation is off, special character handling is on, compression is on, and encryption is off. The message header is "130031425364," or Version 1.0, message type Update Device Setting ("3"), and timestamp 31,425,364 seconds since Jan. 1, 2000 (GMT). The message body contains two records: "4|server@myserver.com" and "5|1800." Note that the first asterisk marks the end of the first record, while the double asterisk marks the end of the second record as well as the end of the entire message. The first record sets the TPC device contact address to server@myserver.com while the second record sets the idle timeout threshold to 1800 seconds.

1.1.1.4 Reset Device Message

For Reset Device messages, the dispatch module performs a partial or complete reset of the device. Device resets are used to reset passwords, or to recover the device from an unusable or unrecoverable state. It will be appreciated that the Reset Device messages also may be used to support remote commissioning/decommissioning of devices, such as when a device is replaced because it failed, or when a device is handed off between two users.

1.1.1.5 Definition Type Message

The Definition Type message and Definition Forward Declaration message define the reusable features of catalogs and derivative business objects (e.g. Invoices). A catalog, CatalogItem, and derivative items are sent once to a device, and then referenced from specific tasks as required.

For Definition Type messages, the dispatch module uses information contained within the message to define catalog items that will be referenced by other nodes. For example, one type of Definition Type message defines as a catalog the format for a printable invoice, and defines the elements that must be provided in order to complete the invoice form.

Definition Type messages describe repeatable information used by the exemplary illustrative technology herein. In a preferred exemplary illustrative non-limiting implementation, they define the following field types:

Definition ID
Definition Type
Definition Items

A DefinitionID field is a number that is preferably between 0 and 99. DefinitionIDs are unique across specific definition types. Definition IDs are used as "names" for specific definition specifications.

A DefinitionType field that defines the type of the definition. In a preferred exemplary illustrative non-limiting implementation, DefinitionTypes include:

| DefinitionType | Description |
| --- | --- |
| 1 | Invoice Definition: defines the static portions of an printable invoice |
| 2 | Catalog Definition: defines a catalog of item kinds that can be entered as an invoice line item |
| 3 | Work Order Definition: |

A DefinitionItem is used to define the repeatable/static components of an invoice. In one exemplary illustrative non-limiting implementation, the fields defined for a DefinitionType='1' (Invoice Definition) include:

| Field Name | Type | Description |
| --- | --- | --- |
| Company Name | VarChar | Company Name |
| Address Line 1 | VarChar | Items to include in Company Address Line 1 |
| Address Line 2 | VarChar | Items to include in Company Address Line 2 |
| Address Line 3 | VarChar | Items to include in Company Address Line 3 |
| Address Line 4 | VarChar | Items to include in Company Address Line 4 |
| Address Line 5 | VarChar | Items to include in Company Address Line 5 |
| Company Tag Line | VarChar | The tag line |
| Invoice Footer | VarChar | Paragraph of text to be included at the bottom of the receipt |
| Include Signature line | Boolean | Indicates whether or not to include the signature line |
| Logo Name | Char(5) | 5 character name representing the logo name which has previously be down loaded to the printer |

It will be appreciated that the fields defined for each Definition Type, the types of these fields, and their descriptions may be adjusted by updating the TDL that defines them.

Further in the preferred exemplary illustrative non-limiting implementation, a DefinitionType='2' is used to define a repeatable set of Catalog items. The set of Catalog items listed below describe the items that may be included in an InvoiceLineItem object. Each CatalogItem has the fields specified below. Each field within the CatalogItem is delimited by an EOF ('|') character. Each CatalogItem within the catalog is delimited by an EOR ('*') record.

| Field Name | Type | Description |
| --- | --- | --- |
| catalogItemId | Char(4) | A unique item number - generated by a sequence number. The ID is unique to all catalogs. |
| Name | Char(20 or less) | A one or two word descriptive name of the item |
| Descr | Char(256 or less) | A short descriptive sentence |
| Billable | Boolean | 0 = not billable (price does not apply) 1 = billable |
| billingType/ billingUnits | String | String indicating the billing units used. On the device, used for display purposes only |
| Unit Price | Number in cents | The amount to be charged to the customer per each or hourly change. If the price is not specified (empty), then the price must be edited in the field. |
| min billing time/ minimum quanitity | Number in minutes if hourly, otherwise in the units described in billingUnits | The minimum time/quantity that can be billed for this catalog item. |
| rounding rule | Number in minutes if hourly, otherwised in the units described in billingUnits | Billing quanity is rounded up by this interval. Default value is 1 |
| Taxable | Boolean | 0 = not taxable 1 = taxable Note: tax rate is specified in the Invoice Node (see below) |
| quantity on hand | Number | number of items in inventory when this catalog was sent to the device |

1.1.1.6 Definition Forward Declaration Message

A Definition Forward Declaration message defines catalogs that are required. In the preferred exemplary illustrative non-limiting implementation, the Definition Forward Declaration message defines the catalog references for specific nodes. In this exemplary illustrative non-limiting implementation, the following fields are specified by a forward declaration message:

Node ID
Definition Type (see above)
Definition ID
Definition version

Definition Forward Declarations would be used in the exemplary illustrative technology herein to define reusable objects required by a specific task. For example, if a task was defined to collect information and print an invoice, a PrintingNode (see above) is defined within that task. That node is numbered 35 after conversion from TDL to nodes, and references an invoice specification named="01", version 3. The forward declaration message that is sent to the device defines the following fields and their respective values:

Node ID=35
DefinitionType=2
Definition ID=01
Definition Version=003

For Definition Forward Declaration messages, the dispatch module uses information contained within the message to tell the device what definition types it needs to have stored. If the definition types are not present in the receiving device, it returns a request to the originating device for the missing catalog or template.

1.1.2 Receiving Device to Originating Device Messages

The sample message protocol described herein includes multiple different response request types from the receiving device to an originating device. In this discussion, we will call the receiving device the TMA device and the sending device the TMC device, although as discussed above, any device can operate in the role of the sending and receiving devices. These response request types include:

1.1.2.1 Request Checksum Message

The Request Checksum message is sent whenever the receiving device determines that there may be an inconsistency between the receiving device and the originating device. This may occur, for example, when an Update DeviceNnode message requests a node ID that can not be found on the receiving device.

1.1.2.2 Request New Device Session Message

The Request New Device Session message is sent when the device desires a new session be created for it. This message is sent when a device is first activated, or when a device determines that its locally stored information is corrupt. The device may optionally include a catalog of its capabilities in this message.

1.1.2.3 Send Update Report Message

The send update report message is sent on behalf of a node and in response to its status flags. This message may be sent when a node is initially visited, when it is completed, or at both times. Each record in a send update report message comprises the following fields:

Update Node Identifier (4-digit number)—unique number for the node that collected the provided information from the user.

Node Info (character string)—data returned from the given node. The format of this field depends on the type of node (based on the Node Type field of the original node). In general, the first character is the completion status (0 for incomplete and 1 for complete) and the remaining characters are the return value. The format for each type of node is as follows:

Text—this type of node sends no update to the TPC device.

Yes/No—returns two characters, both either 0 or 1. The first character is the completion status; the second is the user's response of 0 (No) or 1 (Yes).

Confirm—returns a single character representing the completion status.

Fill In Text—returns variable length string. The first character is the completion status; the remaining characters are the text string entered by the user.

Navigation—returns a single character representing the completion status.

1.1.2.4 Notify Server Device Message

The notify server device message is sent to notify the originating device of exceptional activity on the device, such as password lockout. It may also be sent to notify the originating device of transmission errors or message corruption. A Notify Server device message may include the following fields of information.

Notification Timestamp
User Identifier
Message Identifier
Reason Code

1.1.2.5 Request Definition Message

The request definition message is sent to notify the originating device that a specific forward definition was not present on a device and to request that the appropriate definitions be sent.

Exemplary Illustrative Node Storage Module

Referring back to FIG. 2, node storage module 2330 supports the storage and access of nodes sent to the device. The nodes are stored in a format appropriate for the device. In the preferred exemplary illustrative non-limiting implementation, the node storage module honors the node attributes as related to storage, and encrypts, compresses, or applies other protections. In one alternative exemplary illustrative non-limiting implementation, nodes are stored as ASCII strings in a flat file similar to how they are shipped over the communications network (except with no segmentation, special character handling, compression, or encryption filtering applied). In this exemplary illustrative non-limiting implementation, the flat file is sequentially searched in order to locate or replace a specific node or specific field in a node. In an alternate exemplary illustrative non-limiting implementation, nodes are stored in a database indexed by the node identifier. Preferably, a cache of nodes is maintained in local memory to improve the performance of operations supported by this module.

Regardless of the storage format, the node storage module provides an interface to store, update, and access nodes from the dispatch and display modules. Preferably, the operations supported by this interface include replacing the stored nodes with a new set of nodes; adding or replacing a set of nodes; obtaining a specific node; finding the parent, next, or child node of a given node; obtaining one or more fields in a given node; and modifying one or more fields of a given node.

Display Module

Again referring to FIG. 2, display module (2320) handles all interaction with the user in order to perform the instructions encapsulated in a TDL specification. This module processes each node as required, displays any required information on the device screen, prompts the user for any required input, performs any callouts or necessary interaction with the device, updates the node storage module with updated node information, and informs the dispatch module when information should be sent back to the TPC device.

Figure 5A:
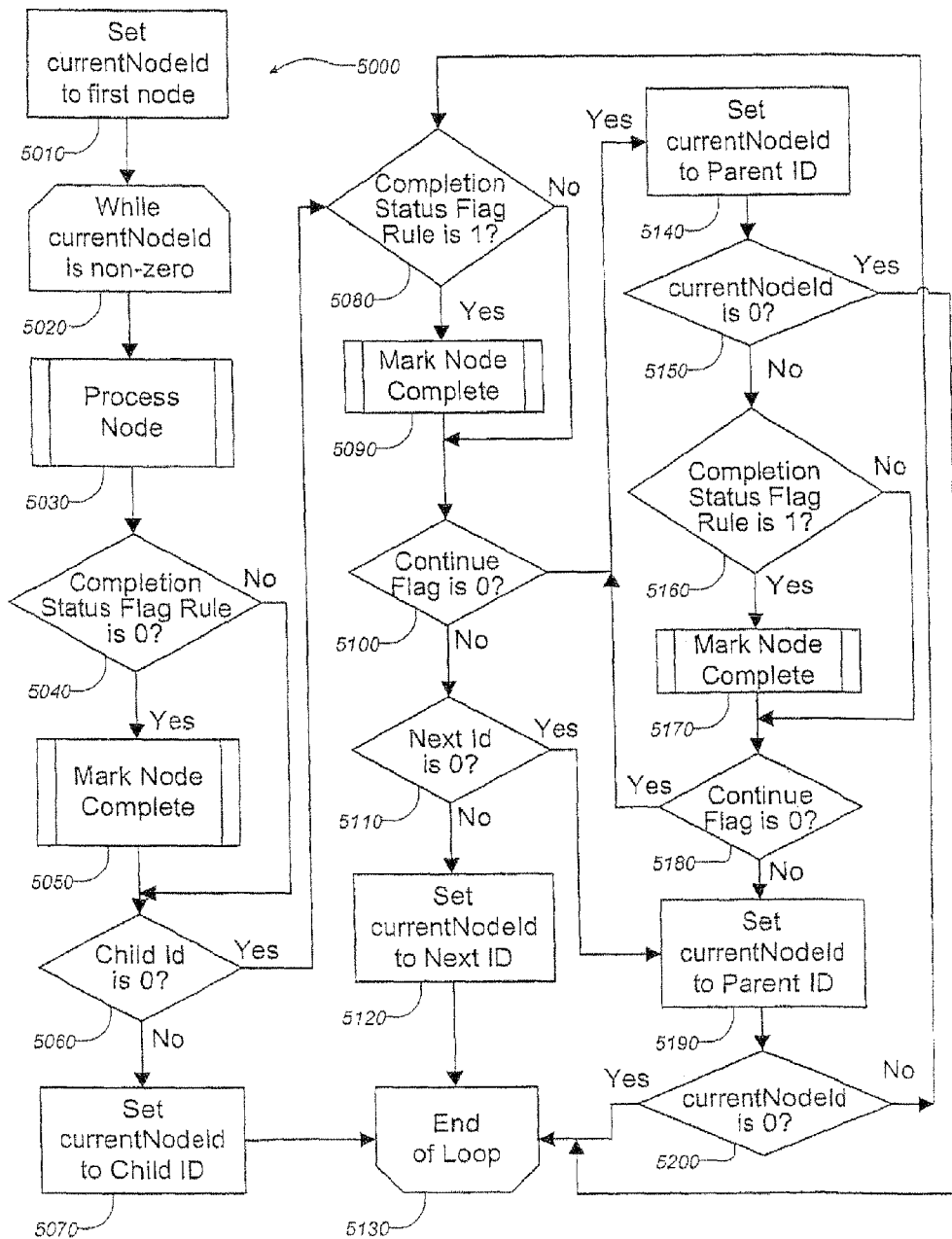
FIGS. 5A-5C illustrate an exemplary illustrative non-limiting implementation of an algorithm for managing nodes within the display module.
Figure 5B:
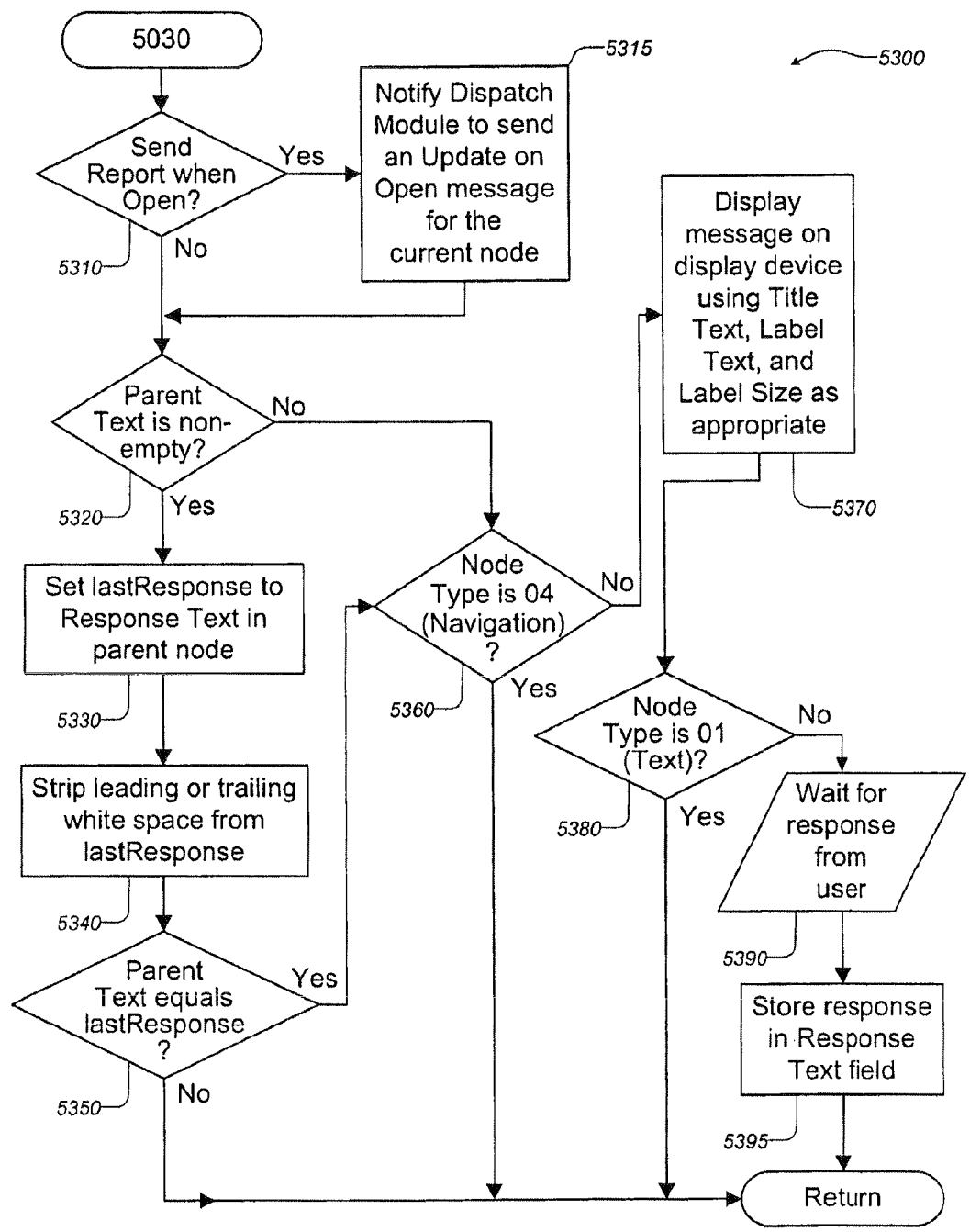
Figure 5C:
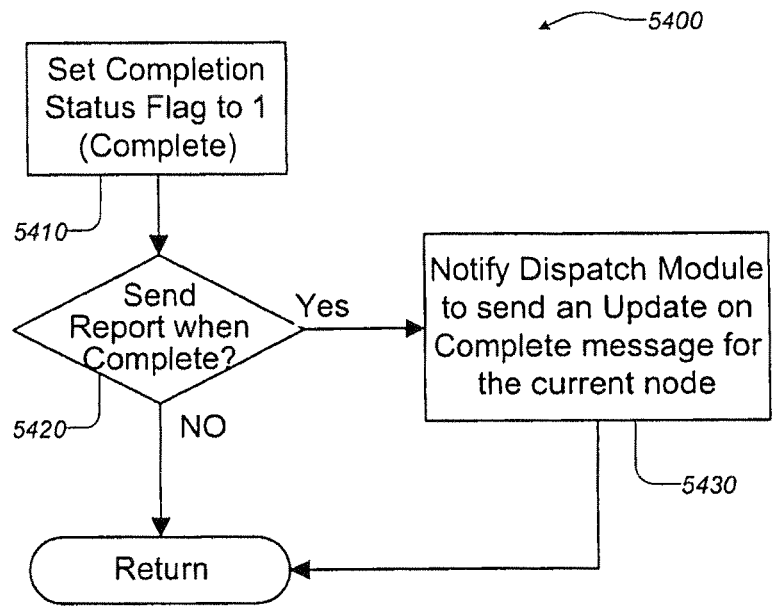

FIGS. 5A through 5C illustrate an example of a method for processing and displaying nodes by the Display Module in accordance with the exemplary illustrative technology herein.

Starting with FIG. 5A at 5000, the variable currentNodeId is set to the first node (5010). The display process then enters a looped subprocess that executes while the variable currentNodeId has a non-zero value (5020). In that loop, the node is processed (5030) as described in FIG. 5B below; and the value of the variable CompletionStatusFlag Rule is checked to determine if its value is zero (5040). If the value is zero, then the node is marked compete (5050); otherwise, the process jumps to check whether the Child ID is zero (5060). If the Child ID is not zero, then the value of currentNodeId is set to the value of Child ID (5070) and the loop terminates (5130). Otherwise, the loop continues and the value of the CompletionStatusFlag is determined (5080).

If the value of the CompletionStatusFlag is one, then the node is marked as complete (5090) and a check is made of the ContinueFlag to determine if that value is zero (5100); otherwise, the process jumps directly to 5100. If the ContinueFlag is non zero, then a determination of the value of Next Id is made (5110). If the value of ContinueFlag is zero, then the process jumps to set value of currentNodeId is set to Parent ID (5190) and the value is currentNodeId is checked (5200). If the currentNodeId is not zero, then the process returns to 5080; otherwise, the loop terminates (5130). Returning to 5110, if Next Id is not zero, then the process moves to set the value of currentNodeId to Next Id (5120). The loop then terminates (5130).

Returning to the result of determining the value of the ContinueFlag (5100), as noted above a zero value causes the process to jump to set the currentNodeId to the value of Parent ID (5140). Following that operation, the value of currentNodeId is checked (5150). If the value of currentNodeId is zero, then the loop terminates (5130). Otherwise, the process moves to determine whether Completion Status Flag Rule is one (5160). If the value of Completion Status Flag Rule is one, then the node is marked complete (5170), and the Continue Flag is checked for a zero value (5180); otherwise, the Continue Flag is checked directly for a zero value (5180). If the Continue Flag is zero, then the process returns to set the currentNodeId to the value of Parent ID (5140). If the value of Continue Flag is not zero, then the currentNodeId is set to the Parent ID (5190), and the value of currentNodeId is checked for a zero value (5200). If the value is zero, then the loop terminates (5130); otherwise, the process returns to determine if the Completion Status Flag is one (5080) and processing continues as described above.

Turning to FIG. 5B, the details of the node processing (5030) of FIG. 5A are described in greater detail (5300). Initially, a determination is made of whether to send a report (5310). If reporting is required, then the Dispatch Module is notified to send an Update of Open message for the current node (5315); and the process moves to query whether the Parent Text is non-empty (5320). Otherwise, the process moves directly to the latter operation. If the Parent Text is non-empty, then a query of the node's type is made to determine if the node is a navigation type node (5360). If the query is affirmative, then the node processing is complete; and the process moves to 5040 of FIG. 5A. Otherwise, the appropriate message is displayed (5370), and the node type is queried again to determine if the node is text (5380). If the node is a text-type node, then node processing terminates; and the process returns to 5040 of FIG. 5A. Otherwise, the system waits for a user response (5390). If the node specifies an association with an external program, the system calls the external program as part of collecting the user's response. The response is then stored in a Response Text field (5395), and the process moves to 5040 of FIG. 5A.

Returning to the affirmative branch of the Parent Text non-empty query (5320), the process moves to set the variable lastResponse to Response Text in the parent node (5330), the leading and trailing white spaces are removed from lastResponse (5340), and Parent Text is compared with lastResponse (5350). If the two are equal, then the process moves to determine if the node is a navigation node (5360), and the process continues as described above. Otherwise, the process terminates, the process moves to 5040 of FIG. 5A.

The process of marking a node complete (e.g., 5050 of FIG. 5A) is described in greater detail with reference to FIG. 5C (5400). There, the Completion Status Flag of the node is set to one (5410), and the UpdateOn Complete flag is checked to determine whether to send a report upon completion (5420). If a report is to be sent, then the Dispatch Module is notified to send an Update on Complete message for the current node (5430). Otherwise, the process returns to the relevant subsequent operation in FIG. 5A.

Exemplary Illustrative Node Types 1.1.3 General

The nodes provided by the exemplary illustrative technology herein control the devices described herein by controlling the processing of data and program instructions by the devices. The technology herein can be configured to manage multiple data types, including, but not limited to, text, image (both single images and sequences of images), signature information, data encoding sounds, data from scanning devices (including without limitation barcodes, optical data, radio-frequency identification (RFID), and magnetic card scanners), information obtained from magnetic materials (e.g., from credit or identification cards), information being sent to a printing device, and information related to geographic location (e.g., global positioning system, "GPS"). It is appreciated that various types of hardware, such as GPS devices, digital cameras, optical scanners, and voice recorders will be integrated with devices, and it is anticipated that node types that reference these newly integrated hardware types will be added to the exemplary illustrative technology herein using the extensible features of the exemplary illustrative technology herein.

According to one exemplary illustrative non-limiting implementation of the technology herein, the management of such varying data types is implemented using defined node types, which generally correspond to fields specified in the TDL. Although several useful node types are described below, those of skill in the art will recognize that still other node types can be defined and implemented using ordinary skill and knowledge.

1.1.4 Node Attributes

In the preferred exemplary illustrative non-limiting implementation, each node specifies a plurality of attributes that describe how the information managed within the node should be managed. Examples of these types of attributes include attributes related to node protections, synchronization, and completion, and the status of the node information.

In one exemplary illustrative non-limiting implementation, nodes may optionally specify that they be protected for integrity and/or privacy. Protection for integrity is generally performed using checksums or digital signatures, while protection for privacy is generally performed using encryption methods. Optionally, the node may specify a list of acceptable protection methodologies. Protection attributes are generally enforced by the dispatch module (for transmission) and the node storage module (for storage).

In an alternate exemplary illustrative non-limiting implementation, nodes may optionally specify synchronization and completion attributes, which specify how and when the node should be synchronized between devices. The synchronization attributes include specifications for how often the node should be synchronized and when synchronization is appropriate. The completion attributes specify when a node is considered complete. Synchronization and completion attributes are generally enforced by the dispatch module and the display module.

In another alternate exemplary illustrative non-limiting implementation, nodes may optionally specify whether their contents are read-only, read-write, or write-only. Generally, these attributes are enforced by the display module.

1.1.5 Hierarchical Node Structures

In other exemplary illustrative non-limiting implementations, the technology herein provides one or more nodes that are related logically to a plurality of nodes, and may be configured to change the logical order of those nodes. In still another exemplary illustrative non-limiting implementation, the nodes are configured to create a logical structure of nodes. In yet another exemplary illustrative non-limiting implementation, the nodes are configured to instantiate other nodes, and initiate the execution of an external program. In some exemplary illustrative non-limiting implementations, the node can be modified by such instantiation or operation. In other exemplary illustrative non-limiting implementations, the node is configured to specify which program to operate. In still other exemplary illustrative non-limiting implementations, the node is configured to determine if it is complete. In other exemplary illustrative non-limiting implementations, the nodes can be configured to have a hierarchical structure between two or more nodes. In more specific exemplary illustrative non-limiting implementations, the hierarchical structure is a linear structure; in other exemplary illustrative non-limiting implementations, the structure is a tree or web. Node associations may be further specified using a GroupNode, which specifies a group of nodes that should be logically processed together by the device.

In some exemplary illustrative non-limiting implementations, the node is a representation of a first node that is configured to cause the creation of a second node that is a clone of the first node. In still other exemplary illustrative non-limiting implementations, the node is configured to provide a catalog of information as described below.

1.1.6 Data-Entry Node Types

In some exemplary illustrative non-limiting implementations, a node is used to specify user interaction requirements. Some of these nodes include text processing-type node, in which TDL-defined text is displayed and the user may be prompted to enter a string of text, a confirm-type node, in which the user is prompted to confirm a decision or selection, a decision-type node, where the user is prompted for a decision from a predetermined set of options, and pick list-type node, where the user may select from a list of predetermined options.

1.1.6.1 Text Processing-type Nodes

In a first exemplary illustrative non-limiting implementation, a StaticText-node is provided by the exemplary illustrative technology herein that is configured to display a text string on the display of the device. The text string may be specified as represented in ASCII, or an arbitrary character set defined in the TDL.

In a second exemplary illustrative non-limiting implementations, a TextEntry-node is provided the exemplary illustrative technology herein that prompts the user to enter a textual response. The node specification may optionally provide parameters for the text entry, such as an edit mask. The text entered may be stored as ASCII text, or may be stored using an optionally specified character set as defined by the TDL.

1.1.6.2 Selection-type Nodes

In some exemplary illustrative non-limiting implementations, nodes may be provided by the exemplary illustrative technology herein that prompt the user to make a selection. These include the Confirm-type, in which the user is presented with some predefined text and asked to confirm the text, a YesNo-type node where the user is asked to select between two options, and PickList-type nodes, in which the user is asked to select from a list of options.

In exemplary illustrative non-limiting implementations that include a Confirm-type node (a Confirm-node), the node specifies some text to be displayed to the user and further specifies the text to be presented in the confirmation request. The node is configured to cause the display of the specified text, and then prompt for a confirmation using the specified confirmation text. In common use, the confirming text might be "OK". The text strings referenced by the Confirm-node may be specified in ASCII, or may be alternatively specified using an optionally specified character set as defined by the TDL.

In exemplary illustrative non-limiting implementations that include a YesNo-type node (a YesNo-node), the node is configured to cause the user to be presented with a text string, and to be prompted for a Yes or No answer. The results of the Yes/No answer is stored within the YesNo-node as the user input.

In exemplary illustrative non-limiting implementations that include a PickList-type node (a PickList-node), the node is configured to present the user with some text and then prompt the user to select from one of the presented options. The options are presented in the form of a pick-list of ListItem-type nodes, and the user's selection(s) from the pick list is recorded in the node as the user input. In some exemplary illustrative non-limiting implementations, the user may be permitted to select more than one item from the list of presented options. The text string(s) referenced by the PickListnode may be specified in ASCII, or may be alternatively specified using an optionally specified character set as defined by the TDL.

1.1.7 Flow Control Node Types

In other exemplary illustrative non-limiting implementations, the nodes provided by the exemplary illustrative technology herein are configured to control the operation of another node in the disparate device. Such node types can control the flow of instructions in response to the recognition of predefined conditions, i.e., "conditional nodes." In a more particular exemplary illustrative non-limiting implementation, a node is configured to execute a logical branch in the operation of a program operating in the disparate device. The branch can be either a logical IF operation or a conditional branch. Conditional branch nodes are special case nodes that prompt the user for an answer to a selection, (e.g., Yes/No) and follow an answer specific link to a form. Thus, if the user answers yes, the next form selected will be the form associated with the "Yes" branch. In another another exemplary illustrative non-limiting implementation, a conditional node is defined to implement a Yes/No/Not Available/Yes-When-Corrected conditional.

1.1.7.1 Branch Nodes

A Branch-type node (or "Branch-node" causes a branching in the flow of nodes used to control the operation of the device. In one exemplary illustrative non-limiting implementation, a Branch-node prompts the user for an answer to a predefined selection, such as a selection between a "YES" and a "NO" answer to a question and follow an answer-specific link to a subsidiary node. The text tags displayed by a Branch-node are specified in the TDL specification for the node, along with the optional character set specification to use. A Branch-node can be associated with two node structures, called the "YES" structure and the "NO" structure. In such exemplary illustrative non-limiting implementations, based on the results of the logical test, one or the other branch is selected for further use as if that branch were spliced into the sequence where the IF node appears.

1.1.7.2 IF-type Nodes

An IF-type node (or "IF-node") causes a branching in the flow of nodes used to control the operation of the device. In one exemplary illustrative non-limiting implementation, an IF-node specifies a pair of nodes that each contain values, are linked to values stored on the device (either a node associated with a callout, or an associated node), or have values that may be computed (e.g. a rollup node) based upon an additional node specification.

An IF-node can be associated with two node structures, called the "TRUE" structure and the "FALSE" structure. In such exemplary illustrative non-limiting implementation s, the pair of nodes are tested against each other, based upon the test specification contained within the IF-node. Based on the results of the logical test, one or the other branch is selected for further use as if that branch were spliced into the sequence where the IF node appears.

For example, consider the following structure of nodes with values as indicated:

```
            A = 3
            B = "Cash"
            If B="Net 30"
                        C
                        D
            (else)
                        E
                        F
```

With the current value for node B, the MC will behave as if Root has the following children: A, B, E, and F. If node B were set to a value of "Net 30", then the MC will behave as if Root has A, B, C, and D as children. All completion and navigation rules behave according to this behavior.

1.1.7.3 Yes/No/NA/Yes-After-Correction-Type Nodes

A Yes/No/NA/Yes-After-Correction node is a node that presents a yes/no question and specifies a branch over the relevant child nodes. This node type is generally used for specifying the capture of activities in which an answer may require additional user interaction, such as inspection activities where a YES answer means everything is ok, while a NO answer means there are additional fields to be completed. The node specification includes a node ID to jump to on a YES answer. The node specification also allows for a number of alternative variations:

Alternatively, a Yes/No/NA/Yes-after-Correction node may include a Not Applicable (NA) answer which specifies a branching in control as if YES had been answered, while retaining the Not Applicable answer. Alternatively, the branching in control may specify a node ID to jump to.

Alternatively, a Yes-After-Correction answer works as a YES answer, but tracks that the question was not initially answered YES.

1.1.8 Timestamp-type Nodes

In some exemplary illustrative non-limiting implementations, Timestamp-type nodes provide a mechanism for managing time-based information. These nodes include a node that obtains a timestamp from the user or device (a Timestamp-node) and nodes that calculate a duration based upon a series of timestamps (a Duration-node).

A Timestamp-node prompts the user for a time entry, and optionally specifies the portions of the date and time that the user should enter. In yet another exemplary illustrative non-limiting implementation, the Timestamp node does not prompt the device user for the time, but instead takes the current time and date from the device's internal clock and return a string that represents the time and date that the timestamp node was processed on the device.

A Duration-node records a duration between a start and stop event specified by the user. Preferably, the user presses a key to start the timer, and presses another key to stop the timer. Optionally, the user may be presented the option to suspend and resume timing. The start and stop event can be a single pair of Timestamp-type nodes that record the timestamps of the start and stop event, or is could be a list of Timestamp-type nodes that record a series of start and stop times, An example of using the latter list is to record multiple start and stop times on a task that has been worked on intermittently and that the user has used the suspend and resume timing features. In an alternate exemplary illustrative non-limiting implementation, a Duration-node may not specify a user interface requirement, but specifies a list of timestamp-nodes to be used.

1.1.9 GPS-type Nodes

In one exemplary illustrative non-limiting implementation, the disparate device has an integrated GPS receiver. GPS nodes processed on this exemplary illustrative non-limiting implementation of device interrogate the GPS built into the device and return a GPS coordinate string without prompting the user for information.

In a second exemplary illustrative non-limiting implementation of a GPS-type node, the node is configured such that the device is interrogated for a device location position (e.g. a GPS location position) on a periodic basis, and a new child node is created to contain the GPS data obtained from each interrogation. The GPS-type node specifies the interrogation frequency and number of interrogations to be performed. Each newly created child node is then managed in accordance with the management attributes of the GPS-type node. Preferably, the newly created data node has its "transmit OOB" and "write only" attributes set to ensure that the node is sent using a low-overhead transmission mechanism that suspends the normal node management mechanisms.

1.1.10 Printer-type Nodes

In another exemplary illustrative non-limiting implementation, when the device processes a printing node that references a print definition such as an invoice format, the device user is first asked whether she wants to print or not. The node is then processed using the following steps:

Checks to make sure that all required nodes are marked as complete by inspecting their completion status.

The print node references a Catalog node that describes a set of CatalogItemEntries. The CatalogItemEntries describe the data nodes to be included in the invoice and the invoice layout to be used.

The display module extracts tide, header, footer and a few other overall parameters from the Catalog node.

The display module follows the Invoice node references to each referenced InvoiceItemEntry node that describe the body of the invoice to be printed. The main body of the invoice is a set of InvoiceEntry nodes that must be printed in their defined order. All potential items to be printed must be defined in the node tree for the current task. Depending on the InvoiceItemEntry node flags, the item is treated as header information or a pricing item.

Printing proceeds by referring to the InvoiceNode, which then traverses its child InvoiceItemEntry nodes. For each InvoiceItemEntry node traversed, an additional regular node is examined, its value printed, and that value is possibly summed into a regular total and/or a taxable total. After each InvoiceItemEntry node is traversed, a tax amount, a total, and a footer are printed.

1.1.11 Barcode-type Nodes

Sound nodes are a specialized form of node that support the management of barcode scanning and the further processing of barcode encoded information.

Barcode nodes operate in two ways. In a first exemplary illustrative non-limiting implementation, a barcode node is used to convey the barcode information from a first device to a second device, and to associate the barcode information with further processing and integration task steps. In this exemplary illustrative non-limiting implementation, the barcode node interfaces with a barcode scanning device that is integrated with the device, either as part of the device itself, as might be found in wireless handheld devices such as those provided by Symbol Technologies. Alternatively, the barcode scanner might be integrated using a keyboard replacement technology, or be integrated as a wireless keyboard.

When the node is navigated to on a device with a barcode scanner, the user may be prompted to operate the barcode scanner and capture a barcode. The barcode node may then optionally direct that the barcode information be looked up in a catalog of permitted barcode values, for example, of expected UPC numbers. If the lookup succeeds, the barcode node may direct that processing of nodes branch to a specific node. Similarly, if the lookup fails, the barcode node may direct that processing of nodes branch to an alternate node. An optional template may be used to define further interaction to gather meta-data about the encoded barcode, such as the time and date it was encoded, the user ID of the person who captured the barcode, and to solicit comments on the encoded barcode from the user.

In an alternate exemplary illustrative non-limiting implementation, the barcode node may be configured to count the number of times that a specific barcode has been scanned. Preferably, the barcode node's counting mechanism will reference other nodes in which to store the count(s). Alternatively, a barcode node may provide as its value the calculated count value.

If the barcode node is being processed on a server device, the TDL may direct that the barcode information be archived in an external system such as an inventory system. Alternately, it may be processed by external systems, or it may be emailed to a specified email address, or printed to a label. If printing a barcode node to a printer that supports printing barcodes, the printer may be configured to print either the textual or graphical representation of a barcode.

Barcode nodes may be managed as read-only, read-write, or write-only nodes. A read-only node attribute is used when the encoded barcode information contained within the node may not be altered by the user of the device. A read-write node attribute may permit additional information to be associated with the node, possibly allowing the user to enter or edit the meta-data associated with the encoded barcode information, or to capture new barcodes to replace the barcodes already present in the node. A write-only image node permits the user to capture barcodes, but not edit or review them.

1.1.12 Associated-type Node

An associated node is a node that is associated with a data element or other feature stored on a device outside the node structure. An associated node takes whatever value the data element stored on the device has. It may be updated on a periodic basis, or by the operation of an external program operating on the device.

There is no user interface to an associated node. These nodes affect the flow of control within the system, causing branching within the node stack.

1.1.13 Define-type Node

The Define node defines a template node structure with designated values to be used as substitution parameters. Upon evaluation of a Define node, the client expands the Define node by traversing the template node structure, copying it and inserting all substitution parameters where indicated. The newly generated nodes are stored within the device's node storage and are managed as any other node by the device.

1.1.14 Instantiation-type Node

The Instantiation node defines a node structure with designated values to be used as parameters. A working copy of the node structure is stored, unmanaged, in the device's node storage, and the copied node structure is processed by the device. Upon completion, the results of the processing the copied node structure are stored as the result of the instantiation node, and the working copy of the node structure is destroyed. Any nodes created as the result of processing the working copy of the node structure are stored as part of the working copy of the initial node structure, and are destroyed with it.

The node storage used by the instantiation node may be the node storage component of the device, or may be a memory store used during node evaluation (such as a local stack).

1.1.15 External Call-type Node

Each external call node specifies the identity of an external program or program object to be called. This capability may be used to specify the interface code for device specific hardware, or may specify an external program to be executed. The callout specification may name a specific piece of code installed in the device by name, a GUID or other well known object identifier (e.g. a .NET assembly, a COM GUID, a Java applet with a well known name, a J2ME midlet). Alternatively, the callout specification may name a device capability defined in a device provided capabilities catalog, and the callout calls the code module specified in that catalog.

The external call node may specify a list of nodes to be used as parameters to the called external program. Depending upon the specifics of how the external program is called, these parameters are passed to the called program and optionally, the return values are retrieved. This is, in effect, a call by value-result to the external program.

If the specified program or program object is not available on the device, the device gracefully terminates the operation of the node.

1.1.16 BLOB-type Nodes

In another exemplary illustrative non-limiting implementation, the exemplary illustrative technology herein provides a Binary Object ("BLOB") node, as a general type of node for storing non-textual information. Unlike information stored in text-encoded fields, the format of BLOB nodes is not predefined. BLOB nodes are preferably associated with a data type that indicates how the contents of the BLOB should be interpreted. A common method of handling this association is to use the Multipurpose Internet Mail Extensions (MIME) types as defined by the Internet Assigned Numbers Authority IRNA. In one exemplary illustrative non-limiting implementation, the device indicates a list of MIME types that is able to process by providing a catalog of MIME types. This catalog may be sent from the device when the device is first associated with the system, or in the case of a device that can be reset, the catalog may be sent after each reset. A BLOB node optionally indicates the data type of its contents by including a specific MIME type, or by referencing the previously supplied catalog provided by the device.

When BLOB nodes are stored in a node store, they are preferably stored in an underlying data type that supports binary large objects. The data type underlying the node store is device dependant. In cases where the node store is implemented using a commercial database, the underlying data type is preferably BLOB or VARCHAR. For mobile devices, BLOB storage is dependant upon the capabilities provided by the device operating system, and may range from an underlying database mechanism as described above to storage in a flat file.

One potential use of catalogs is to use the catalog structure to describe device capabilities using a common lexicon. In this use of catalogs, a device constructs a catalog of its capabilities and communicates the catalog when describing its capabilities. An example of using catalogs in this manner is the description of MIME types that a device natively supports. The device encodes a list of IRNA-specified MIME types that is supports natively. In this example, the device has manufacturer-provided capabilities for displaying JPEG-encoded pictures. The MIME type, along with permitted device resolutions, are encoded as an entry in the capabilities catalog. This catalog is then shared between devices using the above described management mechanisms. Similarly, the catalog structure may be used to describe built-in device capabilities, such as a built-in camera. In this second example, the catalog structure can not only describe the camera, but also provide a link to a description of the camera output (e.g. the MIME description above), or it may include a reference to a template to be used to capture information about the picture that was just taken.

1.1.17 Template Nodes

Template nodes are special cases of repeating groups of nodes, which have instance-specific substitutions of configuration and usage data inserted into them. Template nodes are referenced from other nodes and are used to specify a node structure to be created as part of an action of another node. For example, when a new work order is created, a Work Order template structure is used to define the node structure to be created for that specific instance of the Work Order. Templates comprise groups or sets of other nodes. The node that references a template describes the information to be replaced or merged with the new copy of the template.

1.1.18 Catalog and CatalogItem Nodes

Catalog nodes are special cases of repeating groups of nodes that are shared between usage instances. They may also be used to store standard constant information in a common, easy to reference form. In simplest form, catalog nodes describe repeating groups of static information, such as a parts catalog or the print definition for an invoice. The Catalog node is referenced from nodes in the node hierarchy and are processed as if they were physically instantiated at each reference in the node hierarchy. CatalogItem nodes correspond to Catalog Elements and Catalog Items described later.

1.1.19 Image-type Nodes

In some exemplary illustrative non-limiting implementations, the nodes of the exemplary illustrative technology herein are image nodes. Image nodes are a specialized form of node that support the management of digital images. In a first exemplary illustrative non-limiting implementation, an image node is used to convey an image from a first device to a second device. When the node is navigated to on the second device, the image is processed by that device. For mobile devices, this often means that the picture is displayed on the screen of the device. If the node is being processed on a server device, the TDL may direct that the picture be archived in an external system such as a content management system, or that it be emailed to a specified email address. In a second exemplary illustrative non-limiting implementation, processing a picture mode causes an image capture component of the device, such as a camera or scanner, to capture an image and store it within the node. An optional template may be used to define further interaction to gather meta-data about the image, such as the time and date it was taken, the user ID of the person taking the picture, and to solicit comments on the picture from the user.

Image nodes may be managed as read-only, read-write, or write-only nodes. A read-only node attribute is used when the image contained within the node may not be altered by the user of the device. A read-write node attribute may permit additional information to be associated with the node, possibly allowing the user to enter or edit the meta-data associated with the image, or to capture a new image to replace the image already present in the node. A write-only image node permits the user to capture an image.

The specific interface to image capture devices integrated within the device varies. Preferably, the image node specifies an image capture device, or a set of image capture devices, that should be used. This information may have been provided using a capabilities catalog, as described elsewhere, may be described using an implementation-dependant vocabulary shared between devices, or it may be hard-coded for a specific device. An image node may additionally specify the interface to the image capture device as described elsewhere.

Image nodes are not limited to containing images taken by cameras; they may also contain any image file format, including video clips, x-ray images, and fax images. The format of the image is preferably specified using an IANA compliant MIME type.

1.1.20 Sound-type Nodes

In another exemplary illustrative non-limiting implementation, the exemplary illustrative technology herein provides nodes configured to manage data encoding sounds. Sound nodes are a specialized form of node that support the management of digitally encoded auditory representations. An example of these types of representations include an MP3 file. Sound nodes operate in two ways. In a first exemplary illustrative non-limiting implementation, a sound node is used to convey an encoded sequence of sounds from a first device to a second device. When the node is navigated to on the second device, the encoded sound is processed by that device. For mobile devices, this often means that the sound is played by the device. If the node is being processed on a server device, the TDL may direct that the sound be archived in an external system such as a content management system, or that it be emailed to a specified email address. In a second exemplary illustrative non-limiting implementation, processing a sound mode causes a sound capture component of the device, such as a microphone, to capture ambient sounds and store them in encoded form within the node. An optional template may be used to define further interaction to gather meta-data about the encoded sounds, such as the time and date it was encoded, the user ID of the person who captured the sounds, and to solicit comments on the encoded sounds from the user.

Sound nodes may be managed as read-only, read-write, or write-only nodes. A read-only node attribute is used when the encoded sounds contained within the node may not be altered by the user of the device. A read-write node attribute may permit additional information to be associated with the node, possibly allowing the user to enter or edit the meta-data associated with the encoded sounds, or to capture new sounds to replace the encoded sounds already present in the node. A write-only image node permits the user to capture and encode sounds.

The specific interface to sound capture and playback devices integrated within the device varies. Preferably, the sound node specifies a sound capture device, or a set of sound capture devices, that should be used. This information may have been provided using a capabilities catalog, as described elsewhere, may be described using an implementation-dependant vocabulary shared between devices, or it may be hard-coded for a specific device. Furthermore, the capabilities catalog may be used to specify the encoding formats that a specific device supports. A sound node may additionally specify the interface to the sound capture and playback devices as described elsewhere. The format of the sounds is preferably specified using an IRNA compliant MIME type.

1.1.21 Node Encoding

Nodes are preferably encoded using a representation compatible with various devices on the system, and may be additionally encoded for transmission over the network. It is well understood in the art mechanisms for encoding nodes between binary and text modes. An example of a node encoding compatible with the above example message protocol is presented below.

| 1 | NodeType<br>Note: Types 2-6 are user updateable, either by visiting the field or otherwise entering or updating information.<br>Report values are shown for reference. | Number(2) | Listbox (picklist) - returns completion status of 0 or 1 (based on whether all of its children are complete).<br>Confirm (Radio) - returns completion status of 0 or 1 & value of 0 or 1.<br>Branch - based on the user answer (like a Picklist node), moves control to an arbitrary other node in the tree.<br>IF - based upon a computed answer, moves control to an arbitrary other node of the tree.<br>TextEntry - returns completion status of 0 or 1 & text.<br>StaticText - returns completion status of 0 or 1.<br>ListItem - returns completion status of 0 or 1.<br>Yes/No - prompts for a yes/no selection and returns completion status of 0 or 1.<br>Yes/No/NA/Yes-after-correction - prompts for a selection and jumps to an appropriate node. Returns item selected.<br>TimeStamp node - returns completion status of 0 or 1 & a time if overridden by user. Time is specified as YYMMDDhhss.<br>Duration node - returns a time duration.<br>InvoiceItemEntry node - returns an invoice item entry, referring to a particular other node that contains values that will be printed on an invoice. Each InvoiceItemEntry is referring to a value that will be a "line item" for the invoice. The InvoiceItemEntry nodes are children of and are used by the Invoice node as described below. [renamed from CatalogEntry]<br>Invoice node - specifies how an invoice document can be assembled based on data contained in particular nodes of the tree specifying the current document. The invoice node's child nodes are all instances of InvoiceItemEntry and allow the printed invoice to contain an arbitrary number of invoice line items.<br>Generalized Catalog Entry node - specifies a catalog entry. Operates like a picklist, but gets its potential data values from a catalog. Allows a wide variety of user interface presentations based on flags set in the node.<br>GPS node - returns a GPS location string.<br>Audio node - returns a binary representation of a segment of audio information.<br>Image node - returns a binary representation of an image. A picture node returns a binary representation of an image taken by a digital camera.<br>Signature node - returns a binary representation of a signature entered on a device with a touch sensitive pad (variant of image).<br>Barcode node - returns a barcode<br>Associated node - returns device information with which it is associated.<br>Define node - see text.<br>External call node - see text.<br>Instantiation node - see text.<br>PrinterNode - Gives the user of the device a way to print out a document based on the specification in the InvoiceNode. or potentially other kinds of document-oriented nodes like Invoices (e.g. Warranties, Inspection Report, Parking Tickets).<br>GroupNode - indicates to the user interface component that a set of other nodes (the children of the group node) are to be displayed together on the same device screen so navigation from screen to screen is not required for the child nodes.<br>BinaryObject (BLOB) |

-continued

| | | | |
|---|---|---|---|
| 2 | ParentID | Number(4) | Unique ID for this node's parent. ParentID of the root node = 0. |
| 3 | PreviousSibling | Number(4) | Unique ID for the node preceding this node at this level. First node will be NULL. Also used to calculate the NextSibling pointer - NextSibling will be 0 for the last node at a particular level. |
| 4 | CompletionStatusFlag | Number(1) | 0 - Incomplete<br>1 - Complete |
| 5 | CompletionStatusFlagRule | Number(1) | Determines when a node is complete:<br>0 - complete when visited<br>1 - complete when all children of this node are complete<br>2 - complete with explicit user interaction |
| 6 | SendReportWhenOpened | Number(1) | 0 - Disabled (Do not send report)<br>1 - Enabled (Send report) |
| 7 | SendReportWhenAllComplete | Number(1) | 0 - Disabled (Do not send report)<br>1 - Enabled (Send report) |
| 8 | ListboxSequenceNumbering | Number(1) | Determines if listbox nodes display children with sequence numbering.<br>0 - no numbering displayed<br>1 - sequence numbering is displayed |
| 9 | ListboxCheckboxesDisplayed | Number(1) | Determines if listbox nodes display their children with checkboxes.<br>0 - no checkboxes<br>1 - checkboxes are displayed |
| 10 | CheckboxesSingleChoice | Number(1) | Determines if checkboxes are multiple choice<br>0 - multiple choice or N/A<br>1 - single choice |
| 11 | LeafRadioButtonDefault/<br>LeafTimeStampNodeAllowOverride/<br>ListIsReusable | Number(1) | Determines default radio choice<br>0 - NO button<br>1 - YES button<br>Determines if time stamp node allows override<br>0 - user override not allowed<br>1 - user override allowed<br>Determines if this list is reusable i.e a blank form that should be reset once completed.<br>0 - not reusable<br>1 - reusable |
| 12 | TextEntryNullIsAllowed | Number(1) | Determines if leaf text-entry is complete with NULL entry<br>0 - NULL is NOT allowed<br>1 - NULL is allowed |
| 13 | DateOfRecord | Number(10) | Format = YYMMDDhhmm |
| 14 | LabelSize | Number(1) | FLEX ONLY<br>Determines the display size of the label field on Leaf-Textentry screens<br>Range is 1-4 lines. The sum of the LabelSize and TextEntrySize must equal 5 lines. Default size of this field is 3 lines. |
| 15 | TextEntrySize | Number(1) | FLEX ONLY<br>Determines the display size of the text entry field on Leaf-Textentry screens. Range is 1-4 lines. The sum of the LabelSize and TextEntrySize must equal 5 lines. Default size of this field is 2 lines. |
| 16 | DefaultTextEntry | Varchar(20) | Text string that initially will be displayed when a leaf-text-entry is first viewed. |
| 17 | ItemTextOnParent | Varchar(25) | Text string that will be displayed when viewing this node's parent. |
| 18 | NodeTitle or Title Text | Varchar(75) | The title of the node, often display in the title bar area. |
| 19 | NodeText or Body Text | Varchar or BLOB | The text/content of the node. Field size and encoding standards are implementation dependent. |
| | End of record delimiter | Char(1) | "*" |

The TDL

As previously mentioned, the TDL specification is preferably a DTD or schema in XML format. FIGS. 6 and 7 together illustrate a TDL created from a DTD in accordance with the exemplary illustrative technology herein. In this exemplary illustrative non-limiting implementation, an XML DTD for "TDL" documents is shown. A TDL document is commonly referred to as a "form". Specialized instances of TDL documents are called templates or catalogs, depending upon how they are constructed. FIG. 6 shows a sample task description language (TDL) specification written in the well-known XML document type definition (DTD) format. FIGS. 7*a*-7*d* shows a sample TDL document generated using the sample XML DTD shown in FIG. 6.

Those having skill in the art will appreciate that while the DTD shown in FIG. 6 allows multiple forms to exist in a single TDL document, for example, where each form specifies a TDL "form" for a user. As a convenience, however, the ability to specify multiple forms in a single TDL document is desired so that related forms can be grouped together, or so repeated TDL documents may be specified once and then referenced from multiple locations.

FIGS. 7*a*-7*d* shows a sample TDL document, based on the specification shown in FIG. 6, that guides a technician through the replacement of a pump on a water system. As shown in the figure, when an error condition occurs, such as when the new pump is broken and cannot be installed, another form is invoked to handle the error and the form is finished (since continue is "No"). The forms to handle this and other error conditions are not shown. In the case where the task is performed successfully, the user will provide the serial numbers for the old and new pumps, and these values will be stored in a new ServerRecord object created in the respective node store, e.g., (1540).

Continuing the reference to FIGS. 7*a*-7*d*, in the DTD, each TDL document is composed of a series of form elements, where each form is composed of a series of field elements that direct the presentation of content on a device (either a first device or a disparate device as described above) in order to interact with the user of the device. Using standard XML notation as is well known in the art, the framework for a TDL document based on the DTD is as follows (assuming the DTD is stored in a file c:\tdl\sample.dtd on the local disk):

```
<?xml version="1.0" encoding="UTF-8">
<!DOCTYPE tdl SYSTEM "c:\tdl\sample.dtd">
<!-- Sample TDL Framework-->
<tdl version="1.0" domain="ACME Corporation">
<form ...>
        <field ...>
        body of first field
            </field>
            <field ...>
        body of second field
            </field>
            <field ...>
            Reference to another form
            </field>
</form>
<form ...>
body of second form
</form>
        </tdl>
```

As is common in XML schemas, the "version" attribute specifies the version number of the TDL format as described by the DTD. The "domain" attribute specifies the domain name under which the described forms are stored. The concept of domains is explained in more detail below. The TDL also defines the mapping between the nodes and integration tags, which are used by third-party applications to integrate the nodes to external processes. Additionally, the TDL specification is used to define interfaces to the XML integration server, as well as reports and additional user functionality.

Each form element defines a specific task to be performed by the user, and has a name attribute that is unique within the specified domain. Form elements contain zero or more basedOn elements, zero or more newObject elements, and zero or more field elements. The basedOn elements identify the parameters passed to a form. The name attribute is the name of the parameter, while the type attribute is the type of the parameter.

Catalogs and templates are used when multiple TDL documents share common elements, such as when a maintenance person working for a property management company is closing up rental properties at the end of a rental season and repeatedly performs the same "task" many times a day, or when TDL pick lists are customized to implement customer-specific data or options in TDL specifications. For example, if a customer's mobile workers are tasked to inspect widgets, and one of the inspection forms (a TDL document) is a series of multiple choice questions related to the size, color, and shape of the widget being inspected, a preferred exemplary illustrative non-limiting implementation of the exemplary illustrative technology herein is to define a catalog to "extend" the core TDL to include common information about widget sizes, colors, and shapes, and a set of template forms based upon the catalog extensions may be defined and reused across various TDL specifications used by a customer. In another exemplary illustrative non-limiting implementation, catalogs are used to define "invoice," "work orders," and other common business items. The exemplary illustrative technology herein lets a business analyst define the common text elements of the business form (e.g., an invoice) as a catalog, define the business process data collection as a template form, and then send the catalog and template form to a device to be processed. It will be appreciated that this approach provides significant benefits over traditional methods of defining forms and data collection for mobile devices in which extensive use of application programmers is required.

Catalogs are used to abstractly represent a set of items that can be picked by the user within a field on the wireless device. Catalogs comprise both elements and items, and when used, are referred to as Catalog Instances. Catalogs are used for parts selected from a standard parts list, crew members selected from a crew list, billing codes selected from a billing code list, or just picklist items can be changed over time. Catalogs refer to the overall definition on the server, including any references to the catalog in TDL and the Web and XML interfaces that allow customers to update and manage catalog elements. A Catalog instance refers to a particular use of a catalog representation in TDL or resulting set of nodes that are generated for a particular worker doing a particular task. Catalog elements refer to the choices available within a catalog, and delivered as part of a catalog instance within a particular form for a particular task. Catalog items refer to a set of catalog elements that have been chosen by a worker working with a particular set of nodes representing a particular task.

New objects can be created using newObject element. The type attribute represents the type of object, while the name attribute is the local variable used for this object within the form. The newObject element may contain setData elements to initialize the object's properties. The setData element requires the object name (which is always the name attribute given in the newObject element), the property to set (that is, the name of a specific field within the database), and the value for this property. The value attribute has three forms. A specific object can be specified with the local name for the object. A specific property of a pre-defined object can be specified using <object>.<property> notation. For example, the First-Name property in a Customer object with the local name "cust" would be specified as "cust.FirstName". A hard-coded character string can be specified by prefixing the string with a period. For example, a first name of John is specified as ".John."

Each field element within a form has a name attribute that is unique within that form. A field represents a screen object to show on the device's screen. Each field has a type attribute to specify the kind of screen object it represents. Examples of supported field types include the following:

Text—text that is shown to the user.
Confirm—text that the user must confirm (for example, with an OK button).
FillInText—textual prompt for a data entry field that collects a textual response from the user.
YesNo—a question that the user must answer with Yes or No.
Branching—A YesNo field, in which control branches to one of two sub-forms depending upon the answer provided.
Timestamp—a date and time entry marking an action.
Activity Duration—an interval of time.
PickList—a list of choices for the user.
Catalog—a list of predefined values to be selected by the user.
GPS—a GPS position location.
Image—a binary object, such as an image taken from an integrated digital camera.
Form link—A link to another TDL specification, template, or catalog.

A more complete list of supported field types is provided above. By default, all fields are of type Text unless otherwise specified.

In addition, fields also allow the completeWhen attribute. This attribute indicates whether the current field is considered complete when the user views this field (the Visited value) or when all children of this field have completed (the AllChildrenVisited value). As will be seen below, each field within a form may link to another form. Any form that is linked to is considered a child of the field that initiates the link. The notion of linking between forms is a useful forming abstraction to allow more complex tasks to be constructed and executed at the device.

As further described by the DTD, fields contain a single caption element, an optional setData element, an optional recordTime element, and zero or more link elements. The caption element has a single content attribute, which can be "Simple" or "Compute." A caption with content "Simple" contains raw information that should appear at the device. A TDL document to display the words "Hello World!" is shown below:

```
<?xml version="1.0" encoding="UTF-8">
<!DOCTYPE tdl SYSTEM "c:\tdl\sample.dtd">
<!-- TDL document for Hello World -->
<tdl version="1.0" domain="ACME Corporation">
<form name="Hello">
    <field name="Hello1">
        <caption>Hello World!</caption>
    </field>
</form>
</tdl>
```

In this document, the completeWhen and type attributes for the field element, and the content attribute for the caption element all use their default values.

A caption element with content "Compute" contains a combination of text and one or more getData elements. A computed caption allows object data to be inserted into the caption at the time the form is processed for transmission to the device. The object attribute is the local name of an object. The property attribute is the name of the property in the object that should be inserted into the caption. This assumes that the property may be represented as a string so that it may be inserted into the caption. The translation of property values into strings is part of the database definition. Alternately, the caption element can accept a returnType attribute that specifies the type of data returned so that an appropriate string value can be generated dynamically.

A business object is a logical representation of part of the business process. Business objects and actions thereupon are described using TDL. For example, a business object "cust" representing a Customer object may contain Address and City properties to represent the street address and city of the customer's location. A string to present this information at a device could be specified with the following caption:

```
<caption content="Compute">
    The address is <getData name="cust" property="Address"/>
        in <getData name="cust" property="City"/>.
</caption>
```

If the address of the customer is 213 Main St. in a city called Anytown, then the above caption would generate the string "The address is 213 Main St. in Anytown."

Looking again at the DTD (5000), the optional setData element within a field allows the response entered by the user to be stored in the property of a business object. The object attribute is the local name of the business object and the property attribute is the property to set. The value attribute is optional. If omitted then the user's response is stored in the property. An arbitrary value may be specified as previously described. By convention, an attempt to set a property to the user's response in a field of type Text will have no effect. A field of type Confirm will set the given property to a TRUE value (the actual setting will depend on the exact data type of the given property).

The optional recordTime element allows the timestamp when a field is first viewed or completed to be recorded in a property. The object attribute is the local name of the object. The optional on Open attribute specifies the property to set with the timestamp when the field is first displayed (that is, opened) at the device. The optional on Complete attribute specifies property to set with the timestamp when the field is completed. A field is completed based on the completeWhen attribute set for the field.

The link element allows a field to invoke, or execute, other forms available within the specified domain. The link element has a form attribute and optional continue and response attributes. The formName attribute is the name of the form to invoke.

The continue attribute for the link element specifies whether the current form should continue execution after the link has executed. If "Yes" (the default), then the form continues execution after the link has completed execution. If "No," then the subsequent fields on the form are ignored after the link has executed, so that the current field is the end of the form.

The optional response attribute for the link element specifies a required response for the link to be invoked. For example, in a field of type YesNo, the following link element would execute the form "ModifyThermostat" only if the user provides a "No" response.

```
<field name="CheckThermostat" type="YesNo">
    <caption>Is the thermostat set to 72 degrees?</caption>
    <link formName="ModifyThermostat" response="Yes"> </link>
</field>
```

A link element may contain using elements to specify the parameters required by the specified form. The name attribute identifies the parameter, which may be a business object name or a property name. An object is specified using the local name for the object. A property is specified using the dot notation previously described. For example, "cust.FirstName" specifies the FirstName property in the business object represented by the local name "cust."

Having described the sample DTD, it will be appreciated that additional elements and attributes could be added to achieve additional functionality in the language. For example, a defaultValue element could be added to the field element to specify the default setting for YesNo or FillInText Another extension would be to modify the link element to accept a content attribute similar in meaning to the content attribute for the caption element. This would allow links to be generated based on information stored in the relational database 4610. With this change, the formName attribute would become an element and contain the name of the form for a link with content "Simple," or the text to generate a form name using getData elements for a link with content "Compute."

Yet another extension would be to add new types of fields. For example, a "Menu" type of field could be added to allow users to select from a list of items in order to choose a task they would like to perform. Each item in the list would link to a specified form that would assist the user in performing the selected task. In this case, a construct to specify the items in the menu, and one to specify the link to the proper form for each item would also be required. Other additions and modifications to the given TDL format are also possible.

Specific business object types are provided for Catalog and CatalogEntries. Catalog and CatalogEntry objects describe information that is shared between each instance of the Catalog. In a preferred exemplary illustrative non-limiting implementation, Catalog and CatalogEntry business objects are used to define a well known Invoice and set of InvoiceItemEntry elements that describe for format of an invoice and the fields and text used to calculate and display an invoice.

Some of the InvoiceItemEntry elements define heading information (e.g. customer name, work location, technician name, start time, stop time) and some are calculated (e.g. to determine the final price). Any items that supposed to be part of the final invoice are represented with an InvoiceItemEntry object. The InvoiceItemEntry objects are children of the Invoice objects. InvoiceItemEntry objects reference regular form elements that contain information that is to be printed.

Regardless of the exact TDL specification used, the processing of the language in order to implement the exemplary illustrative technology herein is similar. For this reason, other formats are not discussed herein, and further examples and discussion will use the sample DTD 1110 as a representative example for the generic idea of having a task description language as one aspect of the technology herein.

It should be noted that TDL specifications are represented herein in XML "normal" form. TDL specifications may be stored in alternate formats that are not XML, for example, they are optimized for transmission in an "over-the-air" format, and are optimized differently when stored as nodes in the TPC device or upon a specific mobile device. The specific optimizations employed vary based upon the communication network and the specific device to which the information is sent. For example, a TCP/IP-based wireless network is not likely to restrict the character set of the over-the-air protocol, while the over-the-air protocol for ReFlex-based wireless networks will be restricted to the character sets defined by RFC 821/822. In this example, substantial transmission performance penalties are incurred to implement message quoting if the restricted character set defined for RFC-821/822 is not adhered to.

TPC Device

TPC device 1500 creates, manages, stores, and otherwise processes TDL and nodes, including processing the responses from a user of a disparate device such as device 1100 as dictated by the TDL specification. The details of TPC device 1500 are described in detail below. In addition, the each component of the TPC device is scalable, i.e., the component may be replicated to support more devices. Multiple instances of components of TPC devices also can be clustered to provide greater capacity.

XML integration and UI servers 1410 and 1420 construct and transmit data preferably encoded as Task Description Language ("TDL") specifications, described in detail above, or XML documents, which are received in TPC device 1500 by a Session Server (1510). The session server allows multiple TDL documents to be received from the XML integration server and UI server and stored in a Device and TDL Storage (1520) to support the re-use of common workflows, business objects, instruction sets and the linking between different sets of TDL specifications. A node generator ("NG", 1530) translates the TDL specifications into nodes that are transmitted to disparate devices such device 1110. Node generator 1530 optionally stores the generated nodes in node storage 1540 or Device and TDL storage 1520. Actions or other links are performed as specified by the TDL specifications in conjunction with XML integration server 1410, UI server 1420, or session manager 1550. Such actions may modify data or invoke external forms or URL links at the integration servers as described below. As a result of these actions, additional TDL specifications may be sent to session server 1550 for use by devices.

1.1.22 Session Server

The Session Server 1510 provides an interface between a TPC device and integration servers. It receives TDL specifications, information requests, and response data from integration servers such as those described below, and it manages information received from various devices in accordance with the TDL specifications. In particular, it associates information received from devices with integration tags, and forwards this information to various integration servers for further processing.

The Session Server also may, under direction from the TDL specification, form associations between specific TDL specifications and specific users and/or devices such that the Session Manager device may transmit and receive the nodes corresponding to these TDL specifications to the associated disparate device. Specifically, these associations form a link between a device, user, and at least one TDL specification. The association forms the authorization for a specific user to process portions of a specific TDL specification on a specific device. The association may also specify the nature of authentication required for both device and user.

In the same manner as it forms associations between users, devices, and TDL specifications, the session server forms associations between TDL actions external servers such as integration servers described below.

1.1.23 Node Generator

A node generator ("NG", 1530) translates the TDL specifications into actions and nodes that are suitable for transmission to disparate devices. The Node Generator is utilized by the Session Server and TPC device 1500 whenever a TDL specification is requested that does not already have nodes or actions created for it. The processes utilized by the Node Generator are described more fully below. The Node Generator operates on one or more TDL specifications to produce the requested actions and nodes, storing them either directly in the node store of the TPC device 1500, node storage 1540, or in Device and TDL Storage 1520.

The Node Generator further provides information to the XML integration server to further configure the XML integration server's web service interface so it seamlessly interoperates with the session server. In one exemplary illustrative non-limiting implementation, the Node Generator provides the configuration information to the XML integration server's web service interface by writing the information to a configuration file used by the XML integration server. Alternatively, the information may be written to a database such as the Device and TDL Storage 1520 or node storage 1540 databases. In yet another exemplary illustrative non-limiting implementation, the information may be written to one of the XML integration server's web service interfaces.

1.1.23.1 Creation of Nodes

Having described the TDL, methods utilized by the NG to create nodes using the TDL are illustrated in FIG. 8A-8E with reference to the DTD and TDL examples provided in FIGS. 6 and 7.

Figure 8A:
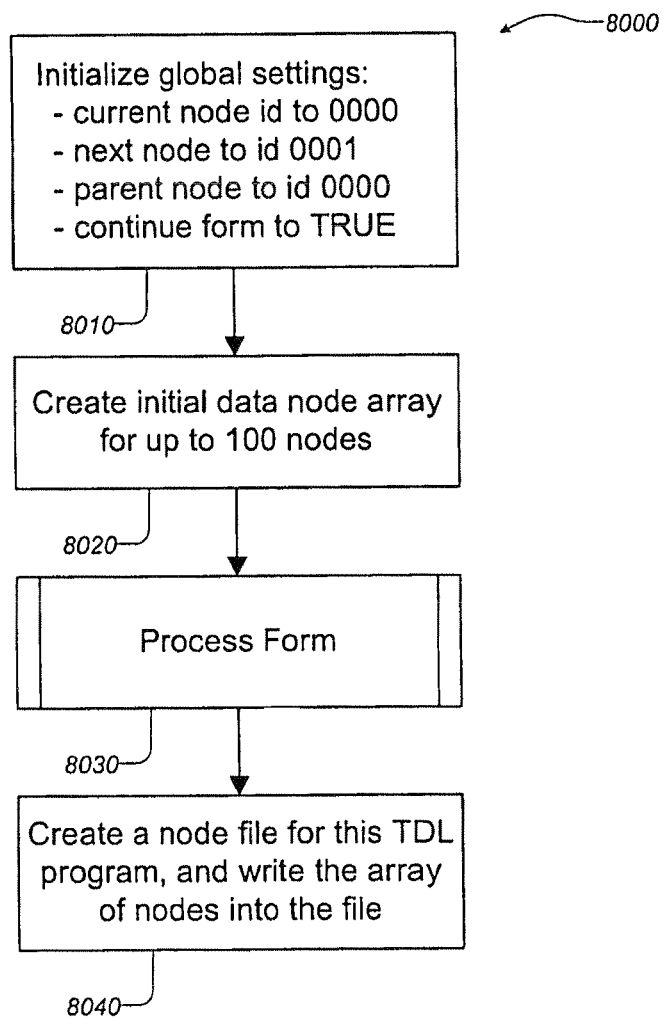
FIGS. 8A-8F illustrate an exemplary illustrative non-limiting process for converting a TDL document to managed nodes.

Referring to FIG. 8A, a method for translating a TDL specification written in the sample TDL specification document of FIG. 6 into a node storage database table is illustrated (8000). Using the DTD specification, the global settings are initialized accordingly (8010). An initial data array for 100 nodes is then created (8020), and the TDL specification is processed (8030). Following the processing of the TDL specification, the node file for the TDL is created; and the array of nodes is written into the file (8040).

Figure 8B:
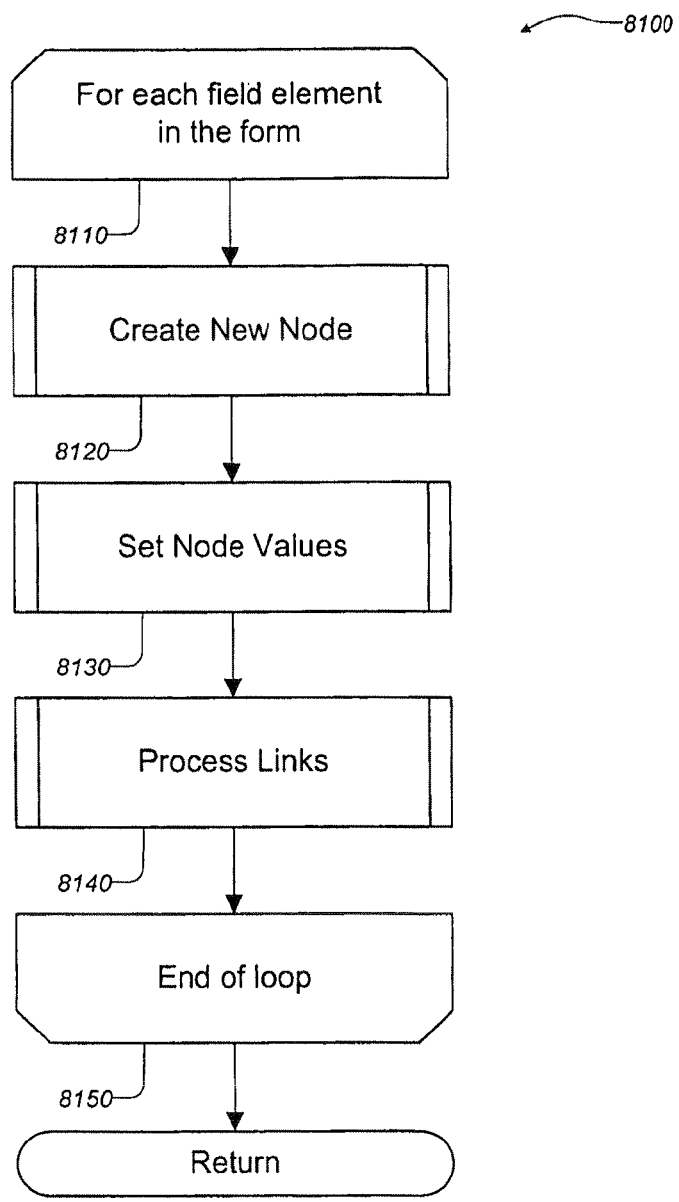

The processing of the TDL specification (8030) is described in greater detail in FIG. 8B (8100). The process loops over each field element in the specification (8110), each iteration of the loop creating a new node (8120), then setting the node values (8130), and processing the links (8140). Upon completion of the node corresponding to the last field element, the loop terminates (8150), and the node file is created (8040).

Figure 8C:
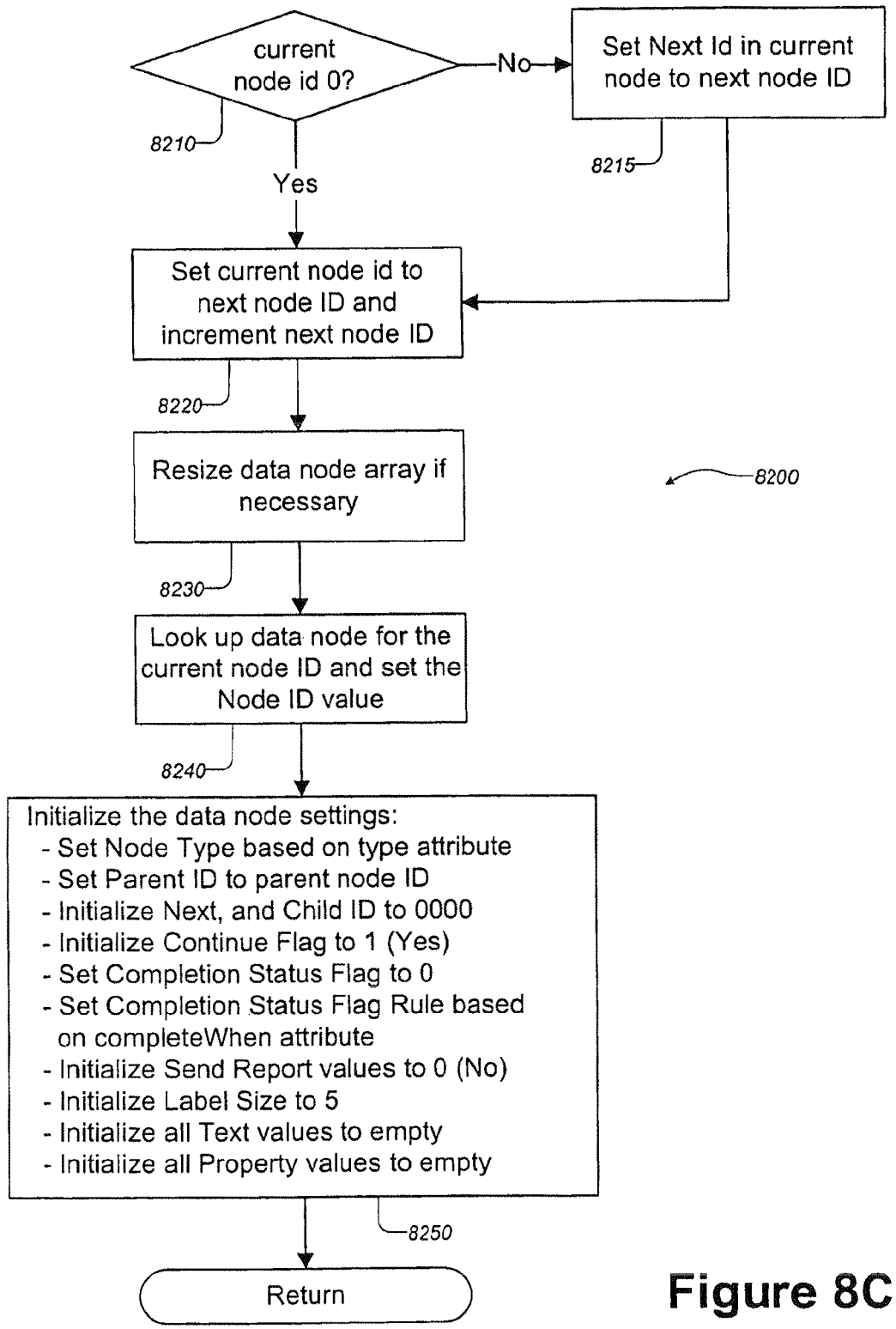

An example of a process for creating a new node is provided in FIG. 8C (8200). Initially, the value of current node id is checked (8210); if the value is not zero, then the value of NextId in the node is set to the next node ID (8215), and then the value of current node ID is set to next node ID and the next node ID is incremented (8220). If the value of current node ID is zero (8210), then the process moves directly to setting the current node ID as just described (8220).

The data node array is resized if necessary (8230). Next, the data node for the current node ID is determined, and the Node ID value is set accordingly (8240). Finally, the data node settings are initialized as illustrated (8250). The process then terminates, and the node values are set (8130).

Figure 8D:
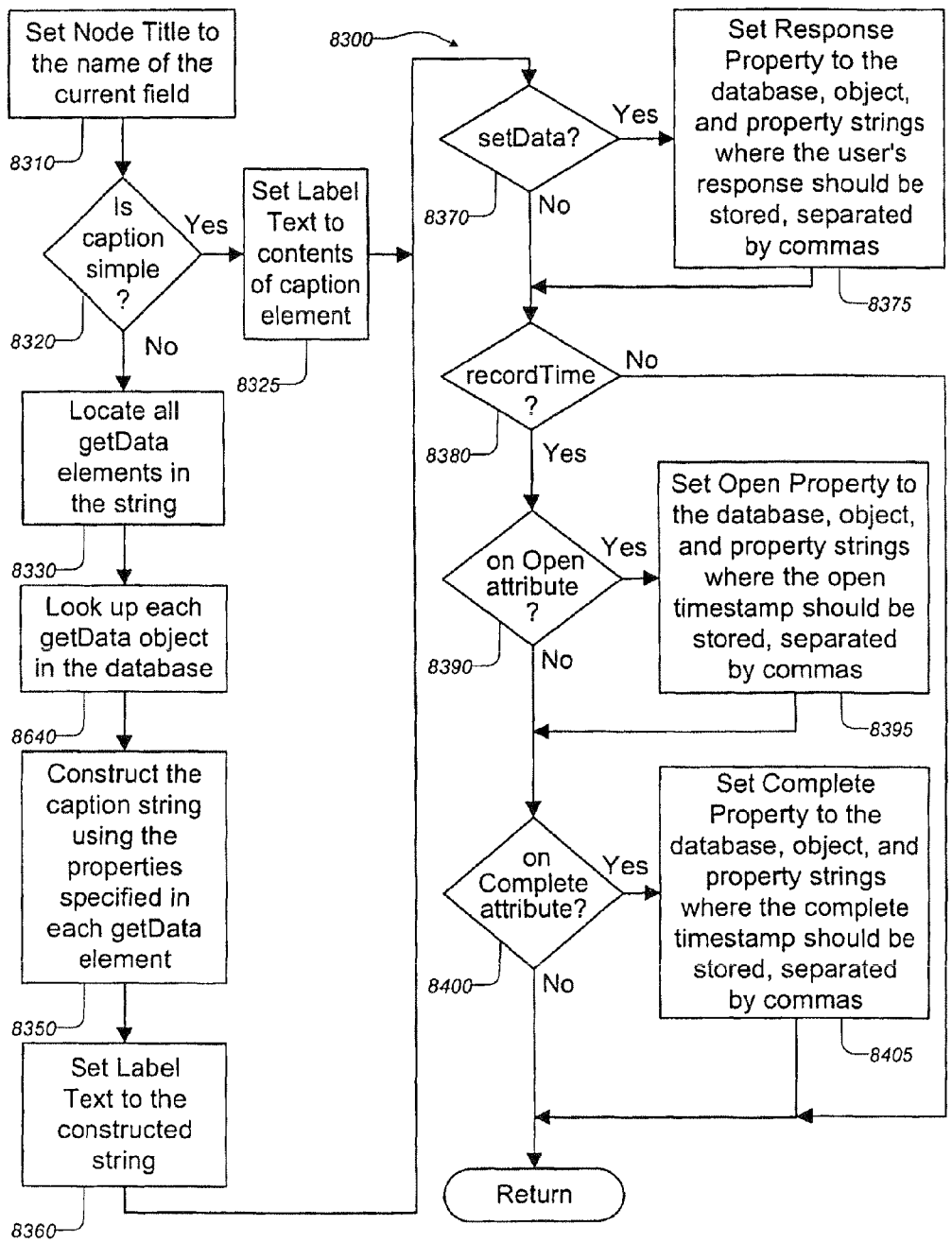

A process for setting node values is illustrated in FIG. 8D (8300). The node tide is set to the name of the current field (8310). A determination is made as to whether the caption is simple (8320), and, if so, then the label text is set to the contents of the caption element (8325), and the process moves to determine whether the value of setData is true or false (8370) as will be described below.

If the caption is not simple, then all getData elements in the string are located (8330), each getData object is located in the database (8340), the caption string is constructed using the properties specified in each getData element (8350), and the label text is set to the constructed string (8360). The process then moves to the previously mentioned setData query (8370).

If the setData flag is true, then the response property is set to the database, object, and property strings where the user's response should be stored, with any necessary formatting (e.g., separation by commas) (8375). Then, or if the setData flag is false, the recordTime flag is examined (8380). If the value of the flag is false, then the process terminates, otherwise, a check is made to determine if recordTime occurs on Open attribute (8390). If so, then the Open Property is set to the database, object, and property strings where the open timestamp is stored (8395). Otherwise, a check is made to determine if recordTime occurs on Complete attribute (8400). If so, then the Complete Property is set to the database, object, and property strings where the open timestamp is stored (8405). The process then terminates, and the links are processed (8140).

Figure 8E:
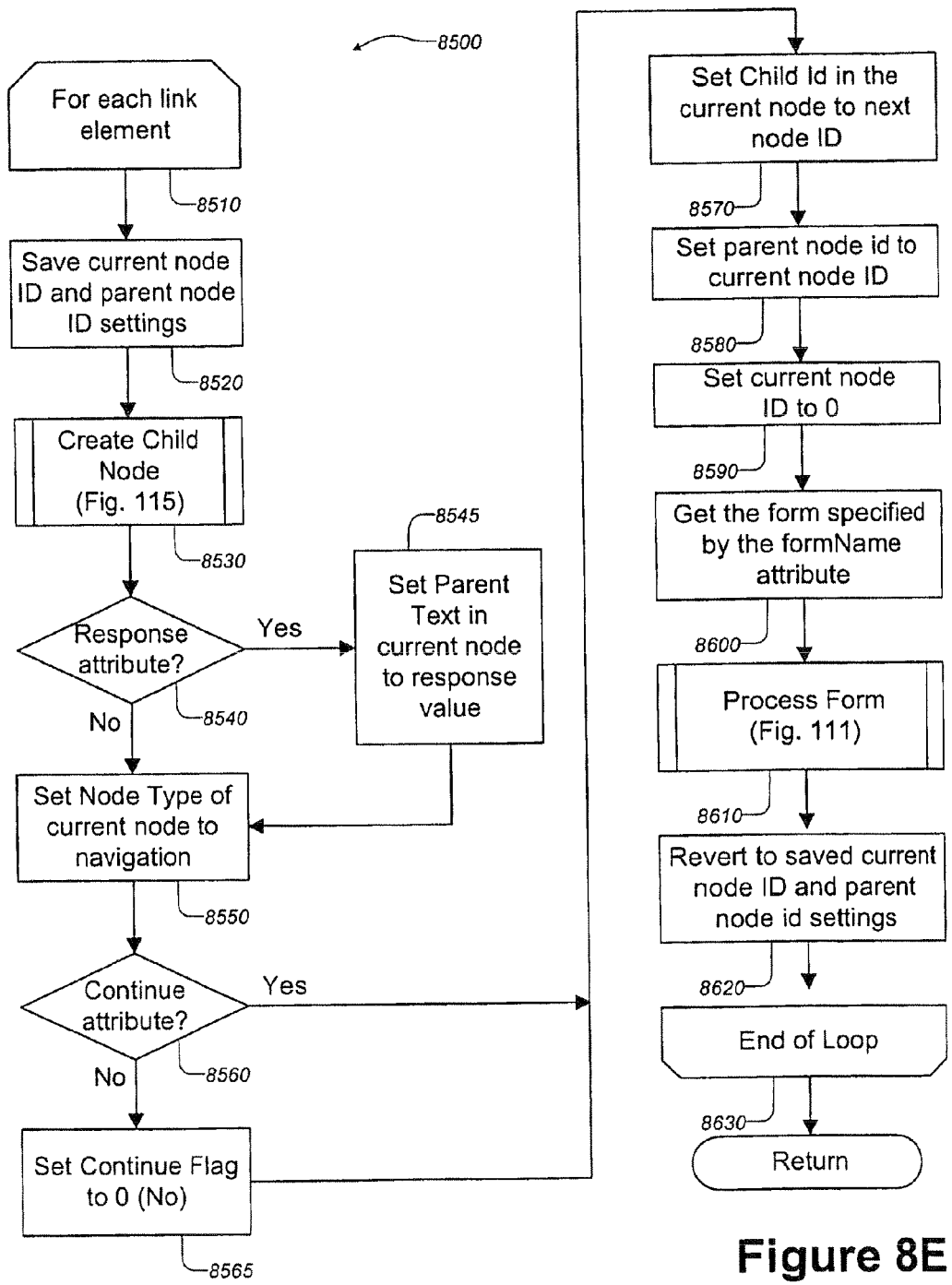

FIG. 8E illustrates a method for processing links (8500). A loop in initialized over each link element (8510). The current node ID and parent node ID settings are saved (8520), and a child node is created as described below (8530). Following creation of the child node, the response attribute flag is checked (8540). If the flag is true, then the parent text in the current node is set to the response value (8545); otherwise, the node type is set to navigation (8550). The continue attribute flag is checked next (8560). If the flag is false, then the continue flag is set to zero (8565); otherwise, and following setting the continue flag to zero (8565), the process moves to set the child ID in the current node to the next node ID (8570). Next, the parent node ID is set to the current node ID (8580), then the current node ID is set to zero (8590), and then the form specified by the formName attribute is fetched (8600). The form is then processed as described above with reference to FIG. 8B (8100). The loop then terminates (8630).

Figure 8F:
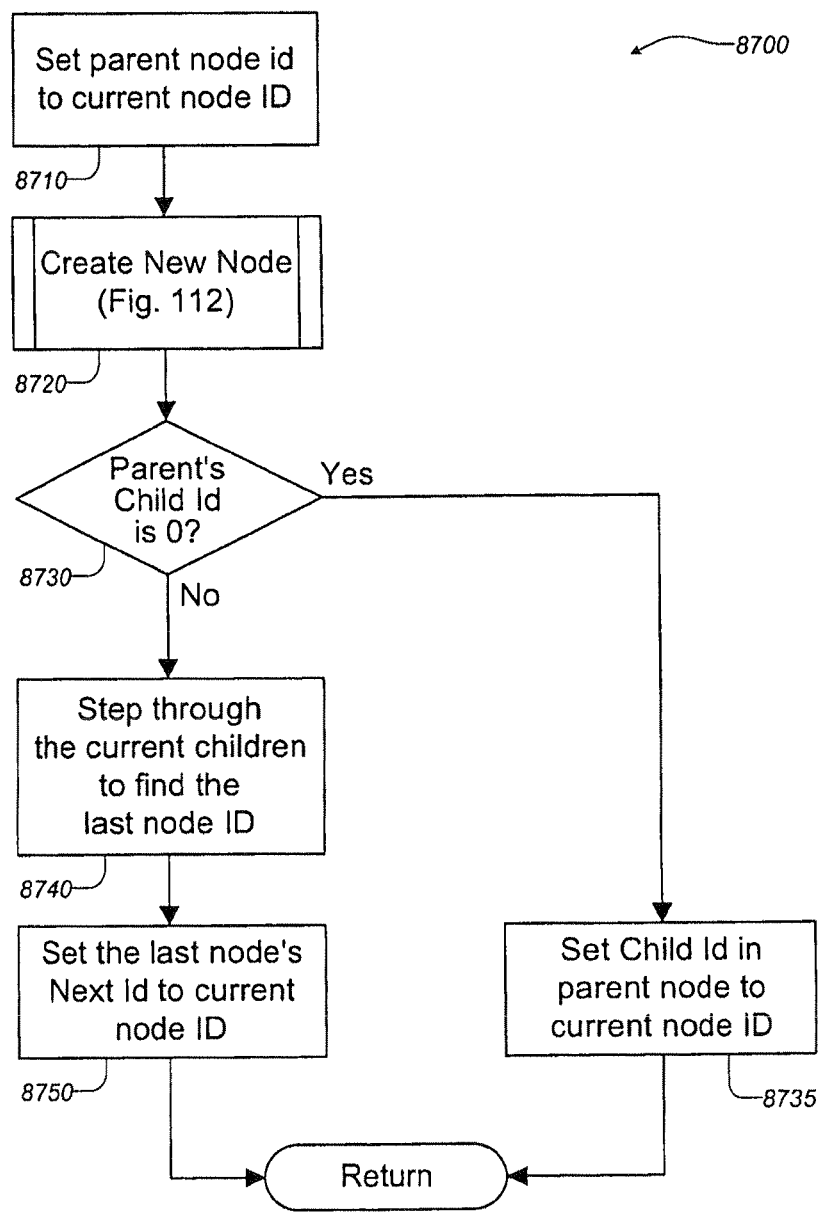

An example of a process for creating a child node (8350) is illustrated in FIG. 8F (8700). First, the parent node ID is set to the current node ID (8710). A new node is created as illustrated in FIG. 8C (8200), and the parent's child ID value is checked (8730). If the value is zero, then the Child ID value in the parent node is set to the current node ID (8735) and the process terminates; else the processes steps through each of the children to locate the last node ID (8740), the last node's next ID is set to the node ID (8750), and the process terminates.

1.1.24 Device and TDL Storage

After the nodes for a particular TDL specification have been generated, both the TDL file and the converted nodes in table form are preferably stored in the device and TDL storage. The device and TDL storage names both types of information using the TDL specification name. For the sample TDL specification shown in FIG. 6, a TDL specification name is the name assigned to the top-level form in the form. Preferably, the node file is stored in a common directory disk within device and TDL storage, and the action database is stored in a database product such as Oracle. This database is called the device and TDL storage database. The name for the node file is the form name followed by a ".nod" extension. Device and TDL storage cooperates with the Node Storage Module within the Session Manager. In a preferred exemplary illustrative non-limiting implementation, the device and TDL storage shares a database and data directories with the Node Storage Module in order to improve efficiency between the components.

It will be appreciated that the node generator (NG) can store generated node files directly to the device and TDL storage directory, and create and store action database tables directly in the device and TDL storage database.

The device and TDL storage tracks how long since a specific TDL specification has been used by a device. In one exemplary illustrative non-limiting implementation, TDL specifications that have not been referenced for more than a configurable time period are discarded. In an alternate exemplary illustrative non-limiting implementation, the maximum amount of storage to use for TDL specifications is configured, and the node manager discards the least referenced TDL specification whenever storage is needed for new forms. In yet another exemplary illustrative non-limiting implementation, the device and TDL storage supports a configurable time as well as a maximum storage capacity, and implements both deletion schemes as necessary.

The device and TDL storage and the node storage within a TPC device are preferably available at all times, so the computer system used to manage these stores can optionally use mirrored disks, dual CPU modules, and other hardware support that is well known in the art to ensure that the data remains available at all times.

The device and TDL storage also stores the results of actions performed on behalf of TDL specifications and the user responses received at devices needed to invoke these actions. The results of actions are stored so that future TDL specifications can access this information for further processing. User responses are stored so that these actions can be invoked properly. The exact format depends on the TDL specification in use. For example, this database may store character strings that are returned by actions. Alternately, the database may track complex objects that are managed by the actions and manipulated by TDL specifications. Other representations are also possible.

For the sample TDL specification shown in FIGS. 7a-7d, this database further stores the character strings entered by users of devices or returned by external integration servers invoked as part of an action. Preferably, the following fields are used to track this data:

Result Type (digit)—the type of result stored:
User Response (1)—a response entered by a user on a device.
Action (2)—a result returned by an invoked action.
Result Name (character string)—the name used to reference this result. For User Response results, this is the node ID of the node that received the user response. For Action results, this is the name for the action specified in the actionAfterReceive element. Note that actions that were not assigned a name in the TDL specification will not be stored in this database.
Device ID (format as required)—the device that stored this data. In the sample TDL specification, devices can only access their own results. That is, a device can only access results from actions performed as part of TDL specifications run on the same device. The format for this field matches the device ID format used in the node storage within the device.
Creation Date (10-digit number)—the date and time this data was received, represented as the number of seconds since Jan. 1, 2000 GMT. For User Response results, this is the timestamp given in the message header sent from the device. For Action results, this is the time at which this data is stored. This date is used for garbage collecting procedures to clean up the database based on configurable settings.
Access Date (10-digit number)—the date and time this data was last accessed by an action, represented as the number of seconds since Jan. 1, 2000 GMT. Note that Compute actions access Action results, while Action After Receive actions access User Response results. This date is used for garbage collecting procedures to clean up the database based on configurable settings.
Result String (character string or BLOB, depending on node type)—the string provided as the result of the action.

The action database is preferably indexed by the result type and name and cross-indexed by the device ID.

In an alternate exemplary illustrative non-limiting implementation, this database can support creation of result data by external server devices or operators. In this exemplary illustrative non-limiting implementation, entries can be added to this database by authorized organizations and individuals for access by devices. The device ID filed is optionally overloaded so that data can be stored for a specific device, a set of devices, or all devices. The stored data can then be accessed and included by TDL specifications requested by or sent to devices. In the sample TDL specification, such data would be accessed using the getData element.

1.1.25 Node Storage 1540

In some exemplary illustrative non-limiting implementations, high capacity node storage 1540 component is preferred to store large quantities of node information. Node storage 1540, if present, is operatively linked to Node Storage Module 1570, and serves as a high performance back end to Node Storage Module 1570. Node storage 1540 provides a central storage location for node information when several TPC device 1500's are clustered.

Node storage 1540 is preferably implemented using a commercial database product such as the database products provided by Oracle.

1.1.26 Session Manager 1550

The session manager controls the communication between a TPC device and the other device(s), including device 1100. Session Manager 1550 ("SM") retrieves (or receives) the nodes from NG 1530 or node storage 1540 and facilitates the transmission of these nodes to disparate devices such as device 1110. The Session Manager includes a Dispatch Module (1560) ("DM", described above) and a Node Store Module (1370), ("NS", described above); so the session manager is also a device as defined herein. Conversely, user responses sent from device 1110 are received by Session Manager 1330, stored in a Node Storage Module, and optionally stored in device and TDL storage 1520, or node storage 1540.

The session manager receives requests for TDL specifications from the session server (as received from external server devices) or from various devices. When a TDL specification is requested, the corresponding nodes may already be available from the node storage. If not, then the Session Manager requests that the NG produce the nodes for the form and store them in the appropriate node storage (e.g. Node Storage Module 1570, node storage 1540, device and TDL storage 1520). If multiple node storage mechanisms are used, the session manager manages the replication of node information between node storage module 1570 and node storage 1540 and device and TDL storage 1520. Once the TDL specification and corresponding nodes are available, the SM can transmit the nodes to the appropriate devices. It will be appreciated that the exemplary illustrative technology herein supports a plurality of session manager instances. Different instances of SM may be instantiated to support different types of wireless device communications networks, or multiple instances of a specific type may be instantiated to support higher traffic volumes. In one exemplary illustrative non-limiting implementation, the SM provides an emulation function that is effective to both check the integrity of the nodes and also model the operation of the nodes on the disparate device analogously to the "self-healing" feature of the TMA described above.

In addition, the SM also receives device responses from various devices and stores them in the node storage module, and optionally stores them in node storage 1540 and device and TDL storage 1520. These responses are used by the session server to invoke actions as dictated by the specific TDL specification. Examples of these actions include:

Sending an e-mail message or other notification.
Querying an external system or database for additional information.
Sending collected node information to an external system.
Invoke a method of a business object.

It is appreciated that the types of actions are limited only by the specification of the action within the TDL specification, as specified by the DTD or schema, and the configuration of external devices, services, and servers that can act on these requests.

The SM and the devices communicate in the prescribed manner to send nodes to devices and responses to the SM. The SM also manages the action database on behalf of the TDL specification performed on the device. Before a node can be sent to a device, the SM must determine that an action must be performed before the node is sent. Similarly, the SM must determine if an action should be performed upon completion of each node.

A sample algorithm for sending nodes based on the sample TDL specification in FIGS. 7a-7d to a device is shown in FIGS. 9A-9E. The algorithm includes details for receiving responses from devices and invoking actions based on these responses. Techniques for packing and segmenting messages, storing information in and retrieving information from databases, and communicating with other server-devices and processes are well known in the art, and therefore such details are not included in the figures.

Figure 9A:
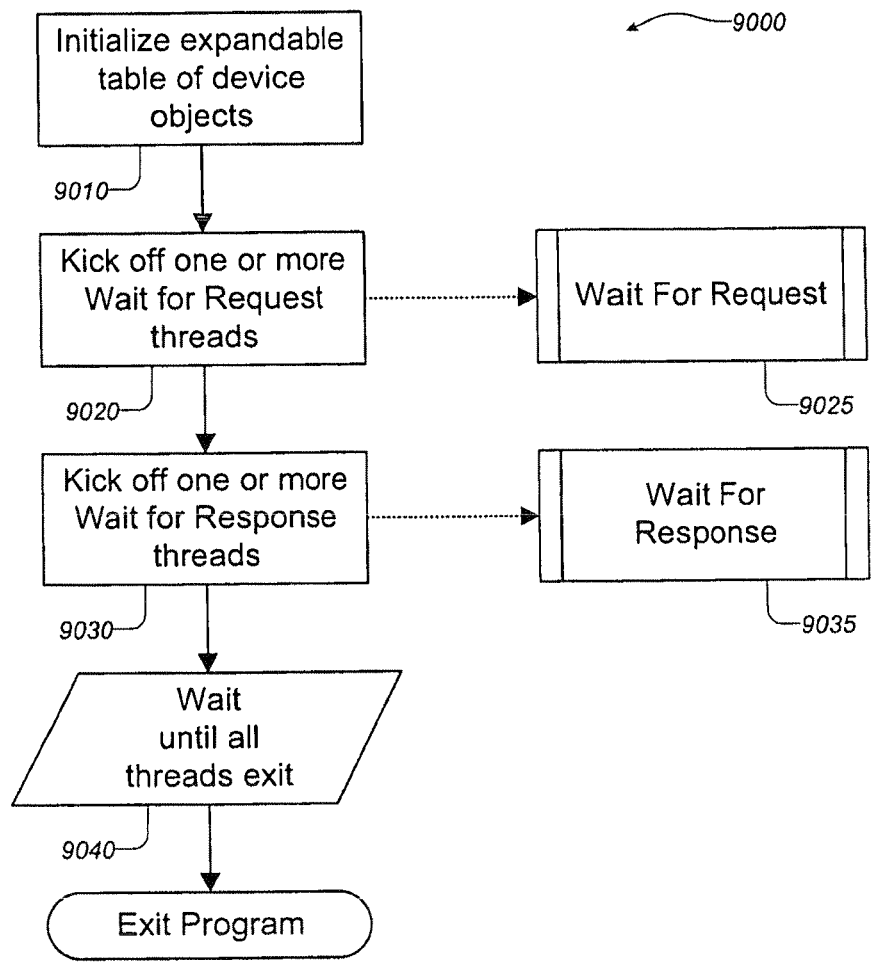
FIGS. 9A-9E illustrate an exemplary illustrative non-limiting process utilized by the session manager to send nodes to a device.

Referring to FIG. 9A, an example of a process for receiving responses is provided (9000). First, the expandable table of device objects is initialized (9010), and one or more Wait for Request threads is started (9020), which starts corresponding Wait for Request processes (9025). Next, one or more Wait for Response threads is started (9030), which starts corresponding Wait for Response processes (9035). Next, the system waits for all threads to terminate and exit (9040).

Figure 9B:
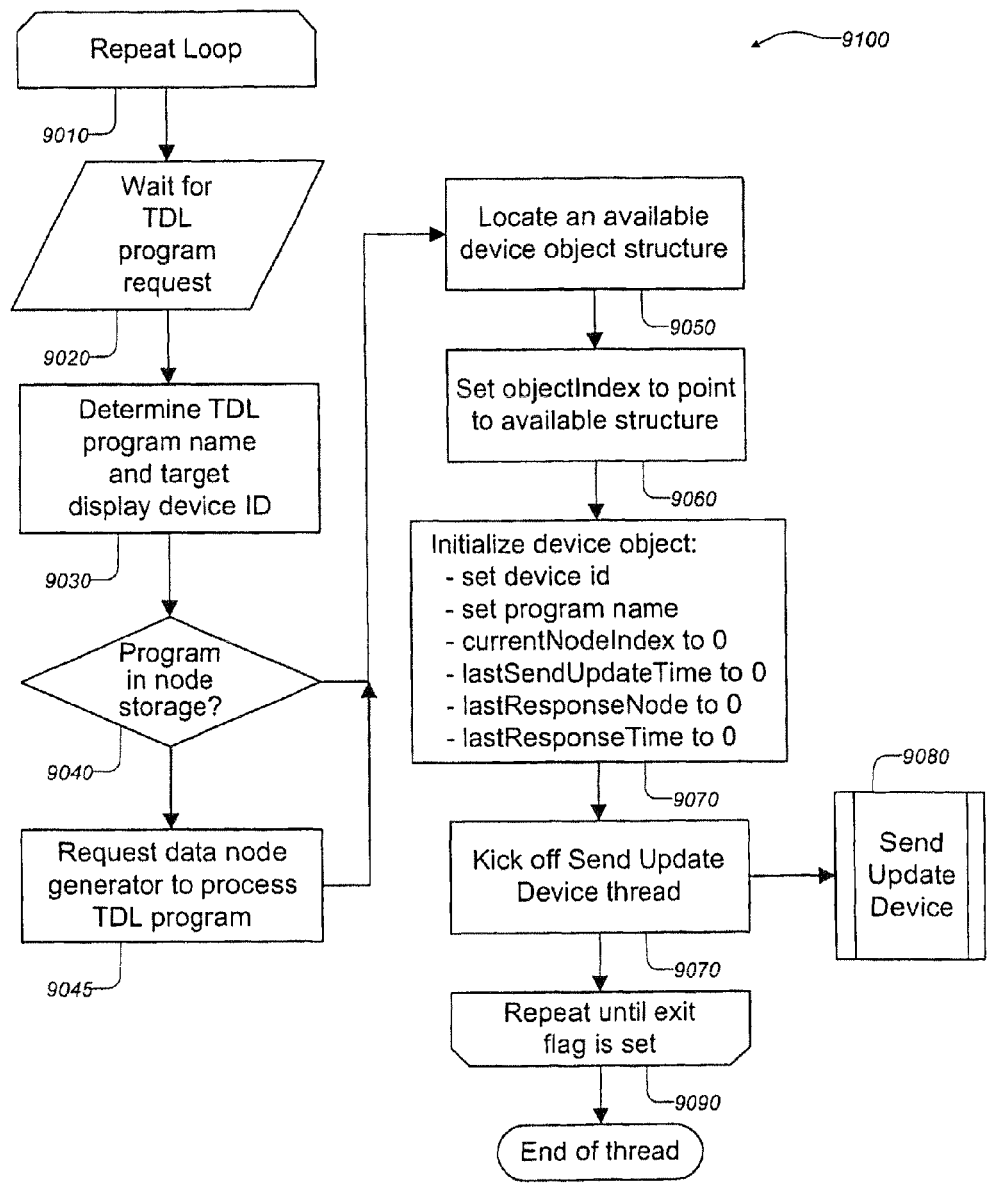

The operation of the Wait for Request process (9025) is described in FIG. 9B (9100). That process begins with a loop (9010) within which the process waits for a TDL program request (9020). When the request is answered, then the TDL program name and any target display device ID are determined (9030), and a determination is made as to whether a program is resident in node storage (9040). If no program is resident, then a request for a data node generator to process an appropriate TDL program is made (9045). Next, or if a program is found resident in node storage (9040), an available device object structure is located (9050), and the objectIndex is set to point to the available structure (9060). The device object is initialized (9070), and a Send Update Device thread is launched (9070), which begins a Send Update Device process (9080). The loop is repeated until the exit flag is set (9090), whereupon the process returns as described above with respect to FIG. 9A.

Figure 9C:
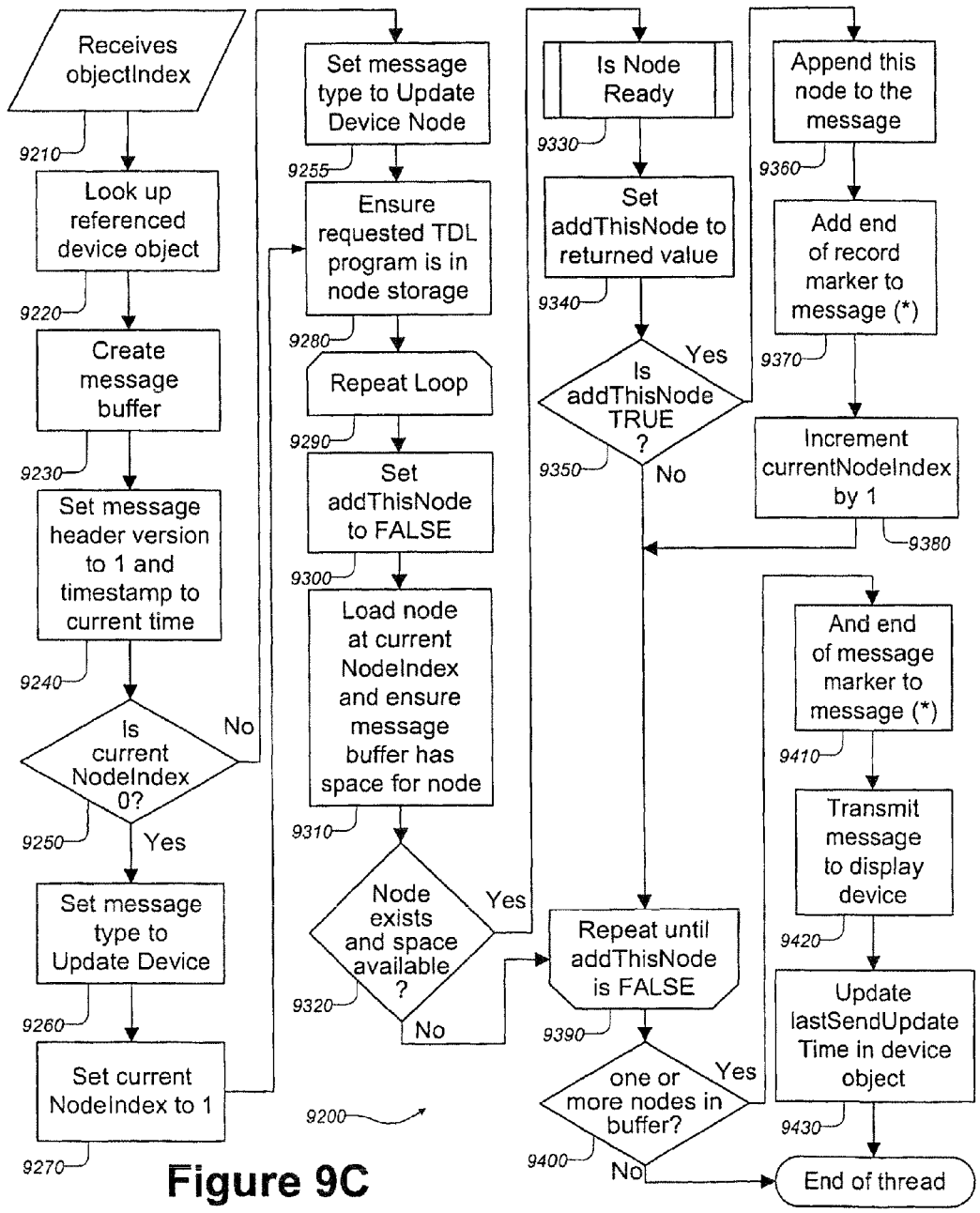

An exemplary process for the Send Update thread (9070) is provided in FIG. 9C (9200). There, the process receives an objectIndex (9210), looks up the referenced object (9020), creates a message buffer (9230), sets the message header to 1 and the timestamp to the current time (9040), and determines whether the current node index is zero (9250). If the index is not zero, then the message type is set to Update Device Node (9255). If the index is zero, then the message type is set to Update Device (9260), and the current node index is set to one (9270). Next, or following setting the message type to Update Device Node (9255), the requested TDL program is confirmed to be in node storage (9280).

Next, a loop in initiated (9290) within which addThisNode is set to false (9300), the node at the current NodeIndex is loaded and the message buffer is confirmed to have sufficient space for the node (9310, 9320). If it is not the case that the node exists and space is available, then the loop cycles until addThisNode returns false (9390). Otherwise, a process is launched to determine if the Node is ready (9330), and addThisNode is set to the value returned (9340).

The flag addThisNode is then checked (9350). If the value is false, then the loop cycles until addThisNode returns false (9390). Otherwise, the node is appended to the message (9360); and an end of record marker is added to the message (9390), and the current NodeIndex is incremented by one (9380).

When the loop exit condition, addThisNode returns false, is satisfied, then a determination is made whether one or more nodes is resident in the buffer (9400). If no nodes remain, then the process terminates. Otherwise, an end of message marker is added to the message (9410), the message is transmitted to the display device (9420), and lastSendUpdateTime is updated in the device object (9430). Then, the process terminates.

Figure 9D:
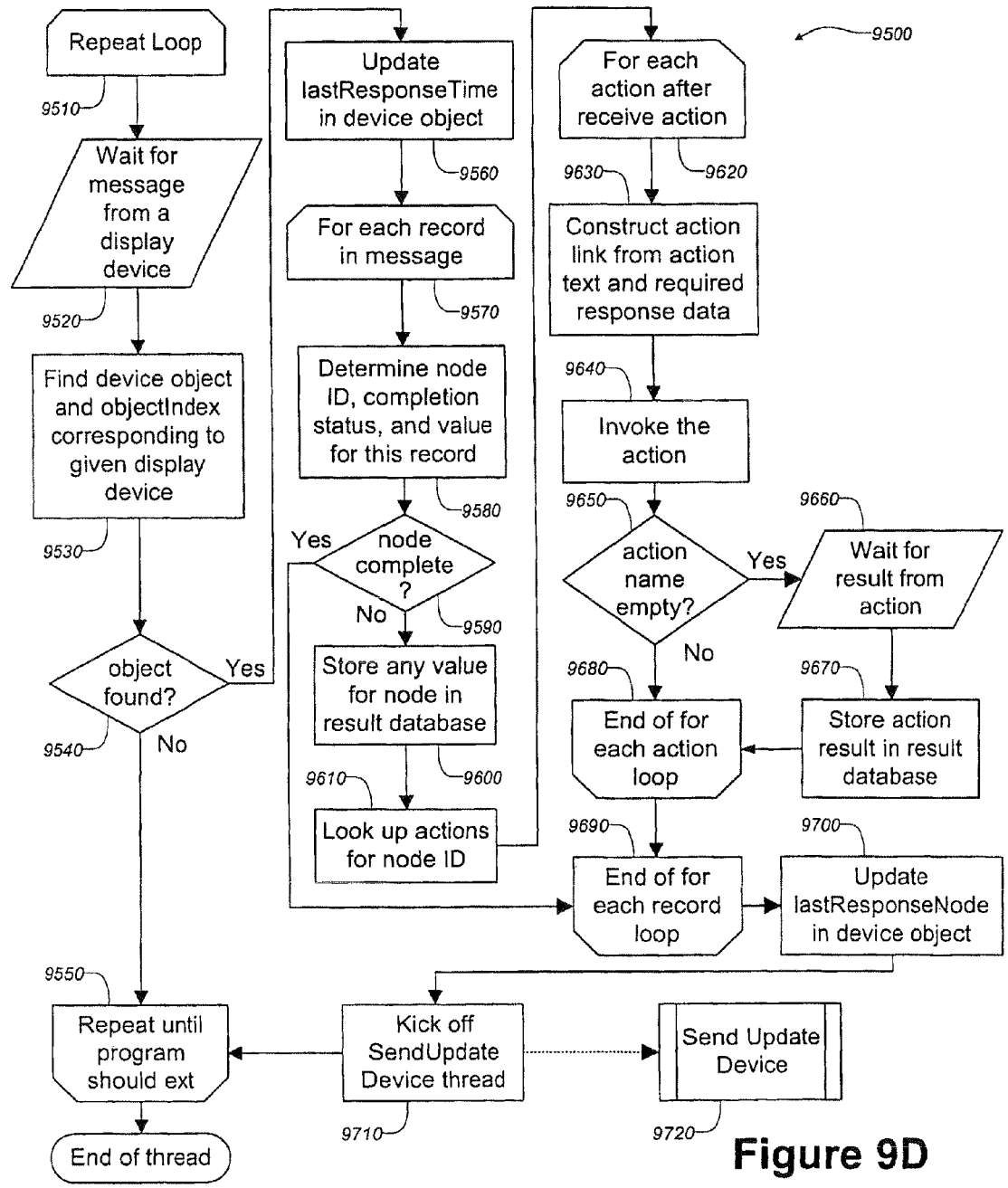

An example of the Wait for Response process (9035) is provided in FIG. 9D (9500). There, a loop is initiated (9510), within which the process waits for a message from a display device (9520). When the message is received, then the process obtains the device object and objectIndex for the device (9530, 9540). If the object cannot be found, then the loop cycles until the program should exit (9550). Otherwise, the lastResponseTime is updated for the device object (9560), and a second loop over each record in the message is initiated (9570).

Within the second loop, the node ID, completion status, and value for the current record is determined (9580, 9590). If the node is not complete, then the second loop cycles (9690). Otherwise, any value for the node is stored in the result database (9600), actions for node ID are determined (9610), and a third loop is initiated over each action after the receive action (9620).

Within the third loop, an action link is constructed from the action text and require response data (9630) and the action is invoked (9640). If the action is empty, then the process waits for the result of the action (9650, 9660), stores the action result in the result database (9670), and the loop cycles (9680). Otherwise, if the action name is not empty (9650), then the loop cycles directly thereafter (9680).

When the second and third loops have completed their cycles, the lastResponseNode in the device object is updated (9690), and the SendUpdate thread is started (9710, 9720). When that process terminates, then the first loop cycles until the program exits (9550).

Figure 9E:
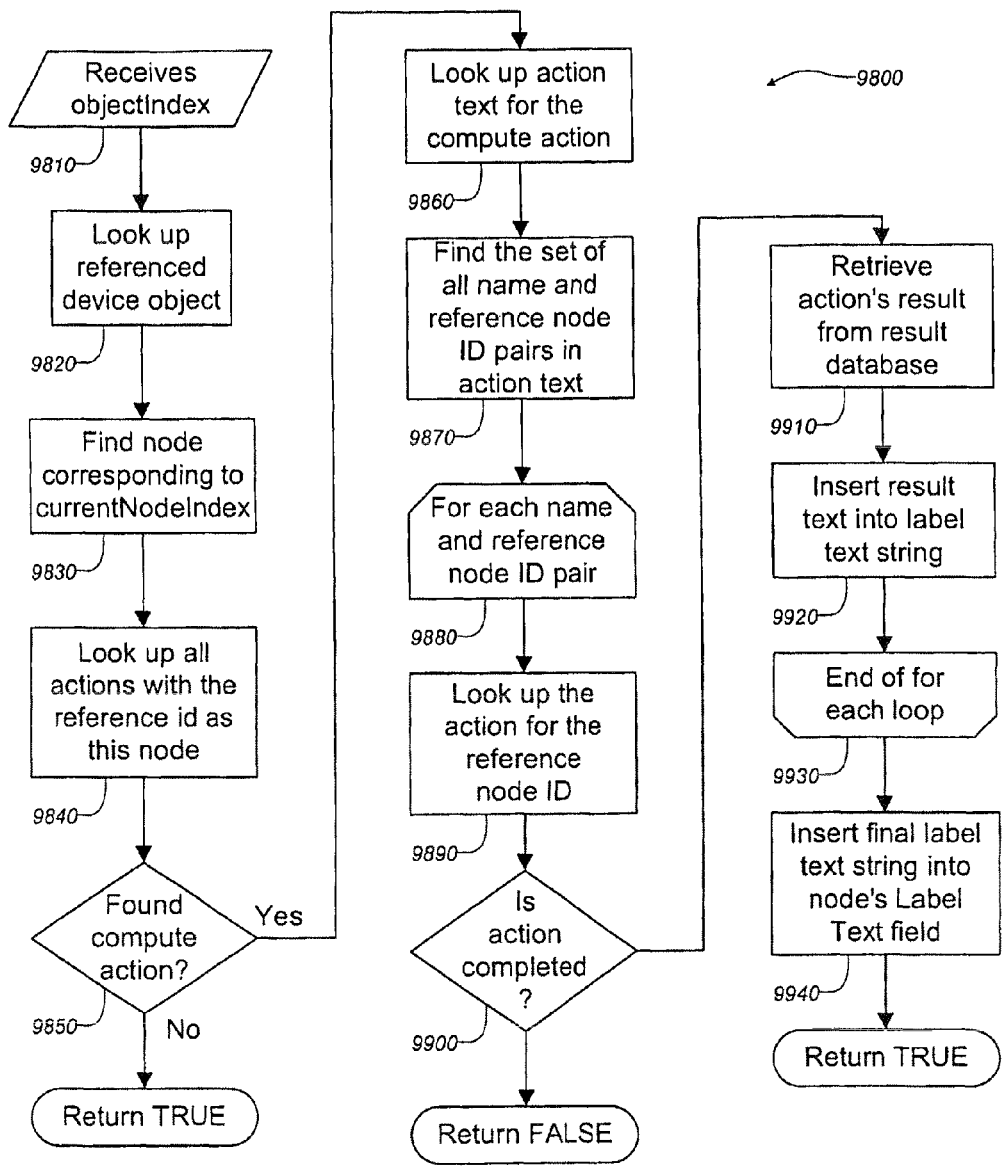

FIG. 9E illustrates an exemplary process (9800) for determining whether a node is ready (9330, FIG. 9C). The process waits to receive an objectIndex (9810), after which it looks up the referenced device object (9820), finds the node corresponding to the current nodeIndex (9830), and looks up all actions having the same reference ID as the node (9840). If a compute action is found (9850), then the process returns a value of true. Otherwise, the action text for the next compute action is identified (9860), the set of all name and reference node ID pairs in the action text is determined (9870), and a loop over each name and reference node ID pair is initiated (9880).

Within the loop, the action for the reference node ID is determined (9890, 9900). If the action is not completed, then the process returns a value of false. Otherwise, the action's result is retrieved from the database (9910), the result is inserted into the label text string (9920), and the loop cycles (9930). When the loop exits, then the final label text string is inserted into the node's Label Text field (9940), and a true value is returned by the process.

Exemplary Illustrative Integration Server-Devices

The exemplary illustrative technology herein supports server-devices that provide integration and user interface capabilities to the exemplary illustrative technology herein. Collectively, these server-devices are called Integration Server-devices. In addition, each component of the integration server-devices are scalable, i.e., the component may be replicated to support more devices. Multiple instances of components of integration server-devices can also be clustered to provide greater capacity. Integration server-devices come in several types, depending upon their use and role in deployments of the exemplary illustrative technology herein. Some of these server-device types are listed below:
- UI server
- XML integration server
- E-mail integration server
- FTP integration server
- HTTP integration server The UI server permits web-enabled users to define TDL specifications and assign them to specific devices for processing. In simplest form, the UI server is a web-based application that lets the user select one or more devices, one or more TDL specifications, and submits those TDL specifications and the list of devices to send the specifications to the TPC device for further processing. The UI server also obtains results from TPC device and displays them for the user.

The UI server interacts with the session server-device in to coordinate the selection, submission, and results reporting as described above.

The design and development of web-based applications that interface to a database is well understood by those skilled in the art.

The XML integration server provides integration between external systems and the exemplary illustrative technology herein. The XML integration server submits TDL specification requests and form specifications as TDL documents to the TPC device for processing and dispatch. Upon dispatch and completion of a form by a device, the XML integration server collects the results of the TDL specification processing and packages and returns these results to the external source.

External sources take many forms. Often, they are applications that provide support to a business or other entity. External sources are not part of the exemplary illustrative technology herein and are referenced herein solely for illustrative purposes. Often, external sources have a connector or other XML-based integration component by which information and requests may be passed to and from the external source. The XML integration server interfaces with these connectors in ways that are well understood in the art.

The XML integration server performs bi-directional translations between external XML structures and messages and the internal TDL-centric interface to the session manager. These translations are defined using a pre-defined "vocabulary" of messages and fields called "Integration Tags". An example of some integration tags is provided in Appendix A.

The XML integration server interacts with the session server-device to coordinate the selection, submission, and collection of results associated with TDL specifications. Preferably, the XML integration server provides a web services interface associated with each business object, in addition to a general XML document interface. The web services interface supports business object method calls that implement specific actions defined in a TDL specification. Each time a TDL specification is processed by the node generator, the web service interface is updated to reflect changes to the defined business object definitions. In one exemplary illustrative non-limiting implementation, the Node Generator provides the configuration information to the XML integration server's web service interface by writing the information to a configuration file used by the XML integration server. Alternatively, the information may be written to a database such as the Device and TDL Storage database, from which the XML integration server takes its configuration data. In yet another exemplary illustrative non-limiting implementation, the information may be written to one of the XML integration server's web service interfaces, and then used by the XML integration server to further configure its web interfaces.

The XML integration server's web services interface, in part, is dynamically generated on the basis of TDL processing performed by the node generator. Using the configuration information provided to the XML integration server, the TDL specification of actions and parameters are dynamically mapped by the XML integration server to provide the business object specific method calls.

For example, the XML integration server is used to implement one feature of the exemplary illustrative technology herein. QuickBooks is a commonly used software package that provides accounting and bookkeeping. The capability of the exemplary illustrative technology herein to associate work information from a wireless device with QuickBooks invoices and to automatically generate QuickBooks invoices as work is performed is a valuable features that saves users of the exemplary illustrative technology herein significant amounts of time and effort.

The QuickBooks integration function can be performed using a variety of programming techniques, including using a built-in XML loader, a pre-defined programming interface accessed custom application code, or a variety of other methods. The exemplary illustrative technology herein describes QuickBooks integration using the XML integration server and assumes a built-in XML connector in the QuickBooks application. The connector takes XML information in a published format and performs all necessary functions in Quick-Books to create the invoice.

The QuickBooks Invoice TDL specification is a well known form that is used in this example to define the invoice elements to collect from the device, and contains a final action the instructs the TPC device to package the results and send them to QuickBooks via the XML integration server.

In this example, a telephone call center staff member might dispatch a repairman to a customer site by sending a work request to a specific repairman's device and specifying the QuickBooks Invoice form as the final TDL specification to be used. The QuickBooks Invoice TDL specification specifies steps that include the following steps:
Device: Print an invoice to the local printer using a specified invoice template.
TPC device: Package the invoice information and send it to QuickBooks.

It is appreciated that many other steps may be specified, and that these steps have been omitted from this example for clarity.

Upon completing the form, the repairman reaches the "Print an Invoice" step and a copy of the invoice is printed for the customer using a printer at the job site or connected to the device). After the invoice is successfully printed, the printing status is synchronized with the TPC device and the "Package the invoice" node is executed by the TPC device. The session manager executes the "Package Invoice" instruction and notifies the session server-device to package and send the invoice information. The session server-device packages the information, identifies the XML integration server session to use, and then obtains the node information from the database and sends this information to the XML integration server. The XML integration server reformats the nodes into the XML format required by the QuickBooks connector, and forwards the XML to the QuickBooks connector. Upon receipt of the XML document from the XML integration server, the Quick-Books connector creates an object in the QuickBooks application and fills in the invoice details.

Translation between node internal formats and the TDL formats is discussed above.

In an alternate example, the XML integration server is used to implement integration with Primavera, a project management software that is commonly used. Primavera provides scheduling of tasks and people and its use is well understood in the art. It is appreciated that the Primavera integration could be performed using a variety of programming techniques, including custom application code. This example supports Primavera integration using a custom application that reads the Primavera database and determines tasks that are assigned to people with mobile devices. Based upon information contained within the task information stored in Primavera, the Primavera integration component uses the XML integration server web services calls to determine the device ID, user IDs, and the name of the TDL specification to use. The Primavera integration component constructs an XML document that names the device ID, a reference to the form to be used for the task, and defines a response step that collects the results and updates Primavera when the task is complete. The Primavera integration component forwards this information to the XML integration server. The XML integration server submits the TDL specification to the session server, which causes the TDL specification to be converted and dispatched as described above. Upon completion, the last node in the form is a server-device request that requests that the session server package up the completed nodes and instructs the session server to forward them to the XML integration server. The XML integration server then converts these nodes to XML format and sends the completed information to the Primavera integration component, which updates the Primavera database.

The Primavera integration component preferably utilizes the "suspend communications" and "resume communications" features of the session manager to optimize message traffic between session manager and devices during the process of synchronizing the system with Primavera. The use of the "suspend communications" feature substantially improves the performance of compression, encryption, and other node management capabilities during transmission by permitting large numbers of nodes to be grouped together in a single transmission.

The E-mail integration server provides the exemplary illustrative technology herein with the capability to send e-mails as part of a node action. E-mail servers are well understood in the art.

The FTP integration server provides the exemplary illustrative technology herein with the capability to send and receive files using the FTP protocol. FTP file transmission is well understood in the art.

The HTTP integration server provides the exemplary illustrative technology herein with the capability to submit HTTP requests to external web servers present either on an intranet or the Internet, and to receive and parse the results returned from the external web servers. Automated interaction with web servers is well understood in the art.

Example Illustrative Non-Limiting Applications of the Technology Herein

One use of the exemplary illustrative technology herein is to provide a mechanism for automatically collecting and synchronizing information related to call detail and contents of the personal information manager (PIM) database common in modern cellular telephones. In this example use of the exemplary illustrative technology herein, a TDL specification for a wireless application is defined that accepts callbacks from the call detail and PIM integration features of the cellular telephone, and manages this information through a complete collection and accrual cycle. These callbacks are present in current generation Blackberry mobile devices. When a call is completed, the external program on the mobile device that handles the call makes an external callback to the client of the exemplary illustrative technology herein. The client accepts the callback, and processes a form that collects additional information from the user. In this example, the form is used to collect a client billing number and a brief description of the call from the user, and integrates that user-entered information with call detail information such as the timestamp for the call, the duration of the call, and the phone number of the call's counterparty taken from the phone. Preferably, this is performed using an Associated node or by using a template of node information. This information is managed by the system of the exemplary illustrative technology herein and integrated with a timesheet, accounting, and CRM programs such as QuickBooks as defined by the process flow described in the TDL.

In an additional usage, the exemplary illustrative technology herein may be used to integrate and extend the PIMs incorporated on devices. In this example usage, the FDL describes a business process flow that occurs when the user enters an appointment with a specific customer on their calendar. The PIM performs a callout to the client of the exemplary illustrative technology herein, which collects the appointment data from the PIM and stores it in a set of nodes. When the nodes are transmitted to a device that has real-time Internet access, that server device translates the appointment information to a Internet query and fetches a map and driving directions using that customer's location data and associates the map image and driving directions with the appointment. When the additional information is forwarded to the device, it is reintegrated with the PIM's database by the device's client calling the PIM's API using the external call feature of the respective nodes.

APPENDIX A

TABLE OF EXEMPLARY ILLUSTRATIVE NON-LIMITING INTEGRATION TAGS AND MESSAGES

| Tag Name | How Used | Rqd | Default Value |
|---|---|---|---|
| newWorkOrderMsg - creates a new work order. | | | |
| workOrderNo | Specifies the work order number to be created. | Yes | None |
| csrUserName | Specifies the CSR username. | Note 1 | See Note 1. |
| csrPassword | Specifies the CSR password | Note 1 | See Note 1. |
| csrFirstName | Specifies the CSR's first name. | Note 2 | See Note 2. |
| csrLastName | Specifies the CSR's last name. | Note 2 | See Note 2. |
| requestDesc | Customer's problem description or request description Normally entered in the Request tab of the Jumpstart application. | No | Not Specified |
| requestTime | Time that request was created. Format: (mm/dd/yyyy hh:mm am/pm) | No | Current date and time value. |
| priority | One of the following: Urgent, High, Medium, or Low | No | Medium |

APPENDIX A-continued

TABLE OF EXEMPLARY ILLUSTRATIVE NON-LIMITING
INTEGRATION TAGS AND MESSAGES

| Tag Name | How Used | Rqd | Default Value |
|---|---|---|---|
| contLastName | Last name of person who requested the service. | No | None |
| contFirstName | First name of person who requested the service. | No | custName |
| contUserName | user name of contact. | No | contFirstName |
| contPhone | Requester's phone number | No | None |
| contMobilePh | Requested's mobile number. | No | None |
| custName | Name of customer requiring service. | Yes | None |
| custLocationId | Unique customer location ID. | Note 5 | See Note 5. |
| custLocObjId | Location's object ID in $3^{rd}$ party package. | Note 5. | See Note 5. |
| custAddr | Street Address where work is to be performed. | Yes | None |
| custCity | City where work is to be performed. | No | None |
| custState | State where work is to be performed. | No | None |
| custZip | Zip code where work is to be performed | No | None |
| scheduledTime | Time that the work order was scheduled. Format: (mm/dd/yyyy hh:mm am/pm) | No | Current date/time. |
| workerUserName | Worker userid used to uniquely identify worker to perform service, or a comma separated list of worker uernames. | Yes | None |
| taskDescName | Name of task description | No | Service Call |
| taskDesc | Task description description. | No | Standard Service Call. |
| modifyWorkOrderMsg - modifies an existing work order ||||
| workOrderNo | Specifies the work order number to be modified. | Yes | None |
| csrUserName | Specifies the CSR username. | Note 1 | See Note 1. |
| csrPassword | Specifies the CSR password | Note 1 | See Note 1. |
| csrFirstName | Specifies the CSR's first name. | No | None |
| csrLastName | Specifies the CSR's last name. | No | None |
| requestDesc | Customer's problem description or request description Normally entered in the Request tab of the Jumpstart application. | No | None |
| requestTime | Time that request was created. Format: (mm/dd/yyyy hh:mm am/pm) | No | Current date and time value. |
| contUserName | user name of person who requested service | Note 6 | See Note 6. |
| contLastName | Last name of person who requested the service. | No | None |
| contFirstName | First name of person who requested the service. | No | None |
| contPhone | Requester's phone number | No | None |
| contMobilePh | Requester's mobile number. | No | None |
| custLocationId | Unique customer location ID. | Notes 5 and 7 | See Notes 5 and 7. |
| custLocObjId | Location's Object ID in $3^{rd}$ party package. | Notes 5 and 7 | See Notes 5 and 7. |
| custAddr | Street Address where work is to be performed. | No | None |
| custCity | City where work is to be performed. | No | None |
| custState | State where work is to be performed. | No | None |
| custZip | Zip code where work is to be performed | No | None |
| scheduledTime | Time that the work order was scheduled. Format: (mm/dd/yyyy hh:mm am/pm) | No | None |
| taskDescName | Name of task desc. | Note 8 | None |
| cancelWorkOrderMsg - cancels a work order including all tasks within. ||||
| workOrderNo | Specifies the work order number to be modified. | Yes | None |
| csrUserName | Specifies the CSR username. | Note 1 | See Note 1. |
| csrPassword | Specifies the CSR password | No | See Note 1. |
| reAssignWorkOrderMsg - re-assigns the first task to another worker. ||||
| workOrderNo | Specifies the work order number to be modified. | Yes | None |
| csrUserName | Specifies the CSR username. | Note 1 | See Note 1. |
| csrPassword | Specifies the CSR password | Note 1 | See Note 1. |
| workerUserName | Worker userid used to uniquely identify worker to perform service. | Yes | None |

APPENDIX A-continued

TABLE OF EXEMPLARY ILLUSTRATIVE NON-LIMITING
INTEGRATION TAGS AND MESSAGES

| Tag Name | How Used | Rqd | Default Value |
|---|---|---|---|
| workerFirstName | Worker's first name. | No | Joe (or what was previously supplied with workUserName |
| workerLastName | Worker's last name | No | Worker (or what was previously supplied with workerLastName) |
| queryWorkOrderStatusMsg - query jumpstart for work order status. | | | |
| csrUserName | Specifies the CSR username. | Note 1 | See Note 1. |
| csrPassword | Specifies the CSR password | No | See Note 1. |
| workOrderNo | Specifies the work order to query. | No | None |
| fromDate | Returns all work orders whose scheduledDate is less than or equal to the specified fromDate | No | None. |
| toDate | Returns all work orders whose scheduledDate is less than or equal to the specified fromDate | No | None. |
| workerUserName | Return status on all worker orders assigned to workerUserName | No | None. |
| newTaskMsg - adds a task to an existing work order | | | |
| workOrderNo | Specifies the work order to add task to. Work order must exist. | Yes | None |
| csrUserName | Specifies the CSR username. | Note 1 | See Note 1. |
| csrPassword | Specifies the CSR password | Note 1 | See Note 1. |
| scheduledTime | Time that the work order was scheduled. Format: (mm/dd/yyyy hh:mm am/pm) | No | Current date/time. |
| workerUserName | Worker userid used to uniquely identify worker to perform service, or a comma separated list of worker uernames. | Yes | None |
| taskDescName | Name of task description | No | Service Call |
| cancelTaskMsg - cancels a Task | | | |
| csrUserName | Specifies the CSR username. | Note 1 | See Note 1. |
| csrPassword | Specifies the CSR password | Note 1 | See Note 1. |
| taskId | Task ID of task to be canceled. Tasks are numbered by appending an dot plus an integer to the base work order number. (e.g. if the work order number was 0001 and there were two tasks in that work order, they would be 0001.1 and 0001.2.) | Yes | None |
| reAssignTaskMsg - Reassigns a Task to another worker | | | |
| csrUserName | Specifies the CSR username. | Note 1 | See Note 1. |
| csrPassword | Specifies the CSR password | Note 1 | See Note 1. |
| taskId | Task ID of task to be re-assigned. Tasks are numbered by appending an dot plus an integer to the base work order number. (e.g. if the work order number was 0001 and there were two tasks in that work order, they would be 0001.1 and 0001.2.) | Yes | None |
| workerUserName | username of worker to whom task is to be re-assigned. | Yes | None |
| newCustomerMsg - creates a new customer in the system. | | | |
| customerId | Specifies the customer ID. If Not specified, defaults to the custName field. | No | custName |
| custObjId | customer's object ID in 3$^{rd}$ party package | No | None |
| csrUserName | Specifies the CSR username. | Note 1 | See Note 1. |
| csrPassword | Specifies the CSR password | Note 1 | See Note 1. |
| custLocationId | Unique customer location ID. | Note 5 | See Note 5. |
| custLocObjId | Location's object ID in 3$^{rd}$ Party package. | Note 5 | See Note 5. |
| custName | Name of customer (should be unique) | Yes | None |
| custAddr | Customer's main/billing address. | Yes | None |
| custCity | Customer's main/billing city. | No | None |
| custState | Customer's main/billing state. | No | None |
| custZip | Customer's main/billing zip. | No | None |

APPENDIX A-continued

TABLE OF EXEMPLARY ILLUSTRATIVE NON-LIMITING INTEGRATION TAGS AND MESSAGES

| Tag Name | How Used | Rqd | Default Value |
| --- | --- | --- | --- |
| contFirstName | Customer contact first name. | Yes | None |
| contLastName | Customer contact last name | No | None |
| contUserName | Unique userid used to find contact | No | custName + "." + contFirstName + "." + contLastName |
| contRole | Contact's role/position (e.g. Supervisor) | No | None |
| contPhone | Contact's primary phone number | No | None |
| contMobilePhone | Contact's mobile phone number | No | None |
| contEmailAddr | Contact's email address | No | None |
| contLocationId | Contact's location ID. | Note 5 | See Note 5 |
| contLocObjId | Contact's location object ID in 3$^{rd}$ party package. | Note 5 | See Note 5 |
| custIsTaxable | Boolean value (true/false) specifying whether the customer is taxable or Not | Yes | Defaults to true. |
| locTaxRate | Tax rate associated with above specified location | No | 7.00% |
| colspan: modifyCustomerMsg - modifies a previously created customer. | | | |
| customerId | Specifies the customer ID. If Not specified, defaults to the custName field. | None | custName |
| csrUserName | Specifies the CSR username. | Note 1 | See Note 1. |
| csrPassword | Specifies the CSR password | Note 1 | See Note 1. |
| custLocationId | Change main/billing address by specifying new location ID. | No | None |
| custLocObjId | Location's object ID in 3$^{rd}$ Party application. | No | None |
| custIsTaxable | Boolean value (true/false) specifying whether the customer is taxable or Not | Yes | Defaults to true. |
| custTaxRate | Tax rate associated with above specified location | No | 0.00% |
| colspan: newCustAddrMsg - adds a customer address to an existing customer. | | | |
| customerId | Specifies the customer ID. If Not specified, defaults to the custName field. | No | custName |
| custObjId | Customer Object ID in 3$^{rd}$ Party package | No | None |
| csrUserName | Specifies the CSR username. | Note 1 | See Note 1. |
| csrPassword | Specifies the CSR password | Note 1 | See Note 1. |
| custName | Name of customer requiring service. | Yes | None |
| custLocationId | Unique customer location ID. | Note 5 | See Note 5. |
| custLocObjId | Location Object ID in 3$^{rd}$ party package. | Note 5 | See Note 5. |
| locTaxRate | Tax rate for this location | No | Default tax rate for company or zero if No tax rate is specified. |
| custAddr | Customer's main/billing address. | Yes | None |
| custCity | Customer's main/billing city. | No | None |
| custState | Customer's main/billing state. | No | None |
| custZip | Customer's main/billing zip. | No | None |
| colspan: ModifyCustAddrMsg | | | |
| csrUserName | Specifies the CSR username. | Note 1 | See Note 1. |
| csrPassword | Specifies the CSR password | Note 1 | See Note 1. |
| custName | Name of customer requiring service. | Yes | None |
| custLocationId | Unique customer location ID. | Note 5 | See Note 5. |
| custLocObjId | Location Object ID in 3$^{rd}$ Party application. | Note 5 | See Note 5. |
| locTaxRate | Tax rate for this location | No | Default tax rate for company or zero if No tax rate is specified. |
| custAddr | Customer's main/billing address. | No | None |
| custState | Customer's main/billing state. | No | None |
| custZip | Customer's main/billing zip. | No | None |
| colspan: newCustContactMsg | | | |
| customerId | Specifies the customer ID. If Not specified, defaults to the custName field. | None | custName |

APPENDIX A-continued

TABLE OF EXEMPLARY ILLUSTRATIVE NON-LIMITING INTEGRATION TAGS AND MESSAGES

| Tag Name | How Used | Rqd | Default Value |
| --- | --- | --- | --- |
| csrUserName | Specifies the CSR username. | Note 1 | See Note 1. |
| csrPassword | Specifies the CSR password | Note 1 | See Note 1. |
| contFirstName | Customer contact first name. | Yes | None |
| contLastName | Customer contact lastname | Yes | None |
| contUserName | Unique userid used to find contact | No | custName + "." contFirstName + "." contLastName |
| contRole | Contact's role/position (e.g. Supervisor) | No | None |
| contPhone | Contact's primary phone number | No | None |
| contMobilePhone | Contact's mobile phone number | No | None |
| contEmailAddr | Contact's email address | No | None |
| *modifyCustContactMsg* | | | |
| csrUserName | Specifies the CSR username. | Note 1 | See Note 1. |
| csrPassword | Specifies the CSR password | Note 1 | See Note 1. |
| contFirstName | Customer contact first name. | No | None |
| contLastName | Customer contact lastname | No | None |
| contUserName | Unique userid used to find contact | Yes | None |
| contRole | Contact's role/position (e.g. Supervisor) | No | None |
| contPhone | Contact's primary phone number | No | None |
| contMobilePhone | Contact's mobile phone number | No | None |
| contEmailAddr | Contact's email address | No | None |
| *newTaskDescMsg - creates a new task description.* | | | |
| csrUserName | Specifies the CSR username. | Note 1 | See Note 1. |
| csrPassword | Specifies the CSR password | Note 1 | See Note 1. |
| taskDescName | TaskDesc name | Yes | None |
| taskDescDescription | Description of task | No | None |
| *modifyTaskDescMsg* | | | |
| csrUserName | Specifies the CSR username. | Note 1 | See Note 1. |
| csrPassword | Specifies the CSR password | Note 1 | See Note 1. |
| taskDescDescription | Description of task | No | None |
| *newDeviceMsg* | | | |
| csrUserName | Specifies the CSR username. | Note 1 | See Note 1. |
| csrPassword | Specifies the CSR password | Note 1 | See Note 1. |
| carrierName | One of the following: SkyTel, NexTel, Arch | Yes | None |
| deviceType | J2ME, P935, T900, Email | Yes | None |
| pinNumber | Required for pagers (used as the deviceA) | (pagers, only) | None |
| phoneNumber | Required for J2ME devices. | (J2ME, only) | None |
| emailAddress | Required for J2ME devices. | (J2ME, only) | None |
| *modifyDeviceMsg* | | | |
| csrUserName | Specifies the CSR username. | Note 1 | See Note 1. |
| csrPassword | Specifies the CSR password | Note 1 | See Note 1. |
| deviceAddress | Lookup device by device address (phone number for J2ME devices and pinNumber for pagers). | Yes | None |
| pinNumber | Changes device's pinNumber | No | None |
| phoneNumber | Changes device's phoneNumber | No | None |
| emailAddress | Changes device's emailAddress | No | None |
| *newWorkerMsg - creates a new worker.* | | | |
| csrUserName | Specifies the CSR username. | Note 1 | See Note 1. |
| csrPassword | Specifies the CSR password | Note 1 | See Note 1. |
| workerFirstName | Worker's first name | Yes | None |
| workerLastName | Worker's last name | No | None |
| workerUserName | Unique username used to look up worker | Yes | None |
| workerPassword | Used for authentication | Yes | None |
| workerObjId | Worker's object ID in $3^{rd}$ party package | No | None |

APPENDIX A-continued

TABLE OF EXEMPLARY ILLUSTRATIVE NON-LIMITING
INTEGRATION TAGS AND MESSAGES

| Tag Name | How Used | Rqd | Default Value |
|---|---|---|---|
| billingIncrement | Inrement for rounding billable time expressed in hours (e.g. 0.25, 0.5, or 1) | No | None |
| minTimeBilled | Minimum billable time for customer | No | None |
| modifyWorkerMsg (Not Implemented) | | | |
| csrUserName | Specifies the CSR username. | Note 1 | See Note 1. |
| csrPassword | Specifies the CSR password | Note 1 | See Note 1. |
| workerFirstName | Worker's first name | No | None |
| workerLastName | Worker's last name | No | None |
| workerUserName | Unique username used to look up worker | Yes | WorkerFirstName + WorkerLastName |
| workerPassword | Used for authentication | No | None |
| billingIncrement | Inrement for rounding billable time expressed in hours (e.g. 0.25, 0.5, or 1) | No | None |
| minTimeBilled | Minimum billable time for customer | No | None |
| newWorkerCapabilityMsg - creates a new worker capability. | | | |
| csrUserName | Specifies the CSR username. | Note 1 | See Note 1. |
| csrPassword | Specifies the CSR password | Note 1 | See Note 1. |
| workerUserName | Worker's username for which device session is being created | Note 4 | See Note 4. |
| workerObjId | Worker's object ID in $3^{rd}$ Party package. | Note 4 | See Note 4. |
| TaskDescName | Name of taskDesc to associate with worker | Yes | None |
| deleteWorkerCapabilityMsg | | | |
| csrUserName | Specifies the CSR username. | Note 1 | See Note 1. |
| csrPassword | Specifies the CSR password | Note 1 | See Note 1. |
| workerUserName | Worker's username for which device session is being created | Yes | None |
| TaskDescName | Name of taskDesc to associate with worker | Yes | None |
| newDeviceSessionMsg | | | |
| csrUserName | Specifies the CSR username. | Note 1 | See Note 1. |
| csrPassword | Specifies the CSR password | Note 1 | See Note 1. |
| workerUserName | Worker's username for which device session is being created | Yes | None |
| deviceAddress | Device's address to be used in device session | Yes | None |
| formName | FormName to be used | Yes | None |
| deleteDeviceSessionMsg (Not Implemented) | | | |
| csrUserName | Specifies the CSR username. | Note 1 | See Note 1. |
| csrPassword | Specifies the CSR password | Note 1 | See Note 1. |
| workerUserName | Worker's username for which device session is being created | Yes | None |
| newCatalogMsg - creates a new catalog. | | | |
| csrUserName | Specifies the CSR username | Note 1 | See Note 1. |
| csrPassword | Specifies the CSR password | Note 1 | See Note 1. |
| catalogName | Unique catalog name | Yes | None |
| catalogDescr | Description of catalog | No | None |
| newCatalogItemMsg - creates a new catalog item. | | | |
| csrUserName | Specifies the CSR username | Note 1 | See Note 1. |
| csrPassword | Specifies the CSR password | Note 1 | See Note 1. |
| CatalogItemId | Unique ID for catalog item. | No | Automatically generated sequence number. |
| catalogItemName | Unique name for catalog name. (Limited to 20 characters or less.) | Yes | None |
| catalogItemDescr | Description of catalog item (Limited to 256 characters or less.) | No | None |

APPENDIX A-continued

TABLE OF EXEMPLARY ILLUSTRATIVE NON-LIMITING INTEGRATION TAGS AND MESSAGES

| Tag Name | How Used | Rqd | Default Value |
| --- | --- | --- | --- |
| billable | Boolean value (true/false) indicating whether item is billable. | no | false. |
| billingType | Enumeration of how item is to be billed. Legal values are as follows: Per-Hr, Per-Ea, Per-In, Per-Ft, Per-Lb | No | None. |
| unitCost | Item's cost | No | 0 |
| unitPrice | Item's retail price | No | 0 |
| itemIsTaxable | Boolean indicating whether item is taxable | No | Defaults to true. |
| inventoryItem | Boolean (true/false) indicating whether the item is tracked in inventory. | No | false |
| qtyOnHand | Number indicating the number in inventory | No | 0 |
| increment | Billing rounding interval in minutes (e.g. round up to nearest 15, 30, or 60 Minute interval) | No | Value specified by catalog. |
| minTimeBilled | Minimum time billed | No | Value specified by catalog. |
| modifyCatalogItemMsg | | | |
| csrUserName | Specifies the CSR username | Note 1 | See Note 1. |
| csrPassword | Specifies the CSR password | Note 1 | See Note 1. |
| catalogItemName | Unique name for catalog name. (Limited to 20 characters or less.) | Yes | None |
| catalogItemDescr | Description of catalog item (Limited to 256 characters or less.) | No | None |
| billable | Boolean value (true/false) indicating whether item is billable. | no | false. |
| billingUnit | Enumeration of how item is to be billed. Legal values are as follows: Hour, Each, Foot, Inch, Pound (more as needed) | No | None. |
| unitCost | Item's cost | No | 0 |
| unitPrice | Item's retail price | No | 0 |
| itemIsTaxable | Boolean indicating whether item is taxable | No | Defaults to true. |
| inventoryItem | Boolean (true/false) indicating whether the item is tracked in inventory. | No | false |
| qtyOnHand | Number indicating the number in inventory | No | 0 |
| increment | Billing rounding interval in minutes (e.g. round up to nearest 15, 30, or 60 Minute interval) | No | Value specified by catalog. |
| minTimeBilled | Minimum time billed | No | Value specified by catalog. |
| addCatalogItemMsg - adds a catalog item to a catalog. | | | |
| csrUserName | Specifies the CSR username | Note 1 | See Note 1. |
| csrPassword | Specifies the CSR password | Note 1 | See Note 1. |
| CatalogName | Name of catalog into which catalog item is to be added. | Yes | None |
| catalogItemName | Name of catalog item to be added to catalog. | Yes | None |
| queryInvoiceMsg - query invoice for specified work order. | | | |
| csrUserName | Specifies the CSR username. | Note 1 | See Note 1. |
| csrPassword | Specifies the CSR password | No | See Note 1. |
| workOrderNo | Specifies the work order to query. | No | None |
| fromDate | Returns all inventory objects whose creationDate is greater than or equal to the specified fromDate | No | None. |

APPENDIX A-continued

TABLE OF EXEMPLARY ILLUSTRATIVE NON-LIMITING INTEGRATION TAGS AND MESSAGES

| Tag Name | How Used | Rqd | Default Value |
| --- | --- | --- | --- |
| toDate | Returns all inventory objects whose creationDate is less than or equal to the specified toDate | No | None. |

Notes:
1. Defaults to user's name
2. None
3. If csrFirstName and csrLastName is not specified, then the CSR with username csrUserName must already exist in the JumpStart system.
4. Either workerUserName or workerObjId must be specified. If both are specified, the object ID shall take precedence for the purposes of looking up the object in the jumpstart system.
5. Either the location's ID or the location's object iD must be specified. If both are specified, the object iD shall take precedence for the purposes of looking up the object in the JumpStart system.
6. Value is required to modify any of the related contact information (e.g. contFirstName, contLastName, contPhone, etc.)
7. Value is required to modify any of the related location information (e.g. custAddr, custCity, custState, etc.)
8. May be used to specify a different task description for the work order.

The invention is not to be limited to the disclosed exemplary illustrative non-limiting implementations. To the contrary, the invention is intended to encompass the subject matter set forth in the claims and equivalent structures, methods and techniques.

We claim:

1. A network-connected computer system comprising:
a task management component operatively coupled to a communications network,
the task management component including a session manager that facilitates transmission of information to at least one remote device over the communications network,
the task management component further comprising a node generator that translates at least one of input specifications and/or response data into nodes configured to function independently of the state of the communication link between the task management component and the at least one remote device to provide useful workflow and remote device control instructions even in the absence of reliable communication between the task management component and the at least one disparate remote device,
the node generator providing nodes constituting a collection of managed objects or managed object representations effective to control aspects of the at least one remote device, the nodes comprising an integrated definition of an application and associated data,
the nodes specifying how and when they should be synchronized,
the nodes being configured to control the processing of multiple data types.

2. The network-connected computer system of claim 1, wherein the communications network comprises a wireless network.

3. The network-connected computer system of claim 1, wherein the task management component includes a node storage that stores generated nodes to be transmitted to the at least one remote device over the communications network.

4. The network-connected computer system of claim 1, wherein the task management component communicates nodes to a plurality of intermittently-connected remote devices.

5. The network-connected computer system of claim 1, wherein the node generator translates from a task description language description to one or more nodes constituting a collection of managed objects or managed object representations effective to control aspects of the at least one remote device.

6. The network-connected computer system of claim 1, wherein the task management component includes a session manager that transmits nodes to and receives nodes from at least one remote device.

7. The network-connected computer system of claim 1, wherein the task management component includes an integration server that provides integration with at least one application.

8. The network-connected computer system of claim 1, wherein the nodes have a hierarchical structure.

9. The network-connected computer system of claim 1 wherein the task management component includes a dispatch manager that manages communications with the at least one remote device,
the dispatch manager assembling, checking, and storing nodes in a node storage module,
monitoring nodes whose status has changed or for which data has been collected in the node storage module, and
asynchronously updating the task management component with the status of changed nodes.

10. The network-connected computer system of claim 9, wherein the node generator translates the nodes from one or more form descriptions, preferably templates or catalogs.

11. The network-connected computer system of claim 9, wherein the input specifications comprises XML.

12. The network-connected computer system of claim 1, wherein the task management component maintains and stores a collection of object representations at least in part relating to a dispatch resource management, or task management application,
detects when said at least one remote device is reachable through at least one intermittent connection over the network connection, and at least in response to said detection, and
synchronizes a node store and/or a dispatch manager provided on said intermittently connected to at least one remote device with said maintained and stored collection of object representations.

13. The network-connected computer system of claim 12, wherein the session manager performs synchronization of completed node structures with an XML integration server to update external systems with completed node information.

14. The network connected computer system of claim 12, wherein the session server forms associations between node structures, users, and disparate devices, with the effect of determining which node structures are synchronized with a specific device.

15. The network connected computer system of claim 12, wherein such data types include text, numbers, and collections of similar data descriptions such as parts lists and product catalogs, contact information, email information, Internet URLs, images, videos, maps, GPS information, database queries, barcodes, magstripe information, and/or music.

* * * * *